United States Patent
Follmeg et al.

(10) Patent No.: US 8,095,598 B2
(45) Date of Patent: Jan. 10, 2012

(54) METHODS AND APPARATUS FOR SUBSCRIBING/PUBLISHING MESSAGES IN AN ENTERPRISING COMPUTING ENVIRONMENT

(75) Inventors: Bernd Follmeg, Weinheim (DE); Sabine Heider, Mauer (DE); Nikolai P. Angelov, Sofia (BG); Margarit P. Kirov, Brisbane (AU); Radoslav I. Nikolov, Vidin (BG)

(73) Assignee: SAP AG, Walldorf (DE)

( * ) Notice: Subject to any disclaimer, the term of this patent is extended or adjusted under 35 U.S.C. 154(b) by 1264 days.

(21) Appl. No.: 10/837,409

(22) Filed: Apr. 30, 2004

(65) Prior Publication Data

US 2005/0256931 A1    Nov. 17, 2005

(51) Int. Cl.
*G06F 15/16*    (2006.01)
(52) U.S. Cl. ........ 709/206; 709/204; 709/205; 709/207; 709/208
(58) Field of Classification Search .................. 709/206, 709/205, 204, 207, 208
See application file for complete search history.

(56) References Cited

U.S. PATENT DOCUMENTS

| | | | | |
|---|---|---|---|---|
| 2002/0120697 | A1* | 8/2002 | Generous et al. | 709/206 |
| 2003/0105825 | A1* | 6/2003 | Kring et al. | 709/206 |
| 2003/0120593 | A1* | 6/2003 | Bansal et al. | 705/39 |
| 2003/0135556 | A1* | 7/2003 | Holdsworth | 709/206 |
| 2004/0148356 | A1* | 7/2004 | Bishop et al. | 709/206 |
| 2004/0267769 | A1* | 12/2004 | Galindo-Legaria et al. | 707/100 |
| 2007/0156656 | A1* | 7/2007 | Pather et al. | 707/3 |
| 2008/0256553 | A1* | 10/2008 | Cullen | 719/313 |

* cited by examiner

*Primary Examiner* — Jeffrey Pwu
*Assistant Examiner* — Abdelnabi Musa
(74) *Attorney, Agent, or Firm* — Schwegman, Lundberg & Woessner, P.A.

(57) ABSTRACT

Methods and apparatuses for processing enterprise messages are described herein. In one embodiment, an exemplary process is provided to maintain multiple delivery policies of multiple subscription sessions of a subscriber subscribing a topic published by a producer, wherein at least one policy is different from a remainder of the delivery policies. The messages associated with the topic are delivered according to substantially all the delivery policies of the subscription sessions including the at least one different delivery policy. Other methods and apparatuses are also described.

43 Claims, 36 Drawing Sheets

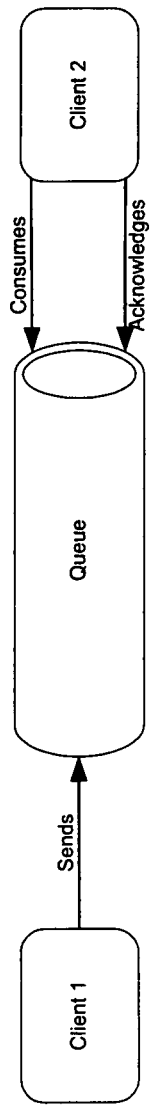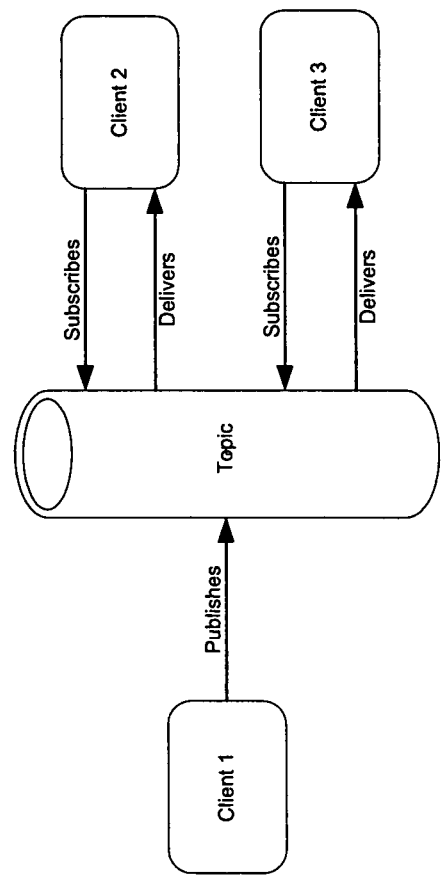
Fig. 1A (Prior Art)
Fig. 1B (Prior Art)

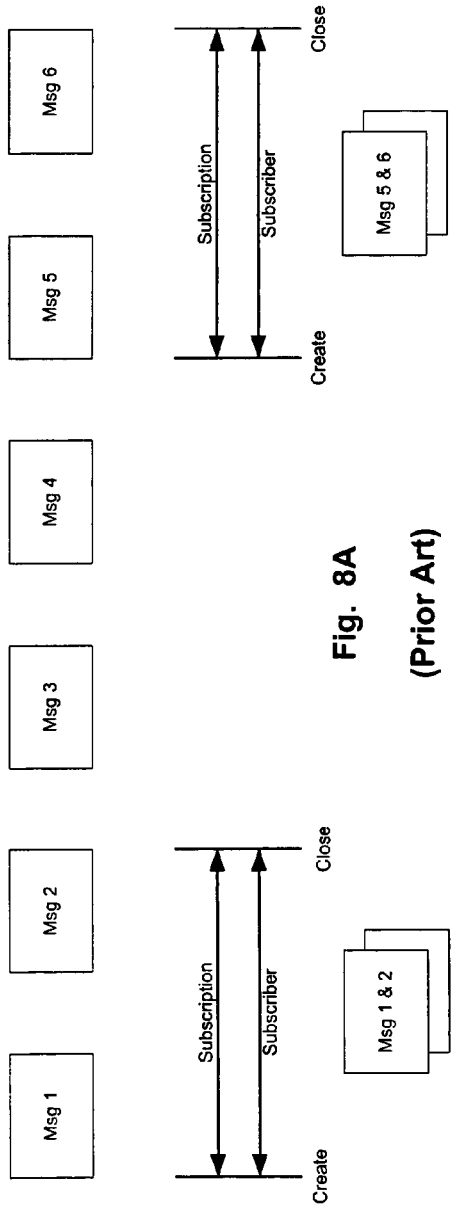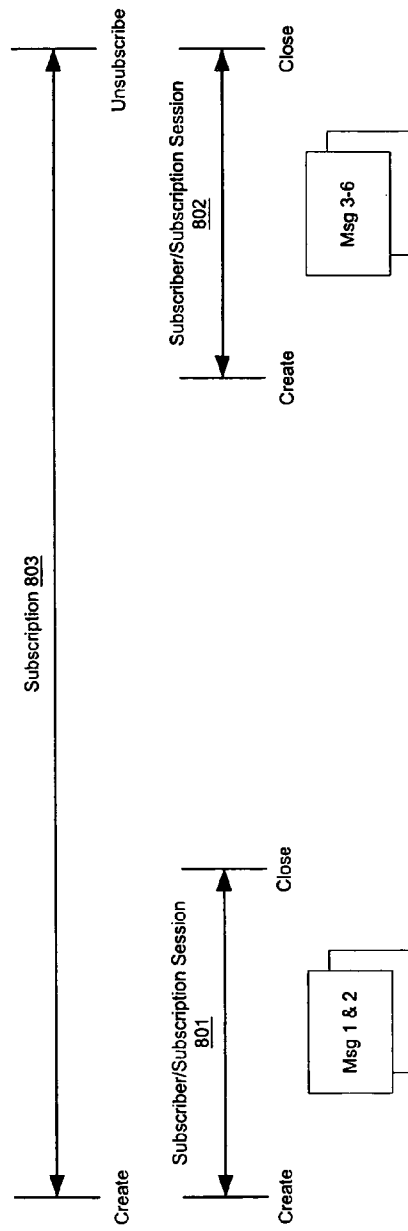

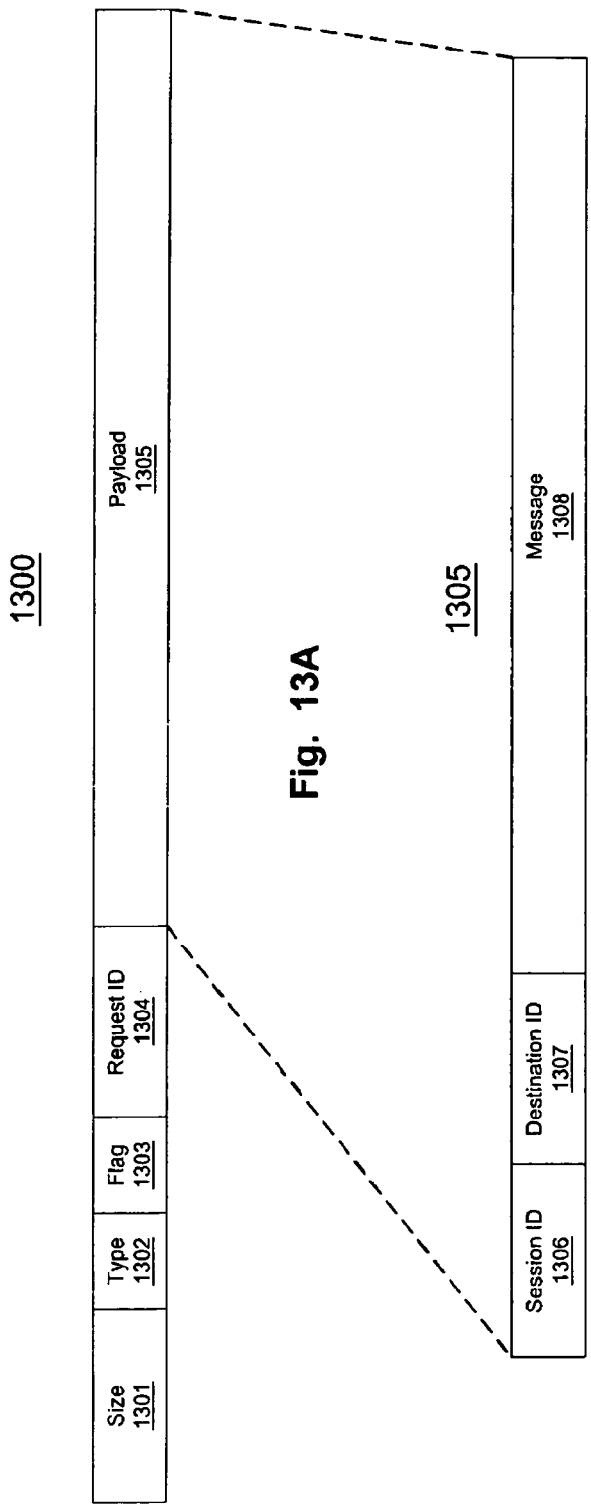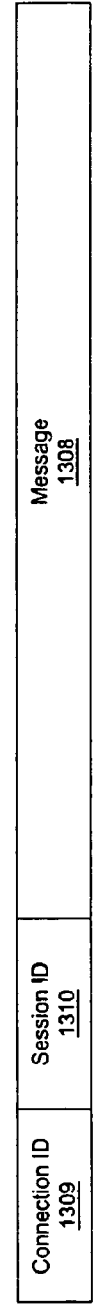

METHODS AND APPARATUS FOR SUBSCRIBING/PUBLISHING MESSAGES IN AN ENTERPRISING COMPUTING ENVIRONMENT

FIELD OF THE INVENTION

The present invention relates generally to enterprise applications. More particularly, this invention relates to enterprise messaging services.

BACKGROUND OF THE INVENTION

Messaging is a method of communication between software components or applications. A messaging system is a peer-to-peer facility. A messaging client can send messages to, and receive messages from, any other clients. Each client typically connects to a messaging agent that provides facilities for creating, sending, receiving, and reading messages.

Messaging enables distributed communication that is loosely coupled. A component sends a message to a destination, and the recipient can retrieve the message from the destination. However, the sender and the receiver do not have to be available at the same time in order to communicate. In fact, the sender does not need to know anything about the receiver; nor does the receiver need to know anything about the sender. The sender and the receiver need to know only what message format and destination to use. In this respect, messaging differs from tightly coupled technologies, such as remote method invocation (RMI), which requires an application to know a remote application's method.

The Java message service (JMS) is a Java API that allows applications to create, send, receive, and read messages. Designed by Sun Microsystems and other partners, the JMS API defines a common set of interfaces and associated semantics that allow programs written in the Java programming language to communicate with other messaging implementations.

A typical JMS application may include a JMS provider, one or more JMS clients, messages, one or more administered objects, and one or more native clients. A JMS provider is a messaging system that implements the JMS interfaces and provides administrative and control features. JMS clients are the programs or components, written in the Java programming language, that produce and consume messages. Messages are the objects that communicate information between the JMS clients. Administered objects are preconfigured JMS objects created by an administrator for the use of clients. There are two kinds of administered objects: destinations and connection factories. Native clients are programs that use a messaging product's native client API instead of the JMS API. An application first created before the JMS API became available and subsequently modified is likely to include both JMS and native clients.

Typically, most current implementations of the JMS API provide support for both point-to-point (PTP) and the publish/subscribe (pub/sub) domains. A PTP product or application is built around the concept of message queues, senders, and receivers. Each message is addressed to a specific queue, and receiving clients extract messages from the queue(s) established to hold their messages. Queues retain all messages sent to them until the messages are consumed or until the messages expire. Under a PTP system, each message has only one consumer. A sender and a receiver of a message have no timing dependencies. The receiver can fetch the message whether or not it was running when the client sent the message. The receiver acknowledges the successful processing of a message. FIG. 1A is a block diagram illustrating an example of a PTP messaging configuration.

In a publish/subscribe (pub/sub) product or application, clients address messages to a topic. Publishers and subscribers are generally anonymous and may dynamically publish or subscribe to the content hierarchy. The system takes care of distributing the messages arriving from a topic's multiple publishers or its multiple subscribers. Topics retain messages only as long as it takes to distribute them to current subscribers. Under a pub/sub system, each message may have multiple consumers (also referred to as subscribers). Publishers and subscribers have a timing dependency. A client that subscribes to a topic can consume only messages published after the client has created a subscription, and the subscriber must continue to be active in order for the subscriber to consume messages. FIG. 1B is a block diagram illustrating an example of a pub/sub messaging configuration.

In addition, the JMS API relaxes this timing dependency to some extent by allowing clients to create durable subscriptions. Durable subscriptions can receive messages sent while the subscribers are not active. Durable subscriptions provide the flexibility and reliability of queues but still allow clients to send messages to many recipients. FIGS. 8A and 8B (described in greater detail below) are block diagrams illustrating examples of a durable subscription versus a non-durable subscription in an enterprise messaging system.

JMS messages may be consumed synchronously or asynchronously. Under the synchronous model, a subscriber or a receiver explicitly fetches the message from the destination by calling the "receive" method. The "receive" method can block until a message arrives or can time out if a message does not arrive within a specified time limit. Under the asynchronous model, a client can register a message listener with a consumer. A message listener is similar to an event listener. Whenever a message arrives at the destination, the JMS provider delivers the message by calling the listener's "on Message" method, which acts on the contents of the message.

FIG. 1C is a block diagram illustrating a typical object-oriented enterprise messaging system, such as a Java message system (JMS). Referring to FIG. 1C, two parts of a JMS application, destination and connection factories, are best maintained administratively rather than programmatically. These components are implemented as objects under object-oriented programming environments, particularly referred to as administered objects. The technology underlying these objects is likely to be very different from one implementation of the JMS API to another. Thus, the management of these objects varies from provider to provider.

JMS clients access these objects through interfaces that are portable, so a client application can run with little or no change on more than one implementation of the JMS API. Ordinarily, an administrator configures administered objects in a Java naming and directory interface (JNDI) API namespace, and JMS clients then look them up, using the JNDI API. For example, in a J2EE (Java 2 enterprise edition) development environment, an administrator may use a tool called j2eeadmin to perform the administrative tasks.

A connection factory is the object a client uses to create a connection with a message provider (e.g., a JMS provider). A connection factory may be created using the j2eeadmin tool for a PTP and/or a pub/sub domains. A connection factory encapsulates a set of connection configuration parameters that has been defined by an administrator.

A destination is the object a client uses to specify the target of messages it produces and the source of messages it consumes. In a PTP messaging domain, destinations are referred to as queues, while in a pub/sub domain, the destinations are referred to as topics. A JMS application may use multiple queues and topics.

A connection encapsulates a virtual connection with a JMS provider. A connection could represent an open TCP/IP socket between a client and a provider server's daemon. A connection may be used to create one or more sessions. When an application completes, any connections associated with the application have to be closed. Failure to close a connection can cause resources not to be released by the JMS provider. Closing a connection also closes its session and their message producers and message consumers. A session is a single-threaded context for producing and consuming messages. Sessions may be used to create message producers, message consumers, and messages.

A message producer is an object created by a session and is used for sending messages to a destination. A message consumer is an object created by a session and is used to receive messages sent to a destination. A message consumer allows a JMS client to register interest in a destination with a JMS provider. The JMS provider manages the delivery of messages from a destination to the registered consumers of the destination. Once a consumer is created, it becomes active and may be used to receive messages. A consumer may be closed via a "close" method. A message listener is an object that acts as an asynchronous event handler for messages. A message listener is not specific to a particular destination type. The same message listener may obtain messages from either a queue or a topic, depending on whether the listener is set for a queue receiver or a topic subscriber.

If a messaging application needs to filter the messages it receives, a JMS API message selector may be used to specify the messages a consumer is interested in. Message selectors assign the work of filtering messages to the JMS provider rather than to the application. A message selector is a string that contains an expression. The syntax of the expression is based on a subset of the conditional expression syntax according to a specification, such as SQL92 specification. The message consumer then receives only messages whose headers and properties match the selector. Typically, a message selector cannot select messages on the basis of the content of the message body.

The ultimate purpose of a JMS application is to produce and to consume messages that can then be used by other software applications. JMS messages have a basic format that is simple but highly flexible, allowing a user to create messages that match formats used by non-JMS applications on heterogeneous platforms. A typical JMS message includes a message header, one or more optional message properties, and an optional message body.

A JMS header typically contains a number of predefined fields that contain values that both clients and providers use to identify and to route messages. For example, every message has a unique identifier, a destination, and other fields, such as a timestamp and a priority level.

Message properties may used to set values in addition to those defined in the message header. For example, the message properties may be used to provide compatibility with other messaging systems, or alternatively, to create message selectors. There are several message body formats (also referred to as message types) defined by JMS API, which allow a user to send and to receive data in many different forms and provide compatibility with existing messaging formats.

As enterprise applications have become more popular and complicated, enterprise messaging systems have also become more complex. However, there has been a lack of improvement of the memory management and the efficiency of message delivery within an enterprise messaging system.

SUMMARY OF THE INVENTION

Methods and apparatuses for processing enterprise messages are described herein. In one embodiment, an exemplary process is provided to maintain multiple delivery policies of multiple subscription sessions of a subscriber subscribing a topic published by a producer, wherein at least one policy is different from a remainder of the delivery policies. The messages associated with the topic are delivered according to substantially all the delivery policies of the subscription sessions including the at least one different delivery policy. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 1A is a block diagram illustrating an example of a PTP messaging configuration.

FIG. 1B is a block diagram illustrating an example of a pub/sub messaging configuration.

FIGS. 8A and 8B are block diagrams illustrating an example of a durable subscription of an enterprise messaging system.

FIGS. 13A-13D are block diagrams illustrating exemplary packets of a messaging protocol according to one embodiment of the invention.

DETAILED DESCRIPTION

Figure 1C:
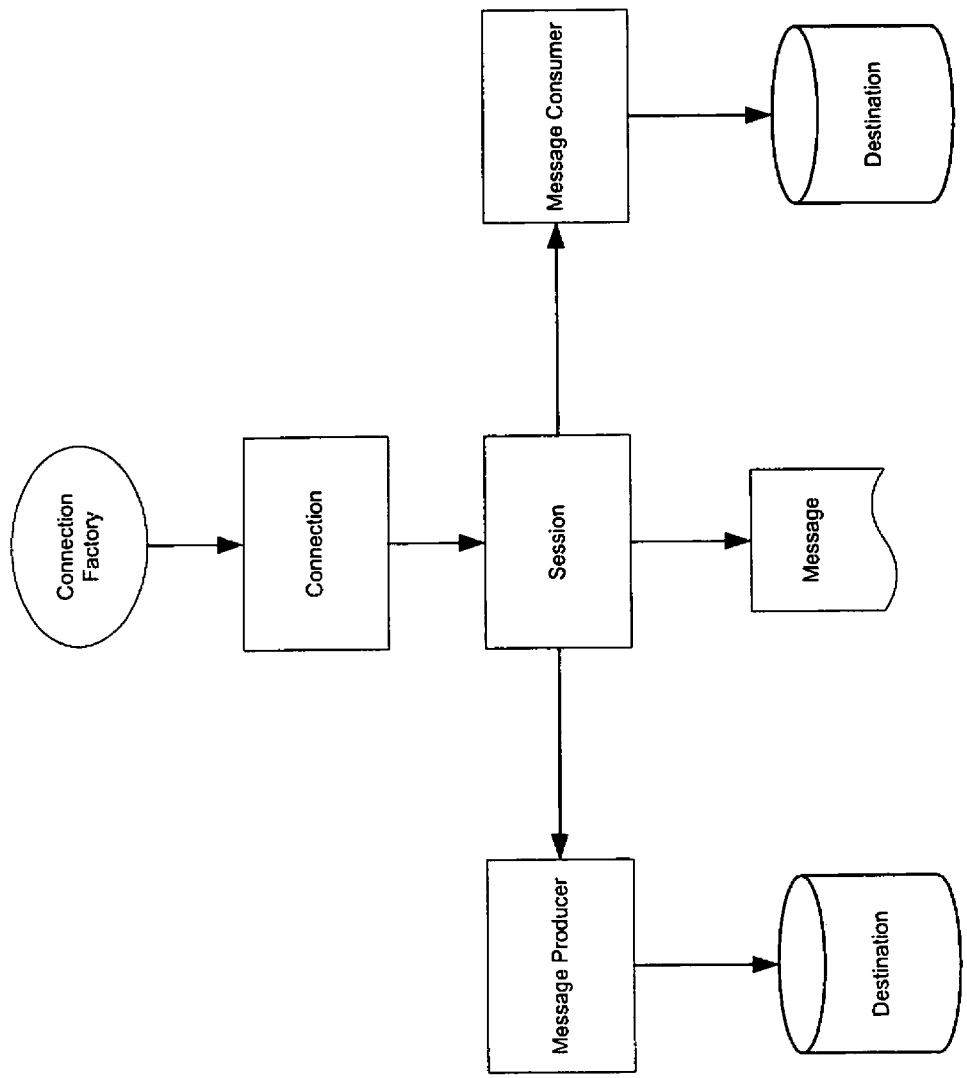
FIG. 1C is a block diagram illustrating an example of an enterprise messaging system.

Methods and apparatuses for processing messages in an enterprise computing environment are described. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In one embodiment of the invention, an internal communication protocol is defined to be used for client/server communications, including non-Java clients. In one embodiment, the protocol contains a buffer length, a type of the packet, an identification (ID) of the session/connection/consumer, message headers and body. The object messages may be serialized and stored into the body of the binary buffer.

According to another embodiment of the invention, persistent messages may be stored directly in a database, as well as in a system memory (e.g., cache memory) if the memory is not full or does not reach a predetermined threshold. The non-persistent messages may be stored in the memory if the memory is not full or does not reach a predetermined threshold. Otherwise the non-persistent messages may be swapped into the database. The memory may represent a continuous part of the database and may be used for fast delivery of the messages to the corresponding consumers. If all of the messages from the memory have been delivered or the remaining messages in the memory drop below a predetermined threshold, new messages may be fetched from the database into the memory. The fetching may be performed by a separate thread.

According one embodiment, after acknowledgement regarding a delivered message is received from a consumer, the messages stored in the database may be marked and the acknowledged and/or expired messages may be deleted from the database by a maintenance thread (e.g., a housekeeping thread). In one embodiment, only the messages stored in a queue may be marked while the topic messages may not marked. According to a further embodiment, messages subscribed to by one or more durable subscribers may be stored with the IDs of the one or more durable subscribers. Furthermore, some of the subscription sessions from the same durable subscriber may be initiated with a no-local delivery option or attribute. In one embodiment, a message having a durable subscriber's ID would not be delivered to the subscriber, even via other subscription sessions generated from the same durable subscriber.

According to a further embodiment, at least a portion of message may be swapped into the database if it is determined that the memory reaches a predetermined threshold. In a particular embodiment, the whole message may be swapped into the database, while its header may be maintained (e.g., cached) in the memory.

According to yet another embodiment, a client library may be implemented to manage a client buffer for handling pending messages for the corresponding message consumers (e.g., JMS consumers). The size of the client buffer may be dynamically configurable depending upon the pending messages. When a client buffer is not large enough to receive a next enterprise message, additional memory may be allocated to the client buffer and the server that delivers the messages may be notified with respect to the updated client buffer.

According to yet another embodiment, the subscribers subscribing a topic are grouped based on the similar interest of the multiple consumers. In addition, a selector hierarchy is maintained in order to determine whether multiple consumers have similar interests. Furthermore, the subscriptions of certain subscribers that register at different time may be delayed, such that more consumers having similar interests may be grouped to receive the same messages at substantially the same time using multicasting.

According to a further embodiment, producers and consumers of an enterprise messaging system may prioritized, such that an mount of messages received from the producers is relatively equivalent to an amount of messages delivered to the consumers.

Exemplary Enterprise System

Figure 2A:
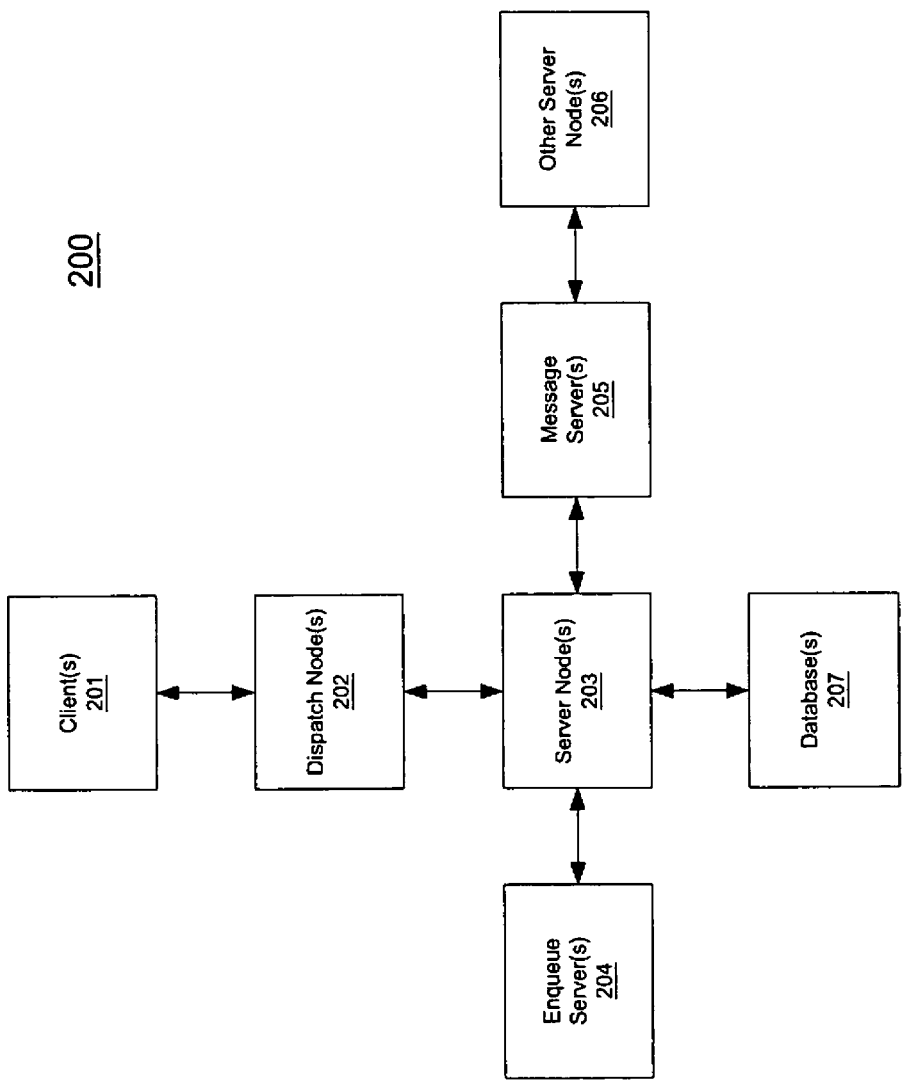
FIGS. 2A and 2B are block diagrams illustrating object-oriented enterprise messaging systems, according to certain embodiments of the invention.

FIG. 2A is a block diagram illustrating an exemplary enterprise application system according to one embodiment of the invention. For the purpose of illustration, the embodiments of the present application may be illustrated in view of Java computing environment. However, it will be appreciated that other enterprise development environments, such as, for example, the NET framework development environment from Microsoft, may be applied without departing from the broader spirit and scope of embodiments of the invention.

In one embodiment, the exemplary system 200 includes, but is not limited to, one or more client nodes 201, one or more dispatch nodes 202, one or more server nodes 203, an enqueue server 204, a message server 205, database 207, and other server nodes 206. In one embodiment, dispatch node 202 receives a request from client node 201 and sends the request to an appropriate server node 203 via the message server 205. In one embodiment, if there is a session already assigned to the respective client, the request is forwarded to the server mapped to the respective session. Otherwise, an appropriate server is chosen using an algorithm for load balancing.

In one embodiment, server node 203 receives the request. During its procession it is possible to access data from the database 207, to set locks into enqueue server 204, or even to send message to other cluster nodes, such as server nodes 206, which may be transmitted over the message server. The database 207 stores most of the system configuration data, binaries and applications. In one embodiment, database 207 supports databases from a variety of vendors, such as, for example, SAP, Oracle, Informix, SQL from Microsoft, DB2 from IBM, etc.

In one embodiment, the communication between the nodes in the system is done using message server 205. In one embodiment, each server node (also referred to as cluster node) keeps a permanently open TCP socket, through which messages are exchanged. The messages may be exchanged using a variety of protocols. In one embodiment, the messages may be serialized into a stream of data, which may be communicated within the components of the message server 205. Alternatively, the messages may be serialized into a stream of data that may be transmitted over a variety of communication protocols, such as, for example, the TCP/IP protocol.

Figure 2B:
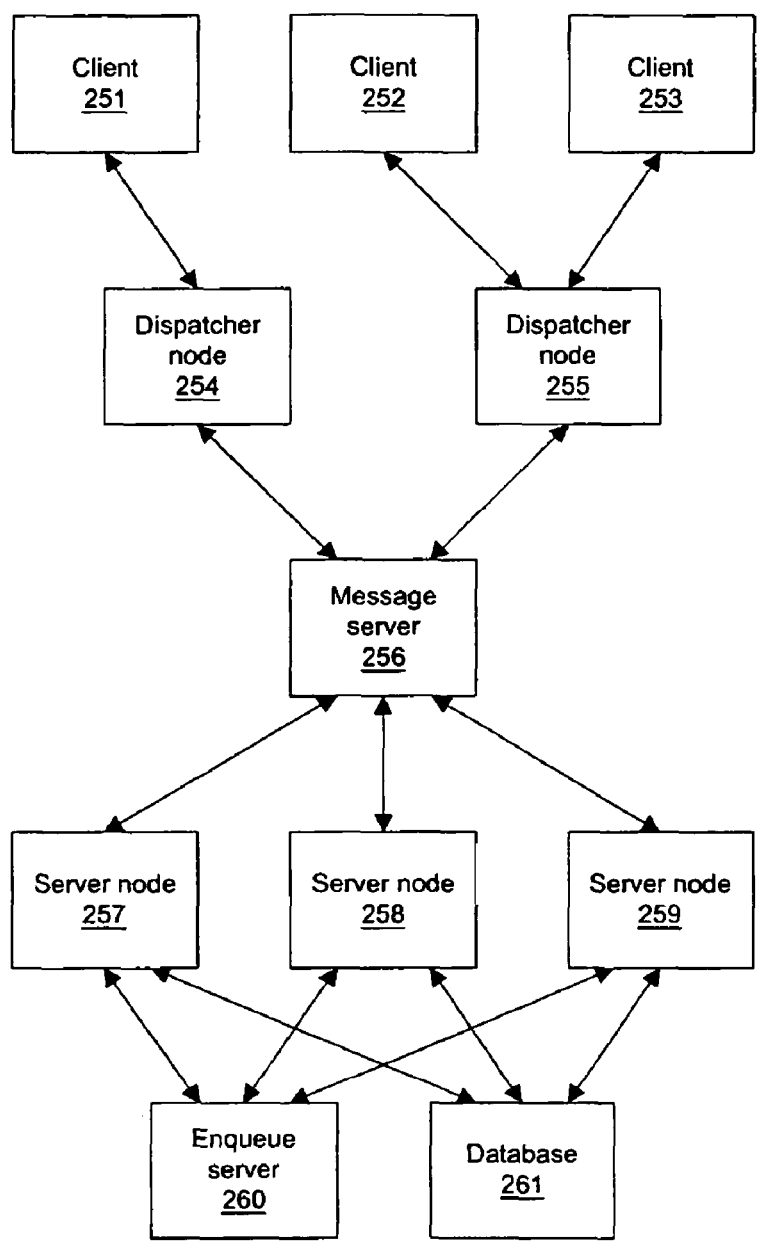

In one embodiment, enqueue server 204 is used to provide a special lock mechanism that synchronizes access to system resources. The purpose of this mechanism is to prevent several threads from accessing a system resource simultaneously. For this purpose the resource may be locked by the thread that will use it. Other components may also be included. FIG. 2B is a block diagram illustrating an exemplary enterprise application system according to another embodiment of the invention.

Exemplary Enterprise Messaging System

Figure 3A:
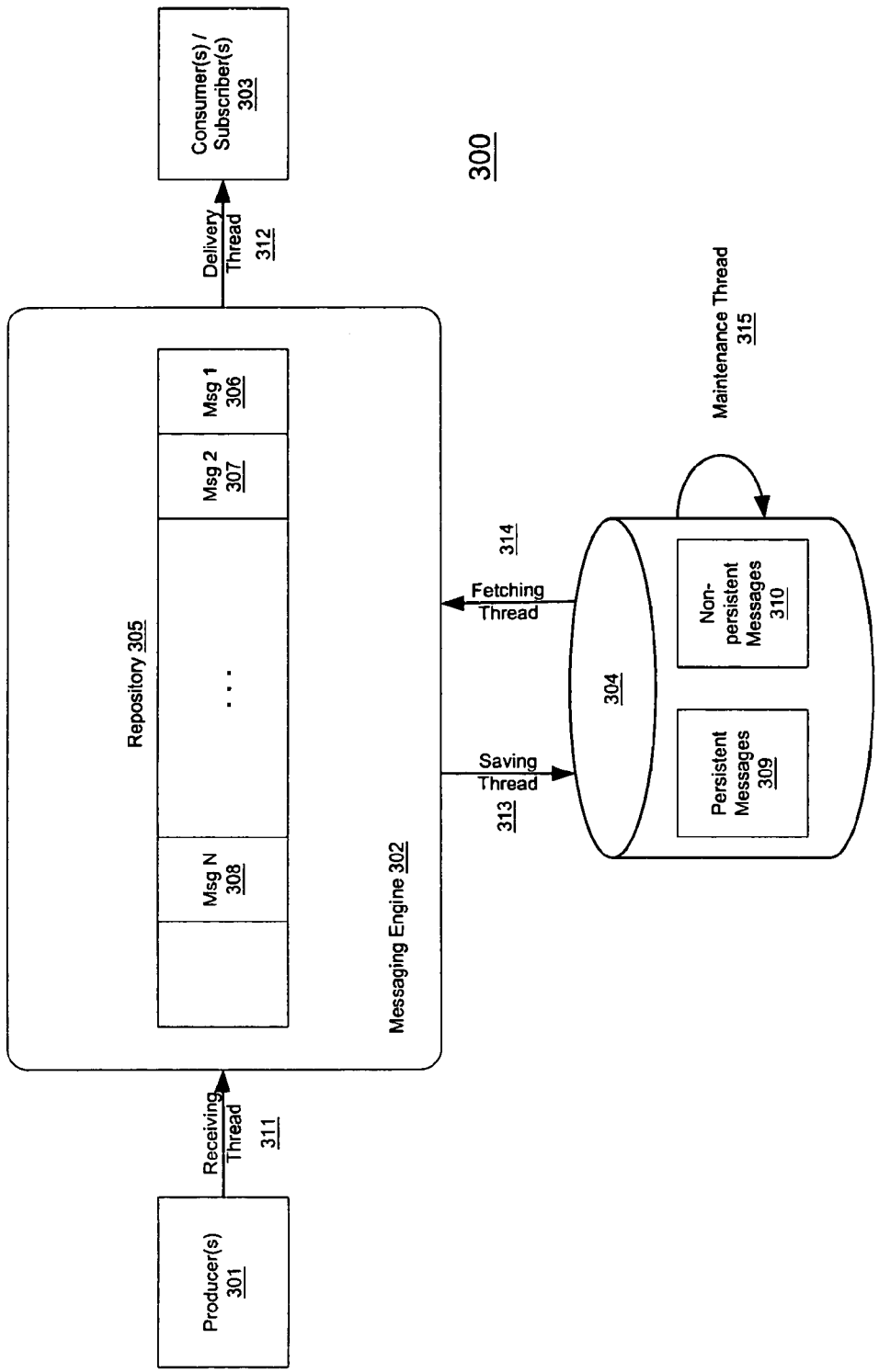
FIGS. 3A and 3B are block diagrams illustrating an exemplary enterprise messaging system according to certain embodiments of the invention.

FIG. 3A is a block diagram illustrating an exemplary enterprise messaging system according to one embodiment of the invention. The exemplary system 300 may be a part of message server 205 of FIG. 2A. The exemplary system 300 may be used to process messages generated from a variety of clients, such as, for example, client 201, dispatch node 202, server nodes 204, 203, and 206 of FIG. 2A, etc. The exemplary system 300 may also be used to deliver the messages consumed or subscribed to by a variety of clients, such as, for example, client 201, dispatch node 202, server nodes 204, 203, and 206 of FIG. 2A, etc.

In one embodiment, the messaging system is a part of the server node. In a particular embodiment, a destination (e.g., a queue or topic) is maintained by a server node. The JMS session for a client may be maintained on another server node. To send messages to the destination, or receive messages from the destination, however, different server nodes may communicate with each other.

The communications between the exemplary system 300 and the clients may be performed via a variety of communication protocols, including a proprietary protocol or a tunneling protocol over a TCP/IP protocol that may be used by a variety of clients including non-Java clients. The embodiments of the communication protocols will be described in greater detail below.

Referring to FIG. 3A, according to one embodiment, exemplary system 300 includes, but is not limited to, a messaging engine 302 to receive messages from one or more producers 301 and deliver the messages to one or more consumers in a PTP environment or subscribers in a pub/sub domain. A client may be both a producer to generate one or more messages and a consumer or subscriber to consume the messages from other producers. In addition, the exemplary system 300 includes one or more databases 304 to store messages, which may include persistent messages 309 and non-persistent messages 310.

In one embodiment, messaging engine 302 includes a repository 305, which may be implemented as a part of system memory or a cache memory of the messaging engine 302. The repository 305 may be used to store messages 306-308 received from one or more producers 301 via one or more receiving threads 311. The messages 306-308 may include persistent messages and non-persistent messages. The messages 306-308 may be the messages in a PTP messaging environment or alternatively, in a pub/sub messaging environment.

The messages 306-308 may be delivered to one or more consumers or subscribers 303 via one or more delivery threads 312. In one embodiment, messages 306-308 may be received from one or more producers via multiple receiving threads, while messages 306-308 may be delivered to one or more consumers/subscribers via a single delivery thread. According to one embodiment, for each message subscribed to by multiple subscribers, the delivery thread 312 loops through a list of subscribers and delivers the respective message to each of the subscribers. Since the messages are received via multiple receiving threads, the delivery of the messages may fall behind the receiving threads and the repository 305 may be filled up before the messages can be delivered to all of the subscribers 303. As result, some of the messages may be swapped into the database 304.

In order to improve the usability of the repository 305 and improve the delivery of the messages to the consumers/subscribers, according to one embodiment, the receiving threads 311 and the delivery thread 312 may be prioritized, such that an amount of messages received from the one or more producers 301 may be relatively equivalent to an amount of messages delivered to the consumers/subscribers. Additional information concerning prioritization of the receiving and delivery threads will be set forth below.

In one embodiment, the messaging engine 302 may keep track a client buffer of the consumers or subscribers to determine whether the consumer/subscriber can receive a next message. According to another embodiment, when the size of a message exceeds an available client buffer size of a consumer/subscriber, the messaging engine 302 may communicate with the client (e.g., the consumer/subscriber) to determine the available client buffer size and indicate the size of the next message. Such a communication may be performed using a variety of communication protocols, such as, for example, an internal protocol if within a server cluster or a tunneling protocol over the TCP/IP protocol. Alternatively, the client may periodically notify the messaging engine 302 the available size of the client buffer that can receive additional messages. The aforementioned techniques will be described in further detail below.

Exemplary Embodiments of Messages Handling

Referring back to FIG. 3A, messages 306-308 may include persistent messages and non-persistent messages. The persistent messages require storage that survives a restart of the system. For example, messages subscribed to by a durable subscriber may be persistent messages. Typically, the persistent messages 309 are stored in a database, such as database 304. According to one embodiment, if the repository 305 has more available space, the persistent messages may also be stored in the repository 305.

In general, the non-persistent messages are stored in repository 305. However, according to one embodiment, if the available space of the repository 305 drops below a predetermined threshold, at least a portion of the non-persistent messages may be swapped into the database 304 as non-persistent messages 310. Alternatively, according to another embodiment, if a size of a non-persistent message exceeds a certain threshold (e.g., bigger than a predetermined size), at least a portion of the non-persistent message may also be swapped into the database 304 as non-persistent messages 310. The persistent and non-persistent messages may be stored in the database 304 via a saving thread 313.

Figure 3B:
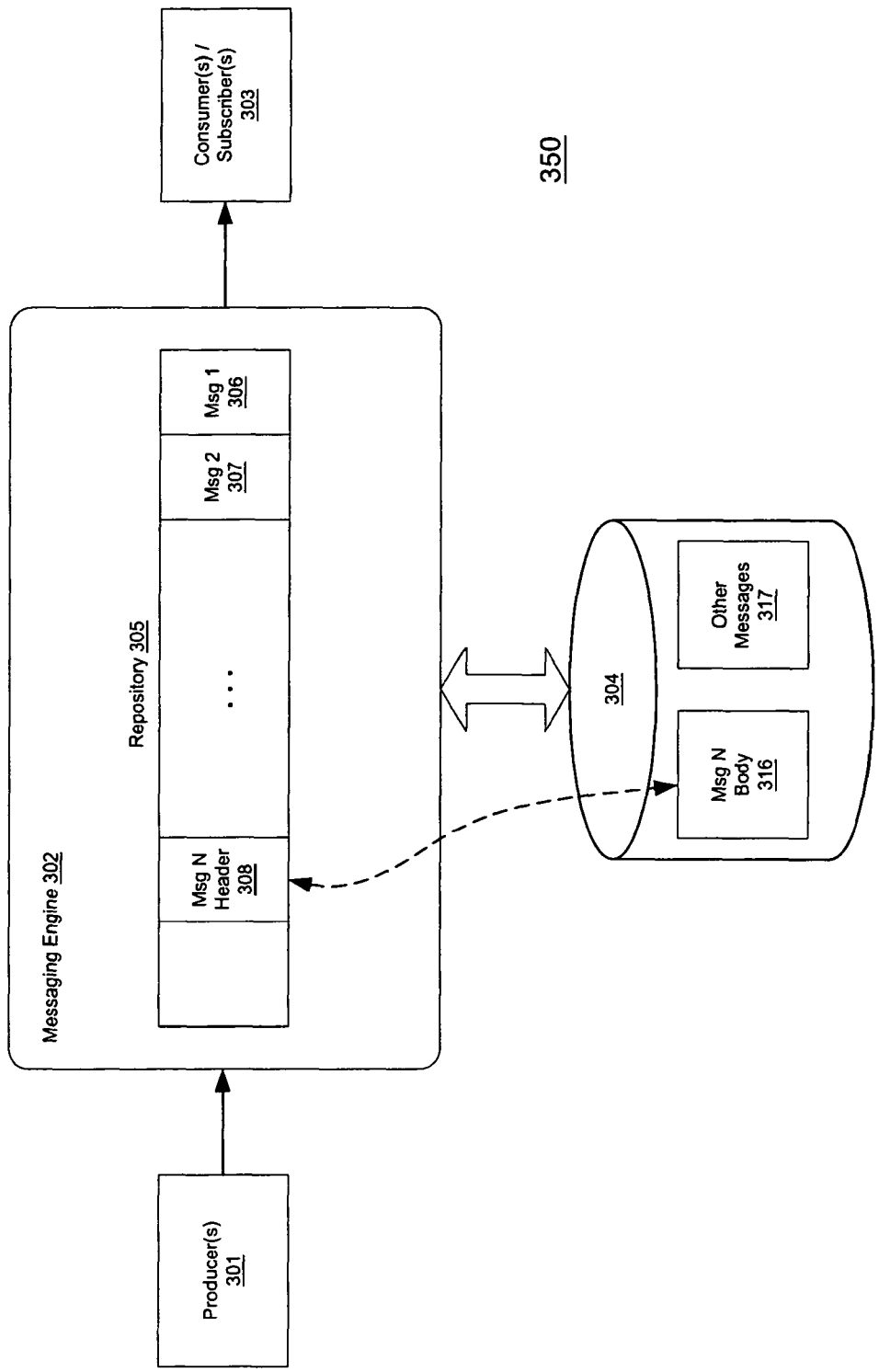

For example, referring to FIG. 3B, which illustrates an alternative embodiment of an enterprise messaging system, when the size of message 308 exceeds a certain threshold, or the available space of repository 305 drops below certain level, a portion of the message 308, such as, for example, the message body 316 of message 308 may be swapped into the database 304, along with other messages 317, while the repository 305 maintains the remaining portion, such as the message header of message 308. However, the system maintains a reference link between the two portions of message 308 between the repository 305 and the database 304, such that the message 308 can be quickly fetched from the database when it is needed via, for example, the fetching thread 314 of FIG. 3A. It will be appreciated that the above techniques may also be applied to persistent messages.

Referring back to FIG. 3A, according to one embodiment, when some of the messages stored in the repository 305 have been delivered to the consumers/subscribers, additional messages may be fetched from the database 304 and stored in the repository 305. Thus, the repository 305 may act as an extension of database 304 and may be used for fast delivery of messages to the consumers/subscribers. However, the configurations are not limited to those shown in FIG. 3A.

Furthermore, according to one embodiment, an independent maintenance thread 315 is executed in the background to maintain the messages stored in the database 304. For example, in one embodiment, the independent maintenance thread deletes messages that have been delivered to all consumers/subscribers (this process may also be referred to as a "garbage collection" process).

Figure 4:
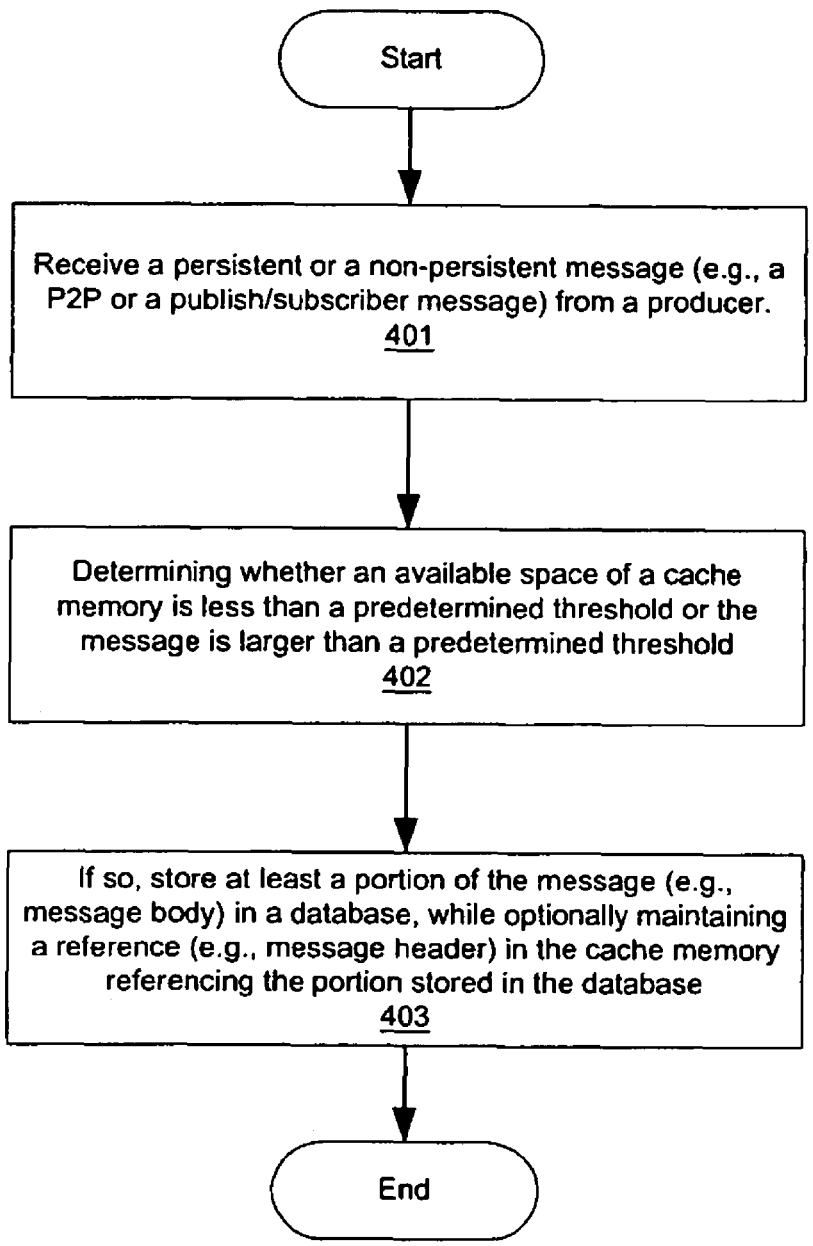
FIG. 4 is a flow diagram illustrating an exemplary process for processing messages in an enterprise messaging system, according to one embodiment of the invention.

FIG. 4 is a flow diagram illustrating an exemplary process for processing messages in an enterprise messaging system, according to one embodiment of the invention. Exemplary process 400 may be performed by a processing logic that may comprise hardware (circuitry, dedicated logic, etc.), software (such as is run on a dedicated machine), or a combination of both. For example, the exemplary process 400 may be performed via the saving thread 313 of FIG. 3A.

Referring to FIG. 4, at block 401, a message is received from a producer. The message may be a PTP message consumed by a consumer or associated with a topic subscribed to by one or more subscribers. The message may be a persistent message or a non-persistent message. At block 402, the messaging system determines whether an available space of a repository (e.g., a cache memory) is less than a predetermined threshold or alternatively, whether the size of the message exceeds a predetermined size. If so, at block 403, at least a portion of the message (e.g., the message body) may be swapped into the database (e.g., database 304 of FIG. 3A), while optionally maintaining a reference (e.g., message header) in the repository, where the reference links the portion stored in the database. Other operations may also be performed while still complying with the underlying principles of the invention.

Figure 5:
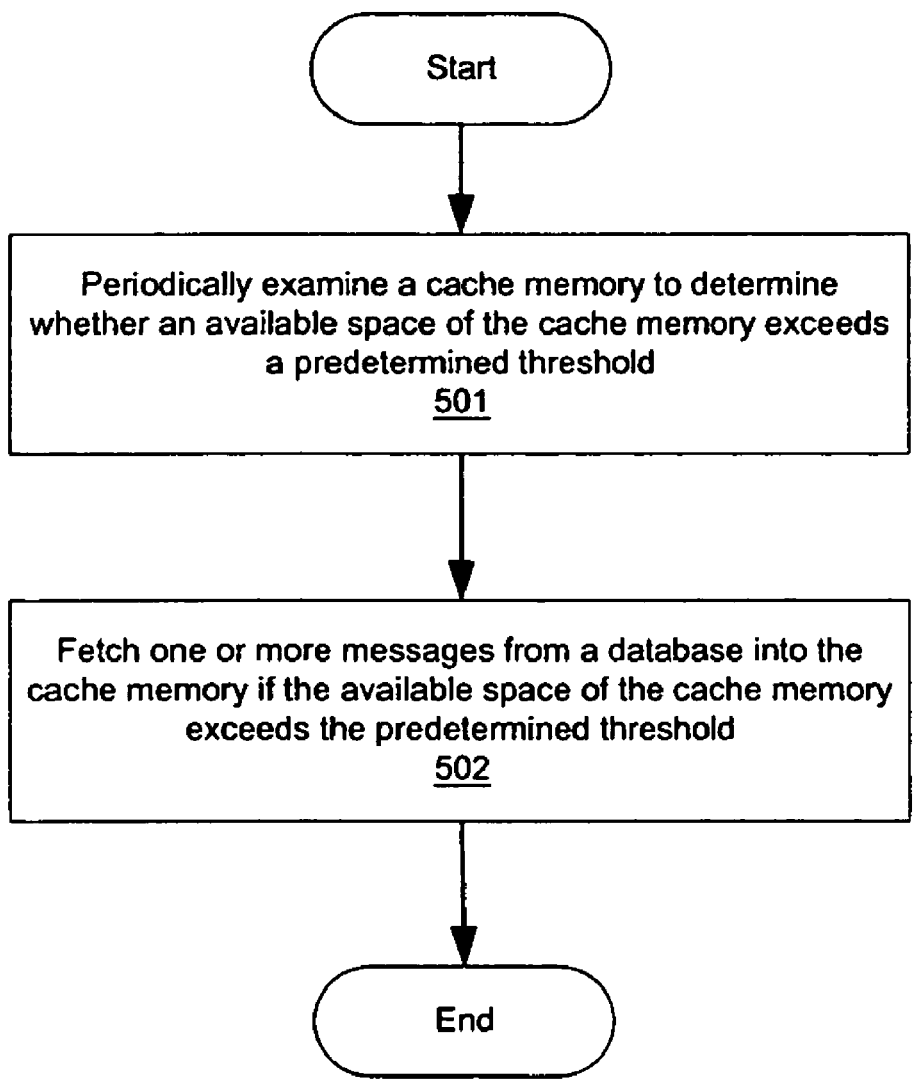
FIG. 5 is a flow diagram illustrating an exemplary process for processing messages in an enterprise messaging system, according to one embodiment of the invention.

FIG. 5 is a flow diagram illustrating an exemplary process for processing messages in an enterprise messaging system, according to one embodiment of the invention. Exemplary process 500 may be performed by a processing logic that may comprise hardware (circuitry, dedicated logic, etc.), software (such as is run on a dedicated machine), or a combination of both. For example, the exemplary process 400 may be performed via the fetching thread 314 of FIG. 3A.

Referring to FIG. 5, at block 501, the processing logic periodically examines the repository (e.g., repository 305 of FIG. 3A) to determine whether an available space of the repository exceeds a predetermined threshold. If so, at block 502, the processing logic fetches one or more messages (e.g., persistent or non-persistent messages) from the database (e.g., database 304 of FIG. 3A) into the repository. As a result, the repository may be utilized more efficiently.

It will be appreciated that the exemplary processes 400 and 500 may be performed via separate threads substantially concurrently. Alternatively, the exemplary processes 400 and 500 may coordinate with each other. For example, a single thread may handle the operations of exemplary processes 400 and 500.

Exemplary Message Maintenance

Figure 6:
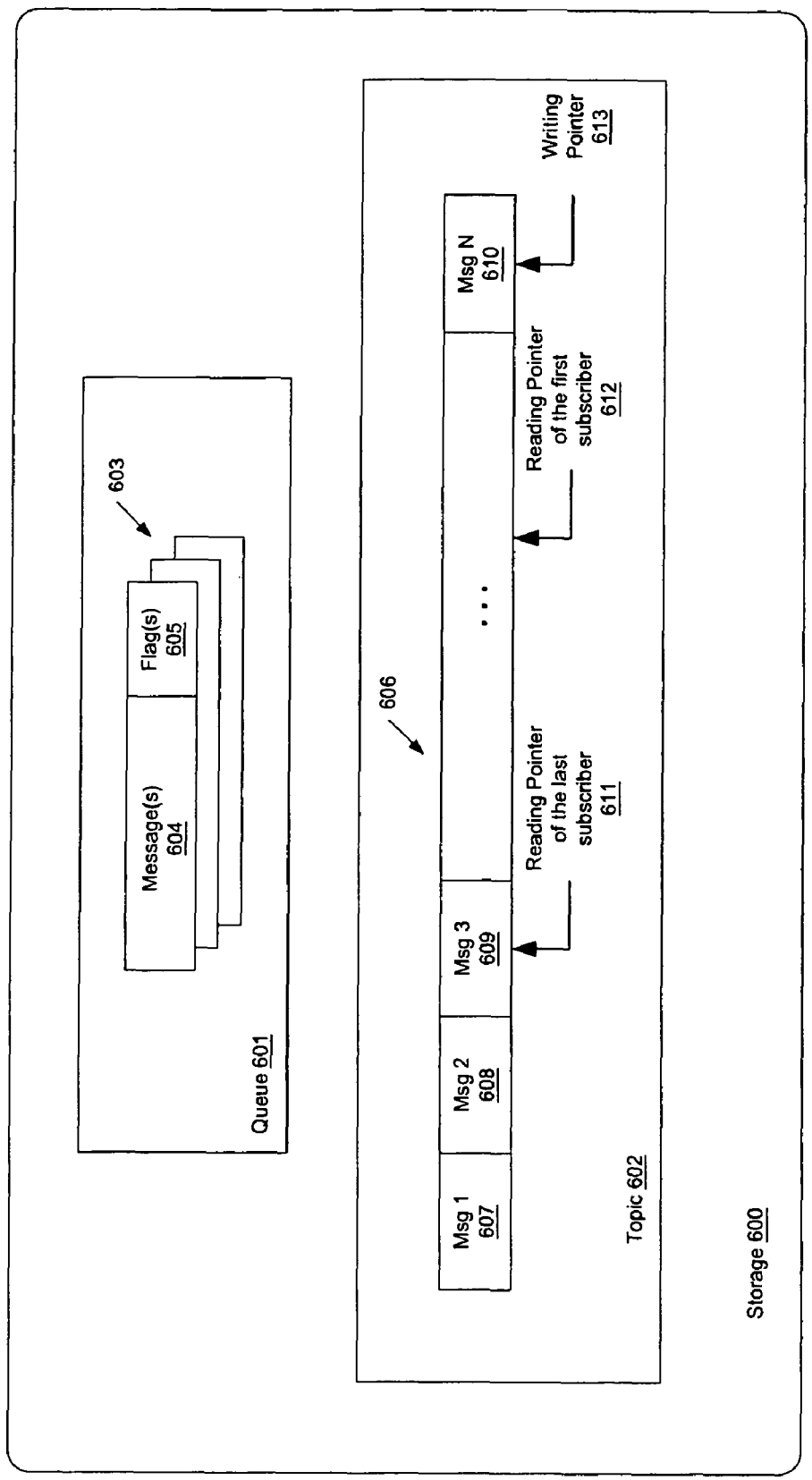
FIG. 6 is a block diagram illustrating an exemplary message configuration in a storage, according to one embodiment of the invention.

Referring to FIG. 3A, a maintenance thread 315 is used to maintain the message stored in the database 304. According to one embodiment, the messages stored in database 304, which have been delivered to the consumers/subscribers or have expired, may be deleted from the database 304 by the maintenance thread. FIG. 6 is a block diagram illustrating an exemplary message configuration in a storage, such as database 304 of FIG. 3A, according to one embodiment of the invention. Referring to FIG. 6, exemplary storage 600 includes, but is not limited to, a queue 601 to store one or more messages 603 for the PTP messaging environment and a topic 602 to store one or more messages associated with a topic and subscribed to by one or more subscribers.

According to one embodiment, when a message is no longer needed, the message may be deleted from the storage 600 via, for example, the maintenance thread 315 of FIG. 3A. For example, a message may no longer be needed when the message has been delivered to all consumers and/or subscribers and an acknowledgement has been received from the corresponding consumers/subscribers. In one embodiment, when an acknowledgment is received from a consumer, the corresponding message may be marked in the queue 601.

For example, when message 604 has been delivered to a consumer in a point-to-point (PTP) environment and an acknowledgment is received for such a delivery, one or more flags 605 associated with the message 604 may be marked with a predetermined known value, such as, for example, a logical value of one. As a result, when a maintenance thread (also referred to as a housekeeping thread) is scheduled, the maintenance thread examines the flag 605 to determine whether the message 604 may be deleted. If the value of flag 605 matches a predetermined known value, the message 604 may be deleted. The flag 605 may be a part of the message 604 (e.g., embedded within the body of message 604). Alternatively, flag 605 may be separately maintained by the storage 600 (e.g., a separate array of flags, etc.) Other configurations apparent to those with ordinary skill in the art may also be utilized.

In one embodiment, under the pub/sub environment, the topic 602 may include a buffer 606 to store one or more messages 607-610 associated with the topic 602. The buffer 606 may be a FIFO (first-in-first-out) circular buffer. That is, according to one embodiment, the new messages are stored at a location referenced by a writing pointer 613. Upon completing the writing, the writing pointer 613 may be updated by incrementing the address of the writing pointer 613 equivalent to the size of the messages written. The message may be written to the buffer 606 by a writing thread such as the saving thread 313 of FIG. 3A.

Meanwhile, the messages stored in the buffer 606 may be read and delivered to one or more subscribers. Since multiple subscribers may be involved, the timing of reading the messages may vary, particularly, when some of the subscribers are durable subscribers. As a result, according to one embodiment, a first reading pointer 612 reading messages on behalf of a first subscriber (e.g., a leading subscriber) and a last reading pointer 611 reading messages on behalf of a last subscriber (e.g., a trailing subscriber) may be maintained. In the example shown in FIG. 6, the leading subscriber is reading a message from a location indicated by the first pointer 612, while the last subscriber is reading a message from a location indicated by the last pointer 611. Other subscribers may be reading messages between the addresses pointed to by the pointers 611 and 612. Note that some or all of the messages stored in queue 601 and topic 602 may also be stored in a database for the purposes of persistence.

In this example, messages 607 and 608 have been delivered (e.g., read) to all of the subscribers and the messages 607 and 608 may not be needed any more. As a result, messages 607 and 608 may be deleted by, for example, a maintenance utility, similar to maintenance thread 315 of FIG. 3A. The maintenance thread may delete any messages (e.g., messages 607 and 608) whose addresses are below the last reading pointer 611.

In one embodiment, the maintenance thread may maintain the information about both the durable and the non-durable subscribers. It analyzes the reading pointers kept in memory (for the non-durable subscribers and the durable subscribers that are currently active) and the information on the messages last acknowledged by the durable subscribers (even the non-active ones), which is kept in the database. From these two sources, it evaluates which messages are no longer needed (e.g., those where all reading pointers and all DB acknowledgements are already further in the order). Those messages are then deleted. But there may be a merge between the data from the database and the data from the memory.

Figure 7:
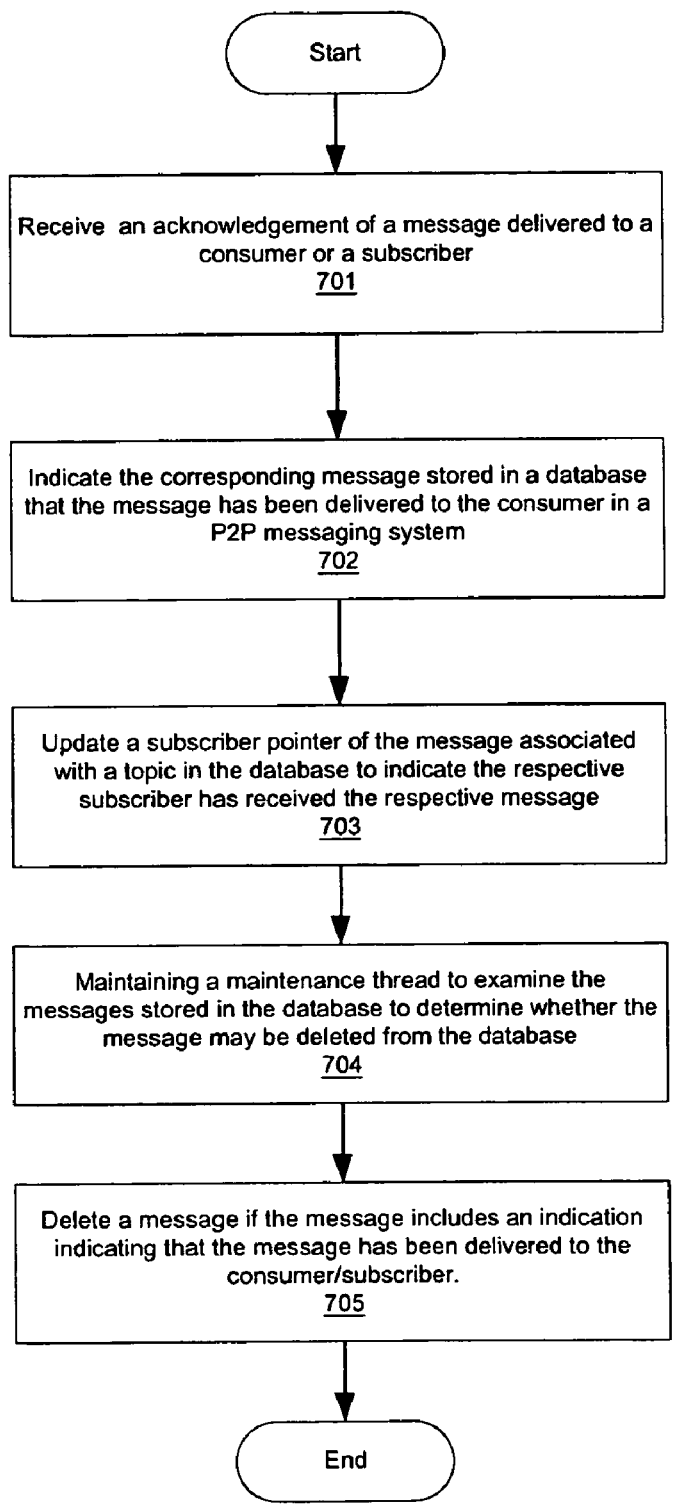
FIG. 7 is a flow diagram illustrating an exemplary process for maintaining the messages in an enterprise messaging system, according to one embodiment of the invention.

FIG. 7 is a flow diagram illustrating an exemplary process for maintaining the messages in an enterprise messaging system, according to one embodiment of the invention. Exemplary process 700 may be performed by a processing logic that may comprise hardware (circuitry, dedicated logic, etc.), software (such as is run on a dedicated machine), or a combination of both. For example, the exemplary process 700 may be performed via the maintenance thread 315 of FIG. 3A.

Referring to FIG. 7, at block 701, after a message has been delivered to a consumer in a PTP messaging environment or to a subscriber in a pub/sub environment, an acknowledgment is received. Upon receiving the acknowledgement, at block 702, the processing logic indicates the corresponding message in the database that the message has been delivered to the consumer/subscriber. In the case of a PTP message, a flag of the corresponding message may be set to a predetermined known value. For example, flag 605 of the message 604 may be set to a known value, such as, for example, a logical one. In the case of a pub/sub message, at block 703, a reading pointer associated with the subscriber may be updated. This reading pointer may be maintained in the memory and is updated for both types of subscribers. For durable subscribers, additionally the acknowledgement information may be updated in the database. For example, assuming the respective subscriber is associated with the last pointer 611, the pointer 611 may be updated by moving (e.g., incrementing or decrementing, depending upon the location of the circular buffer 606) towards to the reading pointer 612.

At block 704, the processing logic via, for example, a maintenance thread, examines the messages, including those in PTP and pub/sub environments, to determine whether the messages may be deleted from the database. If a message includes an indication indicating that the message has been delivered to the consumer/subscriber, at block 705, the message may be deleted from the database. Also, all expired messages are deleted. Together with the message, the information about their expiry date/time is stored. This information is used by the maintenance thread. In one embodiment, the operations in blocks 701-703 and the operations in blocks 704-705 may be performed by separate threads independently. Other operations may also be performed while still complying with the underlying principles of the invention.

Exemplary Durable Subscriptions

As mentioned above, durable subscriptions may be used to receive messages when the durable subscriber is not active. Durable subscriptions offer the reliability of queues to the publish/subscribe message domain. Typically, a durable subscriber registers a durable subscription with a unique identity that is retained by a JMS provider. Subsequent subscriber objects (also referred to as subscription sessions) with the same identity resume the subscription in the state in which it was left by a previous subscriber (e.g., subscription session). If a durable subscription has no active subscriber, the JMS provider retains the subscription's messages until they are received by the subscription or until they expire.

To establish a unique identity of a durable subscriber, a client ID for the connection, a topic name, and a subscription name for the subscriber are required. A user may set the client ID either programmatically or administratively for a client-specific connection factory using an administration tool.

After using the connection factory to create the connection and the session, a user may create a durable subscriber for the established connection and the session. In a Java environment, for example, a durable subscriber may be created using createDurableSubscriber( ) method in a Java environment corresponding to an established connection and session. The durable subscriber becomes active once the connection is started. Subsequently, the durable subscriber (e.g., subscription session) may be closed via, for example, a "close" method in a Java environment.

The JMS provider stores the messages published to the topic, as it would store messages sent to a queue. If the program or another application creates another durable subscriber (e.g., another subscription session) using the same connection factory and client ID, the same topic, and the same subscription name, the subscription is reactivated, and the JMS provider delivers the messages that were published while the subscriber was inactive. To delete a durable subscription, the currently opened durable subscription session or subscriber has to be closed and the durable subscription can then be terminated via, for example, an "unsubscribe" method in a Java environment. The "unsubscribe" method deletes the state that the provider maintains for the subscriber.

FIGS. 8A and 8B illustrate the difference between a non-durable and a durable subscriber. With a non-durable subscriber, the subscriber and the subscription are conterminous and, in effect, identical. When a non-durable subscriber is closed, the subscription ends as well. Any messages published to the topic between the time of the first close and the time of the second create are no consumed by a non-durable subscriber, as shown in FIG. 8A, where the subscriber consumes messages 1-2 and 5-6 while messages 3 and 4 are lost.

With a durable subscriber, the subscriber or the subscription session can be closed and recreated, but the subscription continues to exist and to hold the messages until the subscription is terminated by, for example, an "unsubscribe" method in a Java environment, as shown in FIG. 8B. Referring to FIG. 8B, the messages published while the subscriber is closed are received when the subscriber is created again. Thus, even though messages 3 and 4 arrive while the subscriber is closed, they are not lost.

When a durable subscription session or a durable subscriber is created, a variety of attributes may also be specified. One of the attributes is a "NoLocal" attribute. When this attribute is set for a durable subscription/subscriber, the local messages are not received for the respective connection. Generally, the noLocal attribute means that a subscriber is not interested in messages published by a publisher, which is created using the same connection. For non-durable subscribers, this can easily be realized. Durable subscribers are more difficult, because they can log on and off several times, using different connections.

For example, a durable subscriber is subscribed to a topic using a connection C1. The noLocal attribute is not set. A publisher, also created using connection C1, sends four messages (1, 2, 3, 4) to the topic. Another publisher, created using connection C2, sends two messages (5, 6) to the topic. The durable subscriber receives messages 1 and 2 and then disconnects. Later the durable subscriber returns using a connection C3, this time with the noLocal flag set. The durable subscriber should not receive messages 3 and 4, because they were sent over the same connection (e.g., connection C1) as the durable subscriber used (at the time of the sending of the messages).

For example, referring to FIG. 8B, for the purpose of illustration, the durable subscription session 801 (e.g., also referred to as connection) is created and the subscription session 801 is closed after receiving messages 1 and 2 and producing messages 3 and 4. Subsequently, another durable subscription session 802 is created with or without a "NoLocal" attribute, the subscription session 802 should not receive messages 3 and 4 since these messages were generated from the same connection which the subscriber was created on, although via different subscription sessions. Accordingly, a message provider (e.g., a JMS provider) has to keep track what messages are generated from the same subscriber even though they are generated via different subscription sessions.

Figure 9:
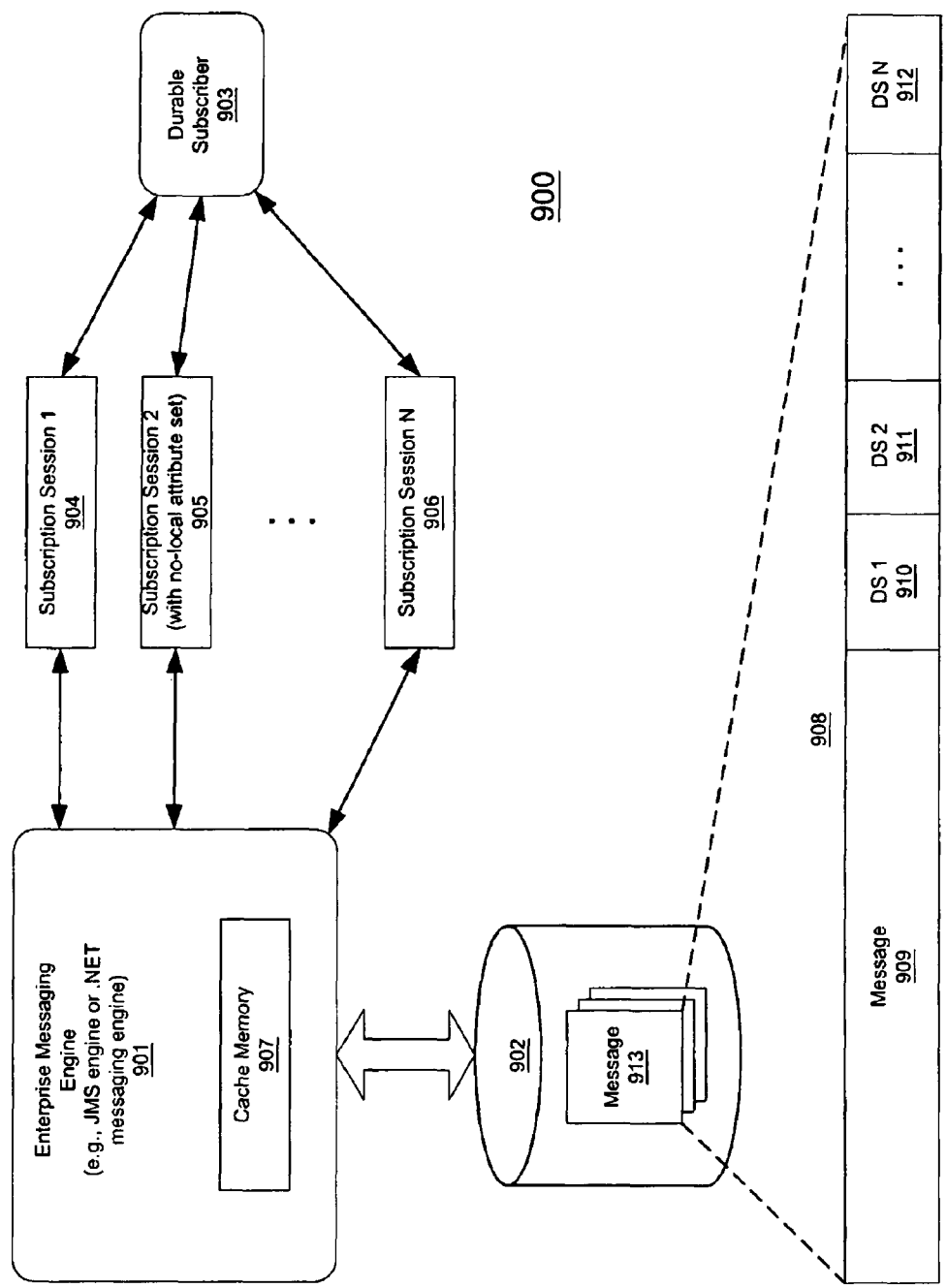
FIG. 9 is a block diagram illustrating an exemplary messaging system for durable subscriptions according to one embodiment of the invention.

FIG. 9 is a block diagram illustrating an exemplary messaging system for durable subscriptions according to one embodiment of the invention. Referring to FIG. 9, exemplary system 900 includes, but is not limited to, an enterprise messaging engine 901 for receiving durable subscriptions from a subscriber 903. Subscriber 903 may create a durable subscription, similar to the durable subscription 803 of FIG. 8. The durable subscription may include multiple durable subscription sessions or durable subscribers 904-906, similar to the durable subscription sessions 801 and 802 of FIG. 8. However, for a given subscriber 903, only one of the subscription sessions 904-906 may be active. In addition, the exemplary system 900 includes a cache memory 907 and a database 902 to store durable messages 913 (also referred to as messages enhanced with the IDs of durable subscribers).

According to one embodiment, each of the messages 913 includes the identification of the durable subscribers that share the same connection as the one over which it was sent. For example, message 908 includes message 909 and one or more durable subscriber IDs 910-912 that share the same connection as the message 908 published. In one embodiment, the durable subscriber IDs stored within a message may be used to determine whether the respective message may be delivered to a specific durable subscriber.

For example, according to one embodiment, subscriber 903 creates a subscription session 904 and a producer using the same connection produces some messages to be published by the enterprise messaging engine. The messages may be stored in database 902 and/or the cache memory 907. Thereafter, the subscription session 904 is closed without terminating the durable subscription (e.g., unsubscribe). Subsequently, the subscriber 903 creates another subscription session 905 with a "NoLocal" attribute using the same connection. In one embodiment, the ID of subscriber 903 is stored within the message sent over the same connection as the subscriber 903. For the purpose of illustration, it is assumed that ID 911 of message 908 includes an ID of the subscriber 903 and the message 908 is produced via subscription 904 from a producer via the same connection.

When the subscriber 903 creates subscription session 905, the messaging engine may examine message 908 to determine whether the message was sent over the same connection the subscriber 903 by, for example, examining whether the message 908 includes an ID of the subscriber 903. In this example, message 908 includes ID 911 of the subscriber 903. As a result, the message 908 would not be delivered to the subscriber 903 via subscription session 905.

According to another embodiment, a message associated with a topic, which is also a persistent message stored in the database 902 may include all of the durable subscribers' IDs currently subscribing to the topic with a durable subscription (e.g., durable subscription 803 of FIG. 8B), although some of the durable subscribers may not be active. For the purpose of illustration, it is assumed that message 908 is subscribed to by multiple durable subscribers having respective IDs 910-912 stored within the message 908. Since the message 908 is currently being subscribed via one or more durable subscriptions, the message 908 has to be retained by the system, even though none of the durable subscribers is active (e.g., all of the subscription sessions 801 and 802 are closed while the durable subscription 803 remains opened).

According to one embodiment, a maintenance thread, such as, maintenance thread 315 of FIG. 3A may examine the information in the database on the durable subscribers to determine whether the messages may be deleted from the database 902. In this example, the maintenance thread may examine the durable subscriber IDs 910-912 stored within the message 908 to determine whether message 908 may be deleted. The messages are deleted once they have been consumed by all durable subscribers in the above case. Alternatively, the maintenance thread may independently maintains a record that indicates which durable subscribers are interested in what messages. As long as at least one durable subscriber who is interested in a message is still alive, that message would not be deleted by the maintenance thread.

When a durable subscription has been terminated (e.g., unsubscribed), the corresponding durable subscriber ID may be updated or marked as unsubscribed, etc. After unsubscribe the durable subscription record, which indicates the last sent messages to the corresponding durable, is deleted from the database and therefore, the maintenance thread will delete all messages that have been kept only for this subscriber.

Figure 10:
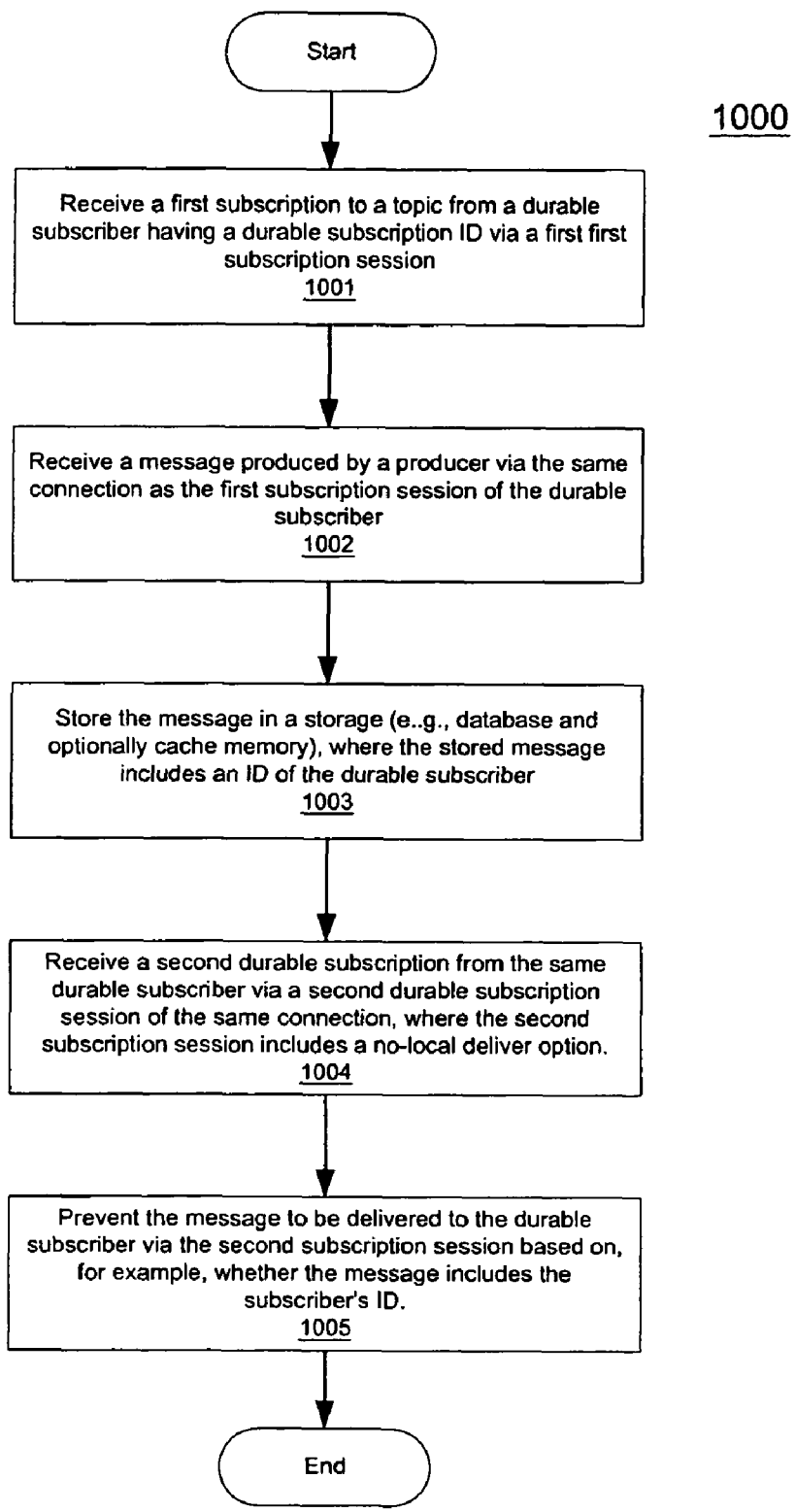
FIG. 10 is a flow diagram illustrating an exemplary processor for handling durable subscription of an enterprise message, according to one embodiment of the invention.

FIG. 10 is a flow diagram illustrating an exemplary processor for handling durable subscription of an enterprise message, according to one embodiment of the invention. Exemplary process 1000 may be performed by a processing logic that may comprise hardware (circuitry, dedicated logic, etc.), software (such as is run on a dedicated machine), or a combination of both. For example, the exemplary process 1000 may be performed via the saving thread 313 and/or the receiving thread 311 of FIG. 3A.

Referring to FIG. 10, at block 1001, a first subscription is received from a durable subscriber having a durable subscription ID via a first subscription session of a conenction. At block 1002, a message is received to be published from a producer via the same connection as the first subscription session of the durable subscriber. At block 1003, the message is stored in a storage, where the stored message includes the durable subscriber ID since the producer and the durable subscriber share the same connection. After the first subscription session has been closed, subsequently at block 1004, a second subscription session from the same durable subscriber is received via the same connection, where the second subscription session includes a "NoLocal" attribute. At block 1005, the message is prevented from being delivered to the subscriber via the second subscription session based on, for example, whether the message includes the ID of the subscriber. In one embodiment, if the first message includes an ID of the subscriber, the first message will not be delivered to the subscriber via a subscription session having a "NoLocal" attribute set. Other operations may also be performed while complying with the underlying principles of the invention.

Figure 11:
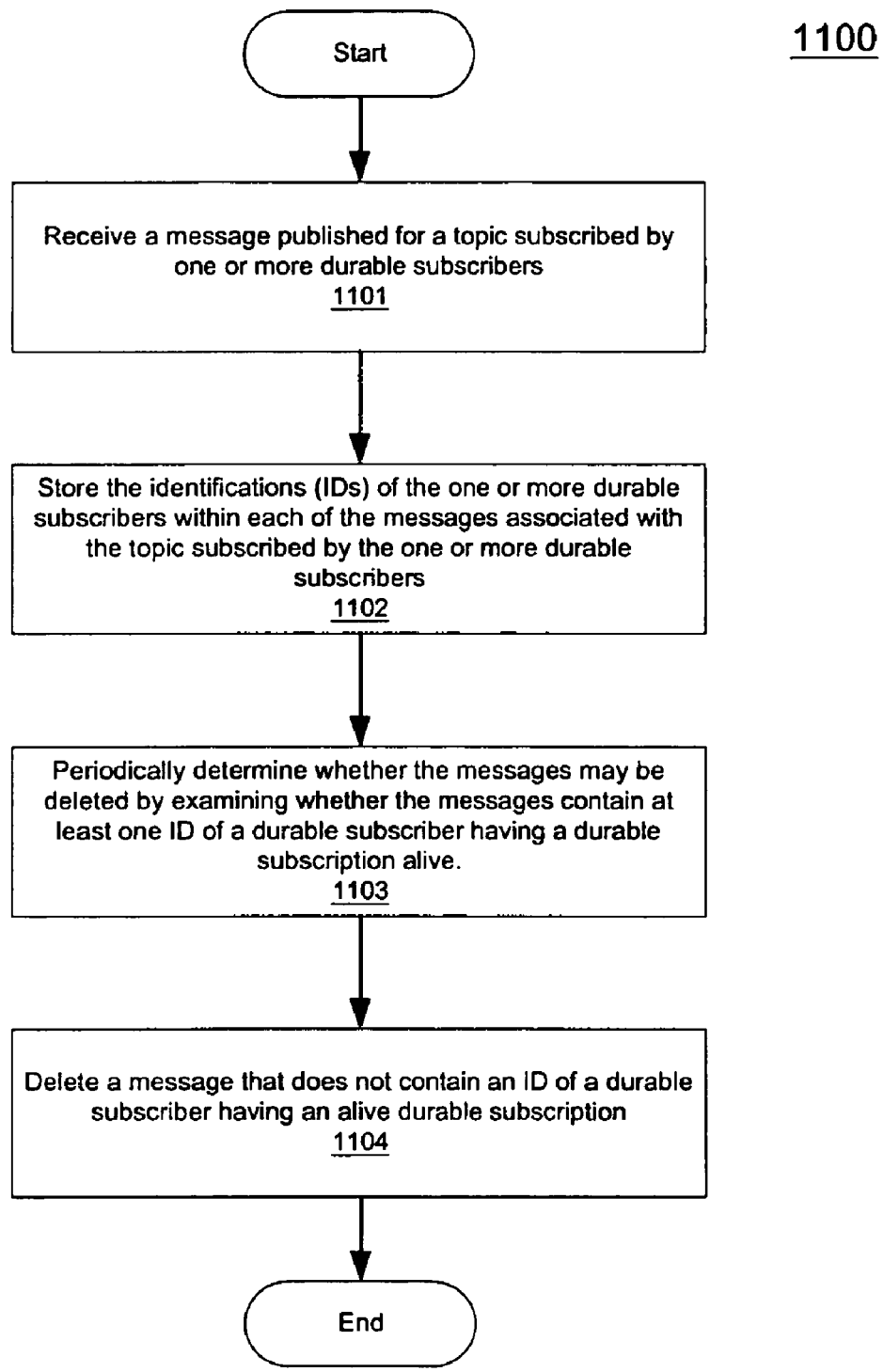
FIG. 11 is a flow diagram illustrating an exemplary processor for handling durable subscription of an enterprise message, according to one embodiment of the invention.

FIG. 11 is a flow diagram illustrating an exemplary process for handling durable subscription of an enterprise message, according to one embodiment of the invention. Exemplary process 1100 may be performed by a processing logic that may comprise hardware (circuitry, dedicated logic, etc.), software (such as is run on a dedicated machine), or a combination of both. For example, the exemplary process 1100 may be performed via the maintenance thread 315 of FIG. 3A.

Referring to FIG. 11, at block 1101, a message published by a producer is received, where the message is associated with a topic subscribed to by one or more durable subscribers. At block 1102, the message is stored in a storage (e.g., database and/or optional cache memory) with the IDs of the one or more durable subscribers. At block 1103, the processing logic via, for example, a maintenance thread, periodically determines whether the message may be deleted. In one embodiment, the processing logic examines whether the message includes at least one ID of a durable subscriber that has a durable subscription alive (e.g., has not unsubscribed yet). At block 1104, the message is deleted if the message does not contain an ID of a durable subscriber having an alive durable subscription. Other operations may also be performed while still complying with the underlying principles of the invention.

Exemplary Queuing Engine

Figure 12A:
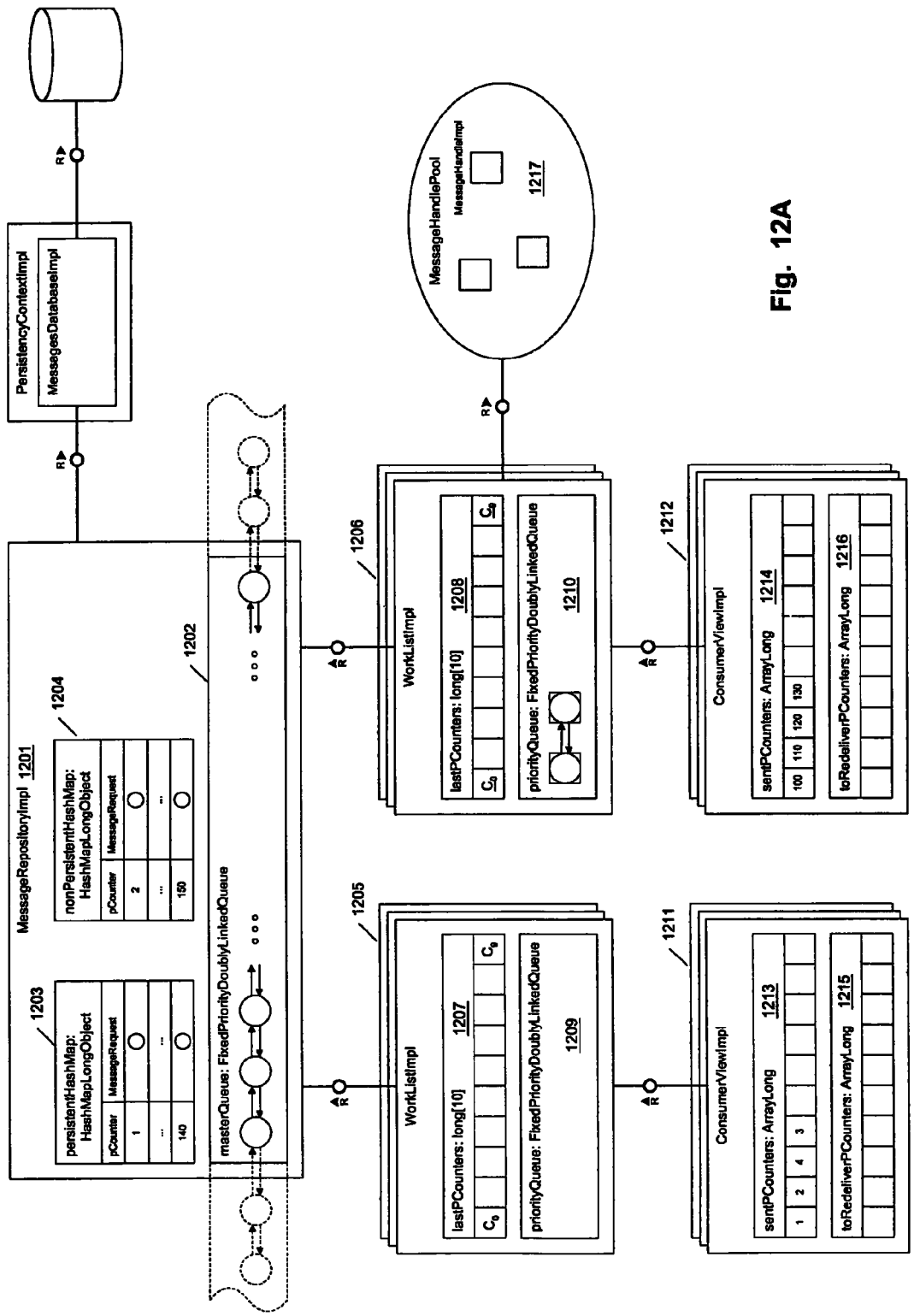
FIG. 12A is a block diagrams illustrating an exemplary queuing engine for a publish/subscribe system, according to one embodiment of the invention.

FIG. 12A is a block diagram illustrating an exemplary queuing engine for a publish/subscribe system, according to one embodiment of the invention. Referring to FIG. 12A, the exemplary queuing engine includes, but is not limited to, a message repository 1201, one or more work lists 1205 and 1206, and one or more consumer view objects 1211 and 1212.

In one embodiment, the message repository 1201 includes, but is not limited to, persistent hash map 1203, a non-persistent hash map 1204, and a master queue 1202. The persistent hash map 1203 and the non-persistent hash map 1204 forms a message directory. The message directory contains the message request objects that are stored in the master queue 1202 as well as those currently being processed. The pCounter of the message is used as the hash map key. The pCounter is the ordering criterion for messages. It is a combination of the inverted priority (e.g., the higher a message's priority, the lower the pCounter) and a counter that is assigned when the message is sent to the queuing engine. The pCounters are unique per destination. According to one embodiment, the message directory serves the following purposes:

It provides access to the message objects via the pCounter.
It is used to avoid duplicate creation of objects for the same JMS messages.
Whenever a message is read from the database, the directory is first checked for an already-existing related message object.

In one embodiment, master queue 1202 is a representation of a part of the message queue in memory. Within the master queue, the messages are sorted by their pCounters. When a new message arrives that has a higher priority than the last message in the master queue, it is inserted to the appropriate position.

In one embodiment, each of the worklists 1205 and 1206 includes a last pCounter 1207 and 1208, and queues 1209 and 1210 respectively. A work list (e.g., worklists 1205 and 1206) represents the part of the message queue currently processed by a consumer, while the master queue is a commonly used message cache which respects the message order. The work list uses this cache, but it may also read directly from the database. Since topic consumers receive and process the messages independently of each other, there is a separate work list object assigned to each consumer.

A work list contains an array of the last pCounters (e.g., pCounter 1207 and 1208) read for each priority. The array can be considered a "cursor" indicating the current position within the message queue. It can point to a message within the master queue as well as to any message outside.

Each work list has its own priority queue (e.g., queues 1209 and 1210) which is used to buffer messages that need to be delivered to the consumer but are not contained in the master queue. The objects within this queue are message handles (e.g., relatively small objects) which contain a reference to the actual message. The message handles are taken from a message handle pool 1217 when required and returned later.

Consumer view objects 1211 and 1212 represent the subset of the message queue specific to this consumer. They are used by the topic agent and interact in turn with their associated work lists. The consumer views are responsible for the redelivery logic. Therefore, they keep track of the unacknowledged sent messages 1213 and 1214 as well as the messages to be redelivered, by maintaining arrays of pCounters 1215 and 1216.

In one embodiment, the master queue is updated with any higher prioritized messages that may arrive. Since the work lists use the master queue as a message buffer, these messages are immediately visible for all of them. Outside the master queue, the work lists use their own priority queues to buffer the messages to be delivered.

The topic agent delivers the messages to the different consumers in a cyclical way. According to one embodiment, it constantly loops over the list of consumers registered for the destination. For each consumer, it retrieves the next message from the queuing engine and delivers it. To optimize performance, the agent keeps track of the consumers for which there are no further messages available. It moves them to a list of "passive" consumers, thereby excluding them from the delivery process until further notice. On the arrival of a new message for a passive consumer, however, the consumer has to be returned to the agent's active working list. It is the task of the queuing engine to notify the agent of a new message arriving for a passive consumer. The queuing engine keeps a list of the passive consumers. When a new message arrives, it checks the message selectors of all these consumers and, if the selection criterion is satisfied, the queuing engine updates the work list and notifies the topic agent of the new message for the respective consumer.

In one embodiment, the queuing engine keeps those messages in memory that are currently stored in the master queue as well as those stored in at least one work list. The memory consumption can be controlled by defining an upper limit for the size of the master queue as well as for each individual work list. New incoming messages are generally enqueued in the master queue. If the size limit for the master queue is exceeded by this operation, messages are removed from either end of the master queue.

The algorithm according to which messages are removed from the queue is crucial for its quality as a message cache (e.g., its hit ratio). Typically, the master queue should contain those messages that have to be processed next by most of the consumers. As a first approach, messages are removed from the "left" end of the master queue until the memory consumption falls below the master queue's size limit. Messages are deleted from the message directory if they are neither stored in the master queue nor in any of the work list buffers. The number of work list buffers storing a message is kept in a reference counter within the message.

In one embodiment, messages that exceed a certain size limit are considered "big" messages and undergo a special treatment in order to save memory. Although it is not always true, it is assumed that the biggest part of the message is its body, so that memory can be saved by loading the message body on demand only. The repository defines a separate size limit for the bodies of big messages that are kept in the master queue. When adding a message to the master queue, this size limit is checked and, if exceeded, the message's body is cleared. The message header and properties, however, remain in memory to allow the message selector to operate. Before the message is added to a consumer's work list, the message body is read from the database. Messages that are stored in any work list buffer therefore always contain the complete message data.

A message can be removed from the database in the following situations:

It is received and acknowledged by all non-durable subscribers that had an interest in the message, and
There is no durable subscriber who has to process this message, i.e. whose last acknowledged pCounter is lower than the pCounter of the message.

A message can be removed independently of whether it still resides in memory. Since it is already completely processed, there is no need to access the message data again, which may have been removed from the database. The message will be removed from memory by the regular memory management.

Messages that are sent again to the same consumer (for example because the client recovered the session) may be marked with a redelivery flag, such as, for example, the JMSRedelivered flag. While the attribute can be maintained for non-durable subscribers, more efforts may be spent for durable subscribers. The redelivery information needs to be set correctly even in case of a provider failure. To achieve this, according to one embodiment, the pCounter of the last delivered message is stored in the database for each durable subscriber. As a result, there may be an additional database update for each message sent to a durable subscriber.

A delayed consumer is a consumer that is already closed by the client application, but whose corresponding objects are still present in the JMS provider. In this context, it is relevant that the consumer view object is maintained. This enables the acknowledge or recover operation to finish without errors. Thereafter, the delayed consumer is closed.

For durable subscribers, the situation is more complicated. The durable subscriber can log on again, while there are still unacknowledged messages pending from the previous activity. There can even be a chain of delayed consumers, in case the durable subscriber logs on and off repeatedly, and leaves messages in an undefined state. The durable subscriber must be aware of its delayed consumer history, so that the messages can be redelivered correctly in case the session is recovered.

Figure 12B:
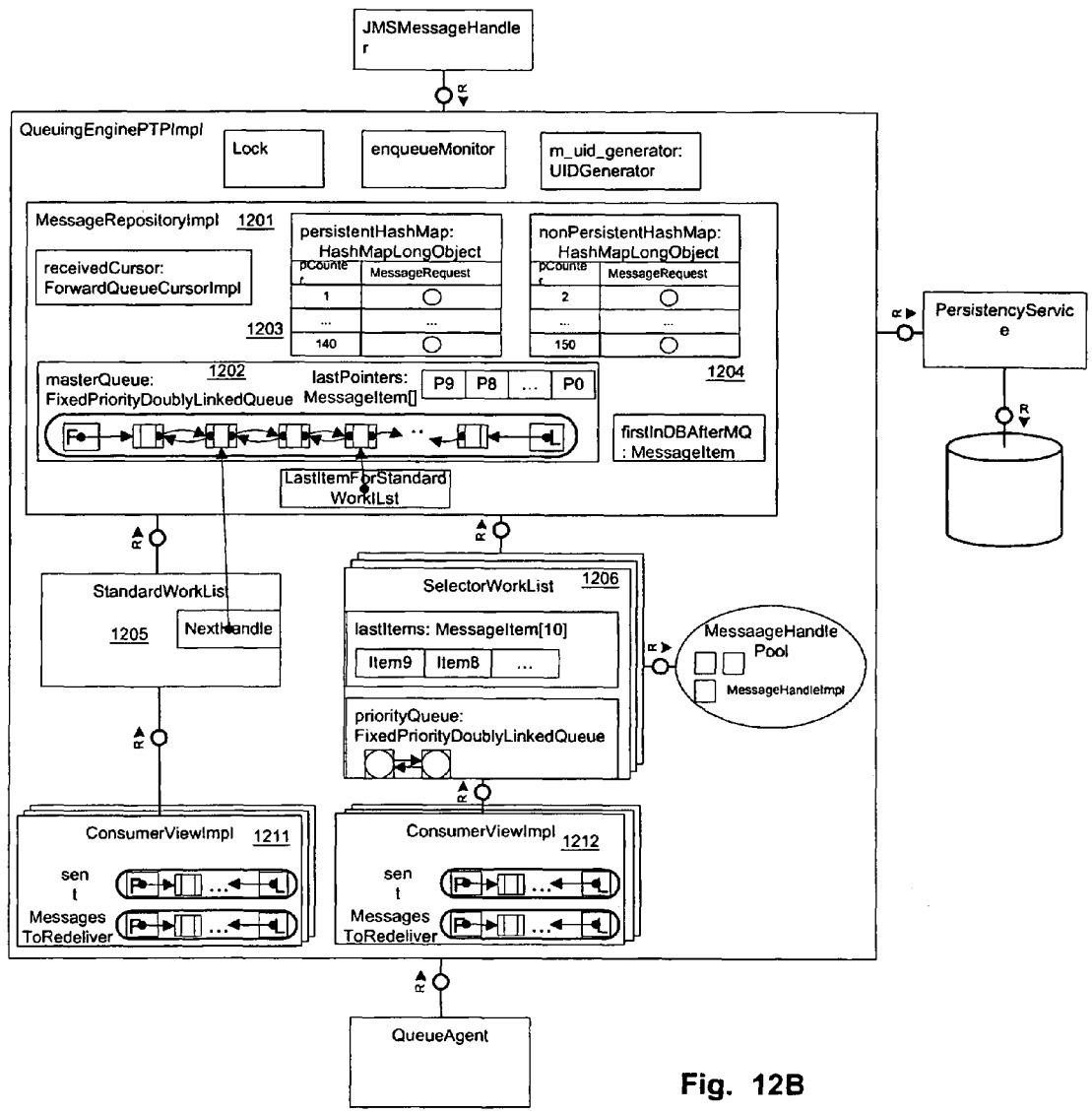
FIG. 12B is a block diagrams illustrating an exemplary queuing engine for a PTP system, according to one embodiment of the invention.

FIG. 12B is a block diagram illustrating an exemplary queuing engine for a PTP system, according to one embodiment of the invention. Similar to the configuration shown in FIG. 12A, the queuing engine includes, but is not limited to, MessageHandlePool, ConsumerViews 1211-1212, MasterQueue 1202, PersistentHashMap 1203, NonPersistentHashMap 1204.

In addition, according to one embodiment, there can be one StandardWorklist, which serves consumers without selectors and/or several SelectorWorklist's for the consumers with selectors. The StandardWorklist does not keep messages in priorityQueue, but pointer to the certain message in MasterQueue that is to be consumed next. When message is sent to the consumerView the pointer of the StandardWorklist is moved to point to the next message in the masterQueue.

According to certain embodiments, there can be several ConsumerViews for consumers without selector, connected to one StandardWorklist and several ConsumerViews for consumers with the same selector connected to one SelectorWorklist. Since message may be consumed only once, they share the same buffer in the Worklists. In one embodiment, MessageItem that represents message in the QueueingEngine has a flag such as in Process, which indicates that message is sent to the consumerView. This flag is checked to send the message to only one consumer.

Exemplary Messaging Communication Protocol

According to one embodiment, the enterprise messaging engine may communicate with other components via a specific protocol. Such a protocol may also be used by the messaging server to communicate with other types of clients (e.g., non-Java clients), in addition to the Java clients. For example, referring to FIG. 3A, message server 305 may communicate with its clients, such as, for example, client 301, dispatch node 302, server nodes 303 and 306, etc. Although these clients may communicate with the message server 305 using standard APIs, such as Java JMS APIs or NET message APIs. In addition, the various clients and servers may employ an encapsulation protocol to encapsulate the enterprise messages (e.g., JMS messages) to communicate with their intended recipients.

In one embodiment, the messages may be serialized into a message stream according to the messaging protocol and transmitted over to the intended recipients. As a result, from one node to another node, multiple messages may be serialized into a message stream and transmitted over to the receiving node. As a result, the client may not need to be a specific enterprise-compatible client (e.g., Java clients). Any client may use such a protocol to communicate with the message server 305. For example, a NET client may be able to communicate with a Java recipient via the protocol. In addition, the protocol may also be used by the clients within the message server 305.

According to one embodiment, in a Java computing environment, the messaging protocol is based on different Java classes which may hold a specific information. For example, CreateConnectionRequest represents a client call for creating a new JMS connection to a JMS server, while CreateConnectionResponse represents the server response to the client's request, including a connection ID, etc. The JMS provider may include a variety of packet classes for any communications between the client and the server, some of which may include, but are not limited to, the following:

CreateSessionRequest/Response
CreateProducerRequest/Response
CreateConsumerRequest/Response
MessageRequest/Response—the class which holds a JMS message In one embodiment, each of the foregoing protocol classes may be wrapped with a byte array that holds substantially all the information as needed, such as, for example, connection ID, session ID, producer ID, consumer ID, message properties, and/or message body, etc. When a client is using JMS resources from the JMS API, the information is serialized into a byte array and the byte array is transmitted to the server. The byte array is then deserialized at the recipient to retrieve the JMS messages and other information, and the recipient performs accordingly.

Figure 13D:
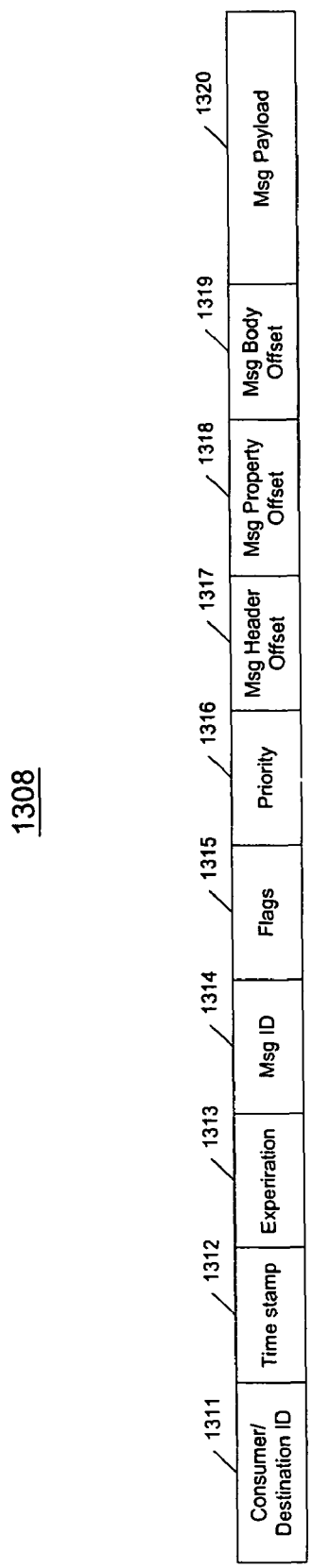

FIGS. 13A-13D are block diagrams illustrating exemplary packets of a messaging protocol according to one embodiment of the invention. Referring to FIG. 13A, the exemplary packet 1300 includes, but is not limited to, a size field 1301, a type field 1302, a flag field 1303, a request ID field 1304, and a payload field 1305. The size field 1301 may be used to specify the size of the packet 1300. In one embodiment, the size field 1301 is 4 bytes long. The type field 1302 may be used to specify the type of the packet 1300, such as, for example, CreateSessionRequest/Response, etc. In one embodiment, the type field 1302 is 1-byte long. The flag field 1303 may used to store one or more flags for the operations. In one embodiment, the flag field 1303 is a 1-byte long. The request ID field 1304 may be used to store the ID of the current request, in order to allow a client to identify whether such a packet is a response to a request the client previously sent. For example, the server may set the same request ID in response to a request received from the client. In one embodiment, the request ID field 1304 is 8-bytes long. Thereafter, the payload 1305 may be used to store the payload of the packet 1300, including any enterprise messages encapsulated within the packet 1300. The size of the payload 1305 may vary depending upon the type of the packet.

The layout of the payload 1305 may vary depending upon the type of the packet. FIG. 13B is a block diagram illustrating an exemplary embodiment of message payload 1305. The exemplary message payload 1305 includes, but is not limited to a session ID field 1306, a destination ID field 1307, and a message field 1308. The session ID field 1306 and the destination ID field 1307 may be used to identify the session and the destination that the packet 1300 is transmitted, while the message field 1308 may used to carry the actual enterprise message (e.g., a JMS message or a .NET message). In one embodiment, the session ID field 1306 is 4-bytes long and the destination ID field 1307 is 4-bytes long. The size of the message 1308 may vary depending upon the type of the packet. Other configurations may be employed while still complying with the underlying principles of the invention.

FIG. 13C is a block diagram illustrating an alternative exemplary embodiment of message payload 1305. The exemplary message payload 1305 includes, but is not limited to a connection ID field 1309, a session ID field 1310, and a message field 1308. The connection ID field 1309 and the session ID field 1310 may be used to identify the connection and the session of the connection that the packet 1300 is transmitted, while the message field 1308 may used to carry the actual enterprise message (e.g., a JMS message or a NET message). In one embodiment, the connection ID field 1309 is 8-bytes long and the session ID field 1310 is 4-bytes long. The size of the message 1308 may vary depending upon the type of the packet. Other configurations may be employed while still complying with the underlying principles of the invention.

FIG. 13D is a block diagram illustrating an exemplary message layout according to one embodiment of the invention. Referring to FIG. 13D, exemplary message 1308 includes, but is not limited to, a consumer/destination ID field 1311, a time stamp field 1312, an expiration field 1313, a message ID field 1314, a flag field 1315, a priority field 1316, a message header offset field 1317, a message property offset field 1318, a message body offset field 1319, and a message payload field 1320.

Field 1311 may be used to store a consumer ID or a destination ID of the packet. For example, when a client sends a packet to a server, field 1311 represents a consumer ID. When a server delivers a message, field 1311 represents a destination ID. In one embodiment, field 1311 is 4-bytes long. Time stamp field 1312 may be used to store the time when the packet is transmitted. In one embodiment, the time stamp field 1312 is 8-bytes long.

Expiration field 1313 may be used to store the time stamp that the current message may expire. A logical value of zero of this field indicates that the message would never expire. The value stored in the expiration field 1313 may be used for a maintenance purposes. For example, a maintenance thread for maintaining a database may examine this field to determine whether this message could be deleted, as described above. Alternatively, the messaging engine may use this value to determine whether this message should be delivered to a durable subscriber. If the message has expired, the message would not be delivered to any consumers or subscribers, even though the subscriber is a durable subscriber. In one embodiment, the expiration field 1313 is 8-bytes long.

Message ID field 1314 may be used to store the ID of the message. In one embodiment, the message ID field 1314 is 14-bytes long. The flag field 1315 and the priority field 1316 may be used to store the flags and the priority of the message respectively. In one embodiment, each of the fields 1315 and 1316 may be 1-byte long. The message header offset field 1317, message property offset field 1318, and message body offset field 1319 may be used to store the offset of the message header, property, and body, which are stored in the message payload 1320. In one embodiment, each of the message header offset field 1317, message property offset field 1318, and message body offset field 1319 is 4-bytes long. The size of the message payload 1320 may vary depending upon the type of the message.

The exemplary message formats in FIGS. 13A-13D are shown for the purpose of illustration only. It will be appreciated that the exemplary messages are not limited to those specific formats shown in FIGS. 13A-13D. The sizes and the order of the fields may vary and more or less fields may be implemented, depending upon the system configuration. Other configurations apparent to those with ordinary skill in the art may be implemented.

Exemplary Embodiments of Buffering Messages

According to certain embodiments, a client library may be implemented to manage a client buffer for handling pending messages for corresponding message consumers (e.g., JMS consumers). The size of the client buffer may be dynamically configurable depending upon the pending messages. When a client buffer is not large enough to receive the next enterprise message, additional memory may be allocated to the client buffer and the server that delivers the messages may be notified with respect to the updated client buffer.

Figure 14:
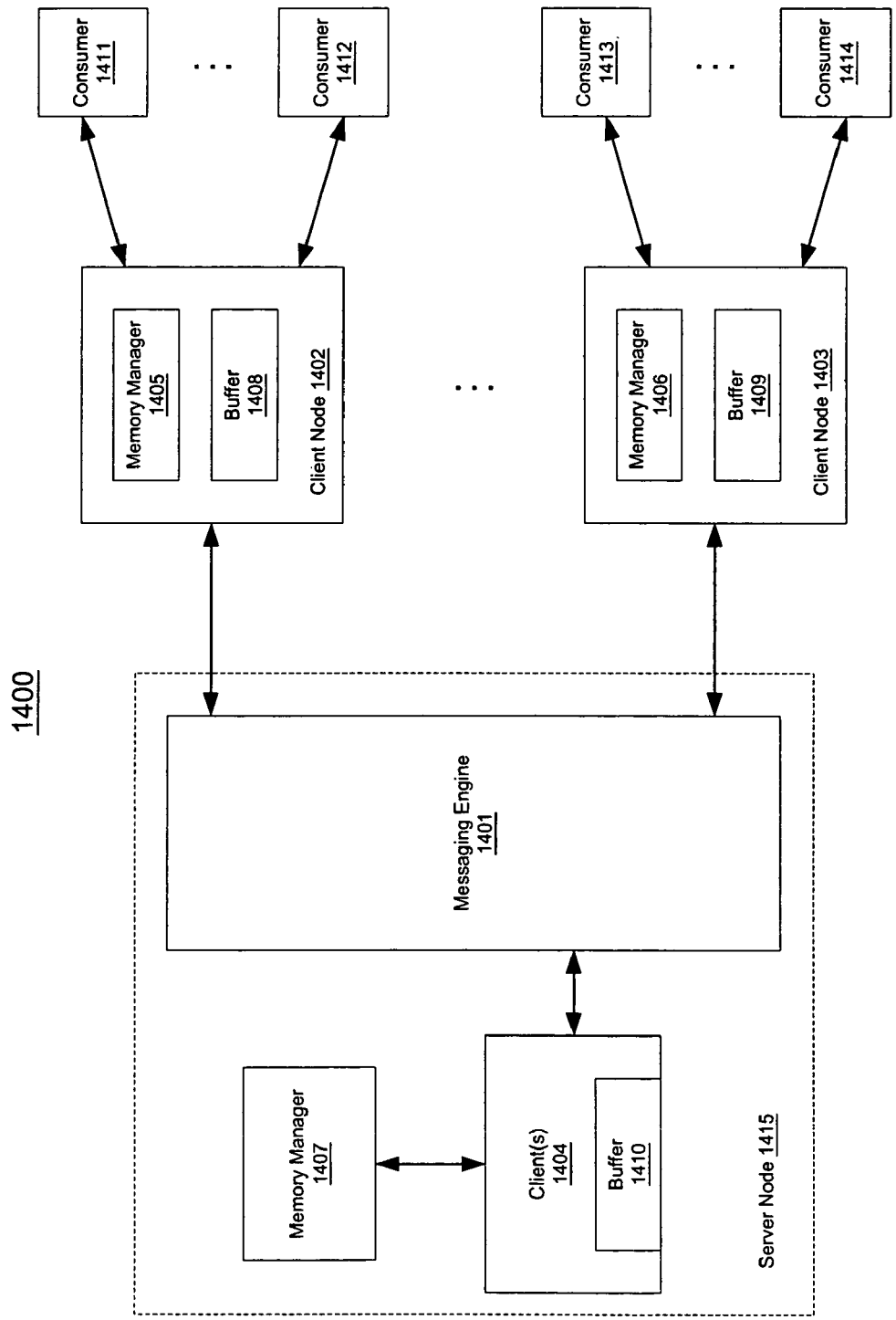
FIG. 14 is a block diagram illustrating an exemplary messaging system according to one embodiment of the invention.

FIG. 14 is a block diagram illustrating an exemplary messaging system according to one embodiment of the invention. Referring to FIG. 14, exemplary system 1400 includes, but is not limited to, a messaging engine 1401, one or more clients 1402-1404, and one or more consumers 1411-1414 coupled to one of the clients 1402-1404. The messaging engine may be implemented as a message provider, such as, for example, a JMS provider in a Java environment. Each of the clients 1402-1404 may include, among other elements, memory managers 1405-1407 and client buffers 1408-1410 respectively.

Note that a client to the messaging engine 1401 may be communicatively coupled to each other over a network (e.g., clients 1402 and 1403). Alternatively, a client, such as client 1404 may be coupled to the messaging engine 1401 within a server node 1415. For example, clients 1402 and 1403 may be implemented as server node 203, while server node 1415 may be implemented as message server 205 of FIG. 2A. Consumers 1411-1414 may be implemented as clients 201 of FIG. 2A. Other configurations may be employed while still complying with the underlying principles of the invention.

According to one embodiment, the clients 1402-1404 communicate with the messaging engine (also referred to as message server) 1401 to exchange information regarding the availability of the respective client buffers 1408-1410 (e.g., the size of the used buffer that is available to receive messages) and the size of the messages to be delivered by the messaging engine 1401. Note that a J2EE message server may or may not be the same as JMS provider. In one embodiment, the messaging engine 1401 keeps track of the size of the client buffer for all of the clients, such as, for example, buffers 1408-1410 of clients 1402-1404.

For the purpose of illustration, when the messaging engine 1401 determines that the size of a next enterprise message is greater than the remaining size of client buffer 1408 of client 1402, the messaging engine 1401 may notify the client 1402 to inform the client the size of the next message. In return, the client 1402 may perform memory management via its corresponding memory manager 1405 to allocate more memory to receive the next message. In one embodiment, the client 1402 may allocate additional memory in addition to its preallocated chunk of memory assigned to each of consumer.

Once the available memory is large enough to receive the next enterprise message, the client 1402 sends a request to start receiving message to the messaging engine, where the request includes the size of the available buffer to receive further messages. In response to the request, if the size of the available client buffer is larger than the size of next enterprise message, the messaging engine delivers the message to the client 1402, where the message may be distributed one or more consumers 1411 and 1412. After the message has been distributed to the consumers, the additional memory previously allocated for the message may be released. Alternatively, the client 1402 may periodically inform the messaging engine 1401 with respect to the size of available client buffer 1408.

Figure 15A:
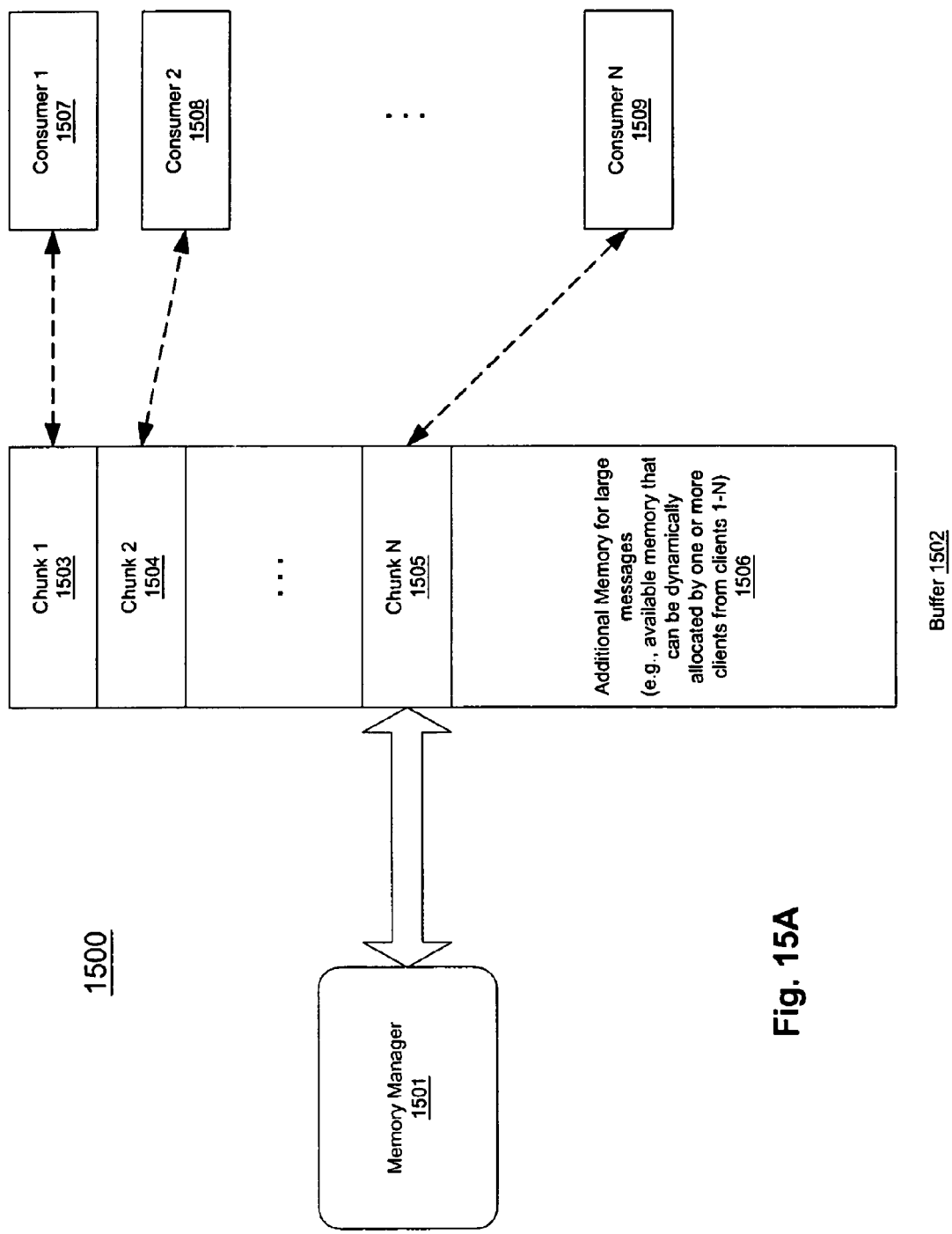
FIGS. 15A and 15B are block diagrams illustrating an exemplary memory management of a client buffer according to one embodiment of the invention.
Figure 15B:
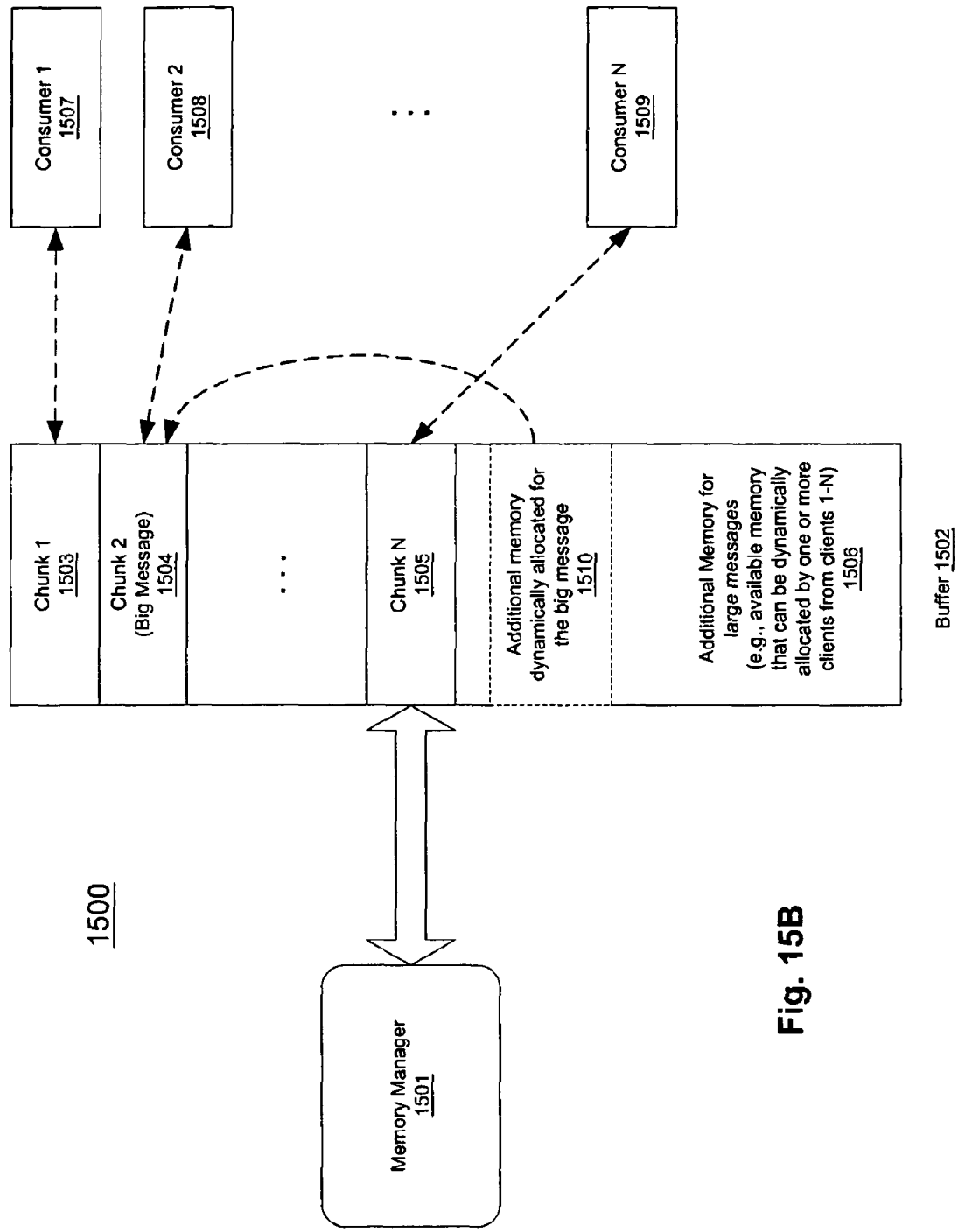

FIGS. 15A and 15B are block diagrams illustrating an exemplary memory management of a client buffer according to one embodiment of the invention. Referring to FIG. 15A, in one embodiment, exemplary configuration 1500 includes, but is not limited to, a memory manager 1501 and a client buffer 1502. The memory manager 1501 and the client buffer 1502 may be implemented as memory managers 1405-1407 and client buffers 1408-1410 of respective clients 1402-1404 of FIG. 14.

In one embodiment, the client buffer 1502 includes, but is not limited to, multiple chunks of memory 1503-1505 for multiple consumers 1507-1509 respectively. When a client is registered, the memory manager allocates a chunk of memory having a predetermined size for the newly registered client. The remaining portion 1506 of the buffer 1502 may be dynamically allocated for any one of the consumers 1507-1509 when handling certain messages with a larger size. The remaining portion 1506 may be shared among the consumers 1507-1509. When a client is unregistered, the corresponding chunk of memory may be released back to the pool 1506, which may be shared among the remaining registered clients.

Memory manager 1501 may be created in response to the first demand. In one embodiment, a single instance of the memory manager is created per VM (virtual machine) in a Java computing environment or a single instance per CLR (common language runtime) in a .NET computing environment. When the memory manager is created, three parameters are given to it on initialization: size of memory in bytes for consumers (e.g., total memory of buffer 1502), size of memory in bytes allocated for each new consumer (e.g., chunk size of chunks 1503-1505), and size of additional memory for large messages (e.g., portion 1506), which may also be respectively referred to as a basic, a chunk, and an additional size.

Upon creating a new consumer, an attempt is made to register the new consumer with the memory manager 1501. For the purpose of illustration, it is assumed that R is the number of already registered consumers, if (R+1)*chunk size>basic size, the registration may fail and an exception may be thrown. Otherwise, if there is not enough space because some of the basic memory is used temporarily for the receipt of big messages, the consumer registration may be suspended until some basic memory is freed. Finally, if the basic memory has a chunk size free, the consumer is registered.

A message may be considered as a big message when its size is greater than the chunk size. The memory for the big message may be allocated either from the basic memory or from the additional memory. The condition of (big message size−chunk size<basic free size+additional free size) has to be satisfied. If this condition is not met but (message size−chunk size<basic free size+additional size), then the allocation may be suspended until some memory is released, otherwise an exception is thrown. After the big message has been delivered to a consumer, the additional memory space associated with the big message may be released.

For example, according to one embodiment as shown in FIG. 15B, when the client corresponding to chunk 1504 receives a big message that is larger than its chunk size, the corresponding session for the that connection communicates with the memory manager 1501 to allocate additional memory 1510 from the additional memory pool 1506 to receive the big message. After the big message has been delivered to its consumer 1508, the additional memory 1510 may be released back to the additional memory pool 1506 to allow other clients, such as clients 1507 and 1509 may allocate enough memory space for their respective big messages.

Figure 16:
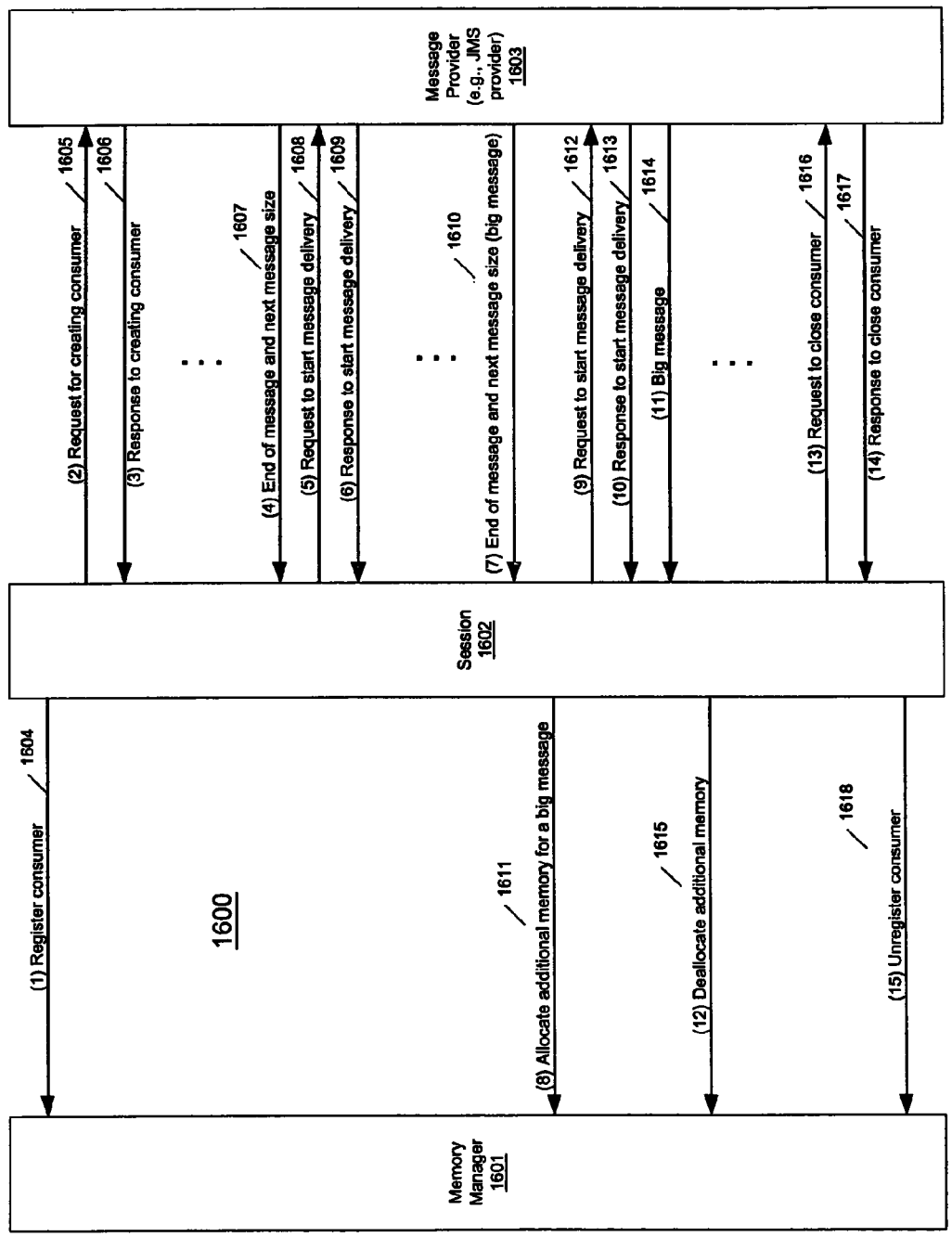
FIG. 16 is a flow diagram illustrating an exemplary message buffering process according to one embodiment of the invention.

FIG. 16 is a flow diagram illustrating an exemplary message buffering process according to one embodiment of the invention. In one embodiment, the exemplary process 1600 may be performed by a memory manager 1601, a session associated with a client 1602, and a message provider 1603. The memory manager 1601 may be implemented as memory manager 1501 of FIG. 15A and message provider 1603 may be implemented as message engine 1401 of FIG. 14, while session 1602 may be a session corresponding to a connection the client created, such as the session shown in FIG. 1C.

At block 1604, when a new client creates a new session of a connection to subscribe messages from message provider 1603, the session 1602 creates a consumer by trying to register the client with the memory manager 1601 (operation 1604). If it is successful, the session 1602 sends a request to create a consumer to the server (operation 1605). The request includes the memory having a chunk size allocated for the consumer by the memory manager 1601. In response to the request, the message provider creates a new consumer context for the new consumer to hold the size of the client buffer of a consumer. The size stored in the consumer context is also referred to as a consumer size for conciseness. Thereafter, the message provider transmits a response back to the session 1602 (operation 1606), where the response includes a consumer ID uniquely identifying the newly created consumer.

The session creates a queue for the consumer and maps it to its consumer ID and the consumer creation is finished. If the message provider 1603 (e.g., the server) fails to initialize the consumer and return an ID, the session 1602 unregisters (e.g., operation 1618) the consumer from the memory manager 1601 and throws an exception. After the connection is started the session 1602 begins to receive messages (e.g., JMS messages) for all of its consumers. If the consumers are synchronous, the session 1602 puts each message into the queue of the designated consumer. If the consumers are asynchronous the session 1602 puts a wrapper of the message and the message listener of the designated consumer into a single queue for all consumers.

If the consumers are synchronous and a message is requested, according to one embodiment, the queue of the consumer is checked for new messages. Each message is checked if it has a property indicating the end of the messages. If the corresponding message does not have the property indicating the end of the messages, the message is delivered to the consumer. Otherwise, if the message includes a property indicating the end of messages (operation 1607), a request to start delivery of messages (operation 1608), including a new memory size for the consumer, is send to the server and an acknowledgement 1609 is received.

In one embodiment, the message having an indication of the end of messages may also include an indication indicating a size of a next message pending to be delivered. In one embodiment, the new size is determined based on the size of the next message pending. If the message is big (e.g., exceeding a predetermined threshold or a chunk size associated with the consumer (e.g., operation 1610), a call to the memory manager 1601 is performed to allocate additional memory (e.g., additional memory 1510 of FIG. 15B) for the big message. If it is successful, the size in the request to start delivery 1612 is set to the size of the big message (e.g., the additional memory for the big message). If the incoming message is not a big message, the size is set to chunk size. The server responds with an acknowledgement and begins the delivery of the new portion of messages.

If the consumers are asynchronous then a new thread is started that reads the common queue and for each wrapper gets the message and the message listener object. The similar operations as described above are performed before the onMessageo method of the message listener is called. When the consumer is closed, a request to close a consumer 1616 is sent to the message provider 1603, which responds with an acknowledgement 1617. In response, the session 1602 destroys the dedicated queue for the consumer and unregisters the consumer from the memory manager 1601 (operation 1618). Other operations may be included.

Figure 17:
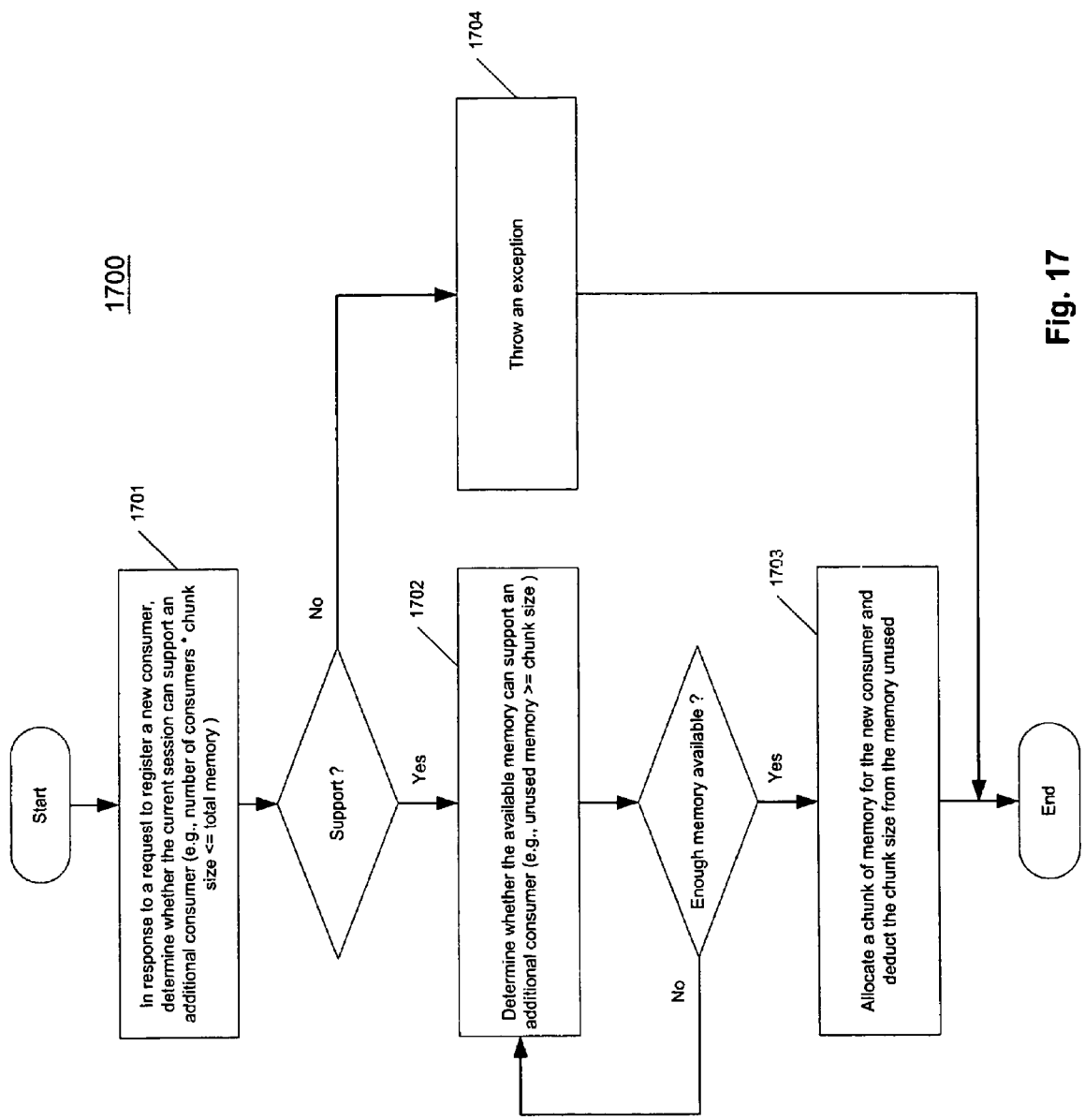
FIG. 17 is a flow diagram illustrating an exemplary process for processing enterprise messages, according to one embodiment of the invention.

FIG. 17 is a flow diagram illustrating an exemplary process for processing enterprise messages, according to one embodiment of the invention. Exemplary process 1700 may be performed by a processing logic that may comprise hardware (circuitry, dedicated logic, etc.), software (such as is run on a dedicated machine), or a combination of both. For example, the exemplary process 1700 may be performed by a memory manager, such as memory manager 1501 of FIG. 15A.

Referring to FIG. 17, in response to a request to register a new consumer, at block 1701, the processing logic determines whether the current session (e.g., session 1602 of FIG. 16) can support an additional consumer. In one embodiment, the determination is performed based on whether number of the consumers including the new consumer multiplied by the chunk size for each consumer is less than or equal to the total memory of the client buffer 1502 of FIG. 15A. If so, at block 1702, the processing logic determines whether the available memory can support an additional consumer. In one embodiment, the determination is performed based on whether the currently unused memory is greater than or equal to the chunk size. As described above, the remaining portion of the memory other than chunks of memory allocated to the existing consumers (e.g., portion 1506 of FIG. 15A) may be shared and used to hold the big messages of any of the existing consumers. As a result, when a new consumer is created, the remaining portion of the memory may be used by an existing consumer. If the available memory is not large enough to be allocated for a new consumer, the registration of the new consumer may be suspended until the available memory is available. Otherwise, if the available memory is large enough, at block 1703, a chunk of memory is allocated for the new consumer and the remaining portion of the memory is updated by deducting a chunk size from the remaining portion pool 1506. If, at block 1701, it is determined that there is no enough memory for an additional consumer, an exception is thrown at block 1704. Other operations may also be performed while still complying with the underlying principles of the invention.

Figure 18:
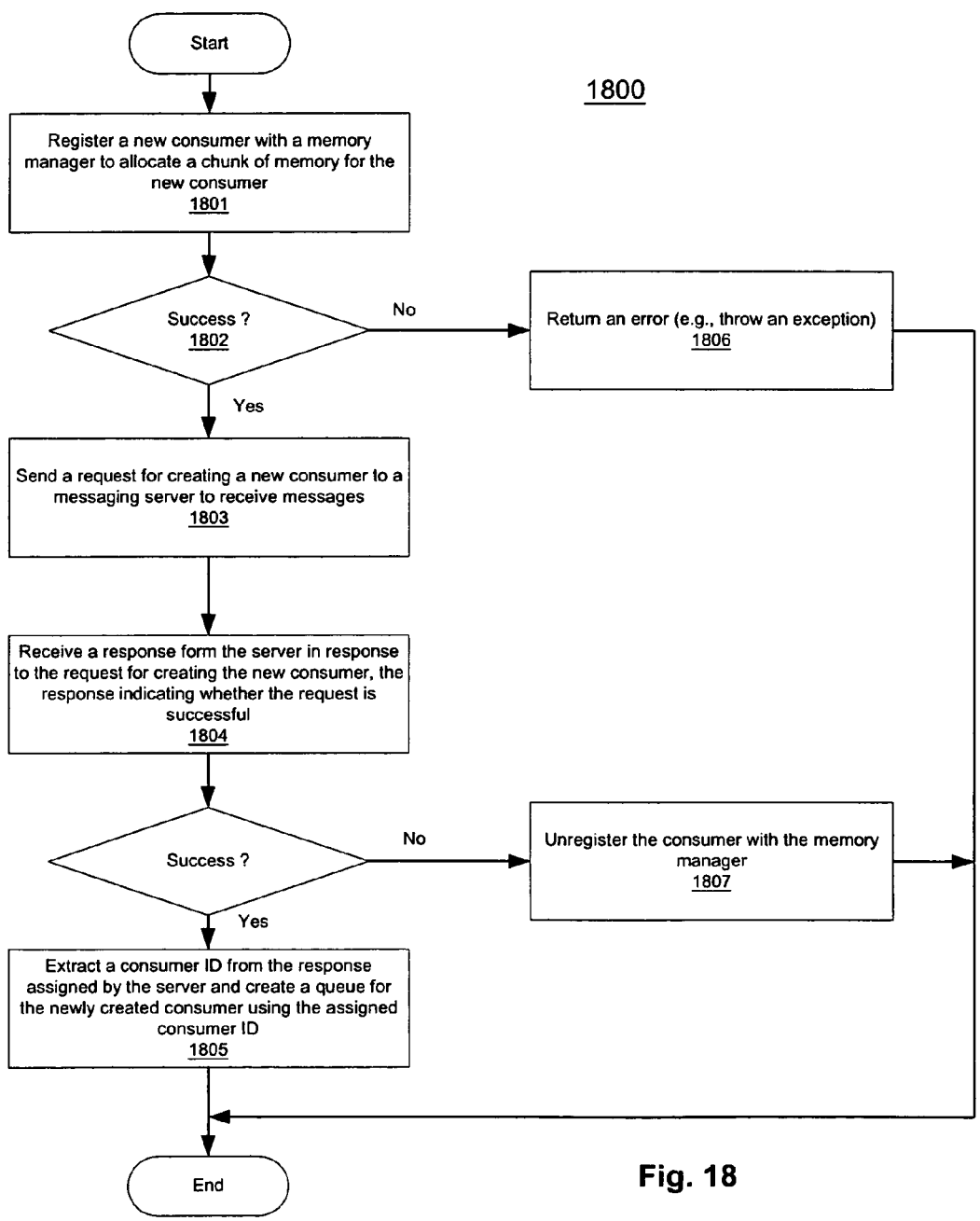
FIG. 18 is a flow diagram illustrating an exemplary process for processing enterprise messages according to one embodiment of the invention.

FIG. 18 is a flow diagram illustrating an exemplary process for processing enterprise messages according to one embodiment of the invention. Exemplary process 1800 may be performed by a processing logic that may comprise hardware (circuitry, dedicated logic, etc.), software (such as is run on a dedicated machine), or a combination of both. For example, the exemplary process 1800 may be performed by a session (e.g., a session container in a Java computing environment), such as session 1602 of FIG. 16.

Referring to FIG. 18, in response to a request for receiving messages from a new consumer, at block 1801, the processing logic registers the new consumer with a memory manager to allocate a chunk of memory for the respective consumer. At block 1802, if it is determined that the registration is unsuccessful (e.g., not enough memory remaining for an additional consumer for the given session), an error is generated at block 1806.

If the registration is successful, at block 1803, a request for creating a new consumer is transmitted to a messaging server to receive messages from the messaging server. At block 1804, a response from the messaging server is received indicating whether the request has been successfully processed. If the request is performed successfully, at block 1805, a consumer ID is extracted from the response and a queue for the newly created consumer is created using the assigned consumer ID. Otherwise, at block 1807, the consumer is unregistered from the memory manager and optionally an error is generated. Other operations may also be performed while still complying with the underlying principles of the invention.

Figure 19:
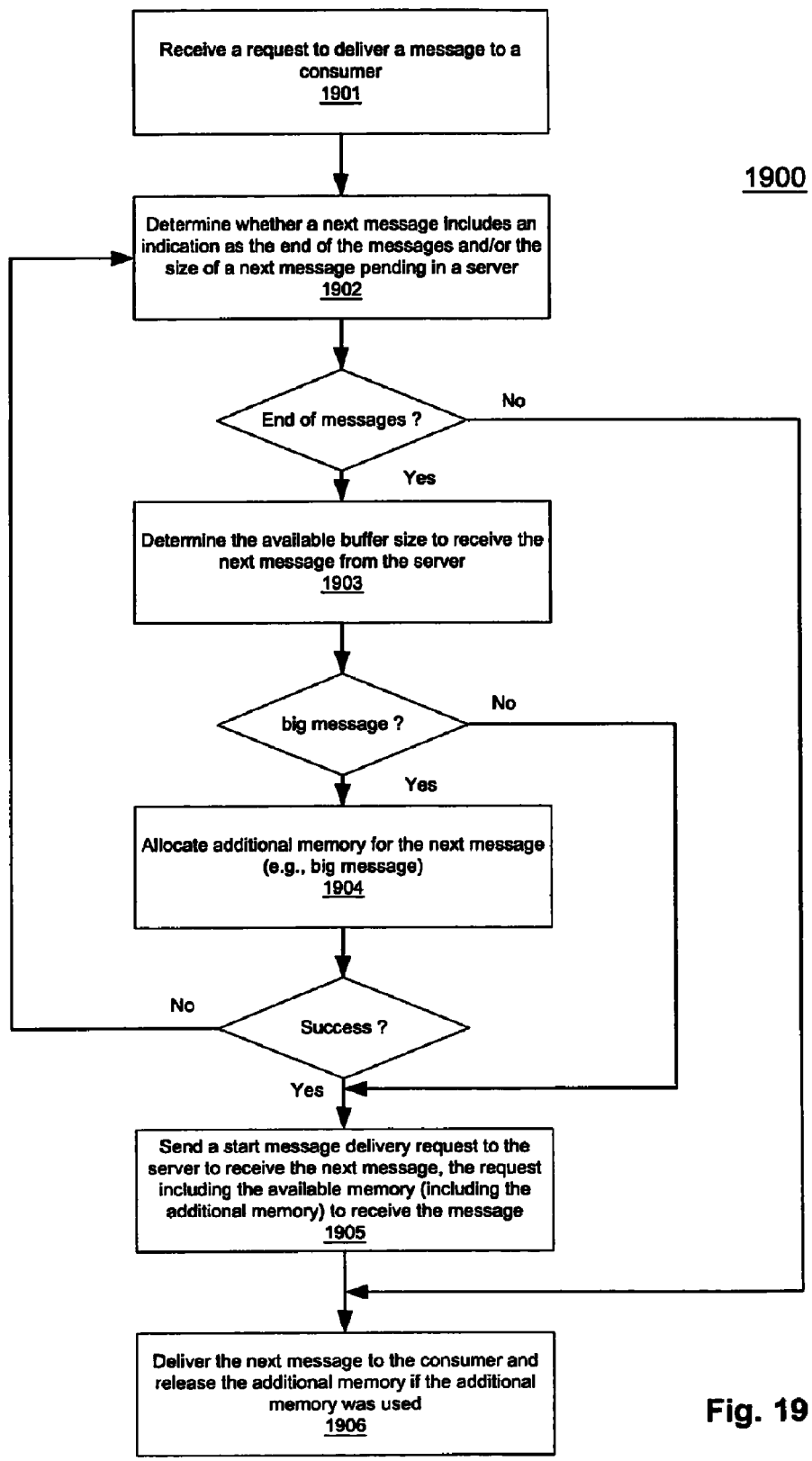
FIG. 19 is a flow diagram illustrating an exemplary process for processing enterprise messages according to one embodiment of the invention.

FIG. 19 is a flow diagram illustrating an exemplary process for processing enterprise messages according to one embodiment of the invention. Exemplary process 1900 may be performed by a processing logic that may comprise hardware (circuitry, dedicated logic, etc.), software (such as is run on a dedicated machine), or a combination of both. For example, the exemplary process 1900 may be performed by a session (e.g., a session container in a Java computing environment), such as session 1602 of FIG. 16. In one embodiment, exemplary process 1900 includes, but is not limited to, receiving a first message from a server indicating a size of a next pending enterprise message, determining whether a size of a buffer available to receive messages is greater than or equal to the size of the next enterprise message, transmitting a second message to the server to start receiving the next enterprise message if the size of the buffer available to receive messages is greater than or equal to the size of the next enterprise message, where the second message includes the size of the buffer available to receive messages and the second message is used by the server to determine whether to deliver the next enterprise message.

Referring to FIG. 19, at block 1901, a request to deliver a message to consumer is received. At block 1902, the processing logic determines whether a next message includes an indication indicating the end of the messages and/or the size of a next pending message. If not, at block 1906, the respective message is delivered to the consumer. Otherwise, at block 1903, the processing logic determines the available client buffer size to receive the next message from the server. If it is determined that enough memory is available for the next message, at block 1905, a request for starting delivery of the next message is sent to the server, where the request includes the availability of the client buffer. Upon receiving the next message, at block 1906, the next message is delivered to the consumer.

If it is determined that the next message is a big message (e.g., the size of the next message is larger than the chunk size), at block 1904, a request to allocate additional memory is sent to the memory manager. If the additional memory is not available at a given time, the delivery of the next message (big message) will be suspended until enough memory can be allocated from the memory manager. If additional memory is allocated successfully, at blocks 1905 and 1906, the next message is delivered using the additionally allocated memory. After the big message has been delivered to the consumer, the additional memory is released back to the pool. Other operations may also be performed while still complying with the underlying principles of the invention.

Figure 20:
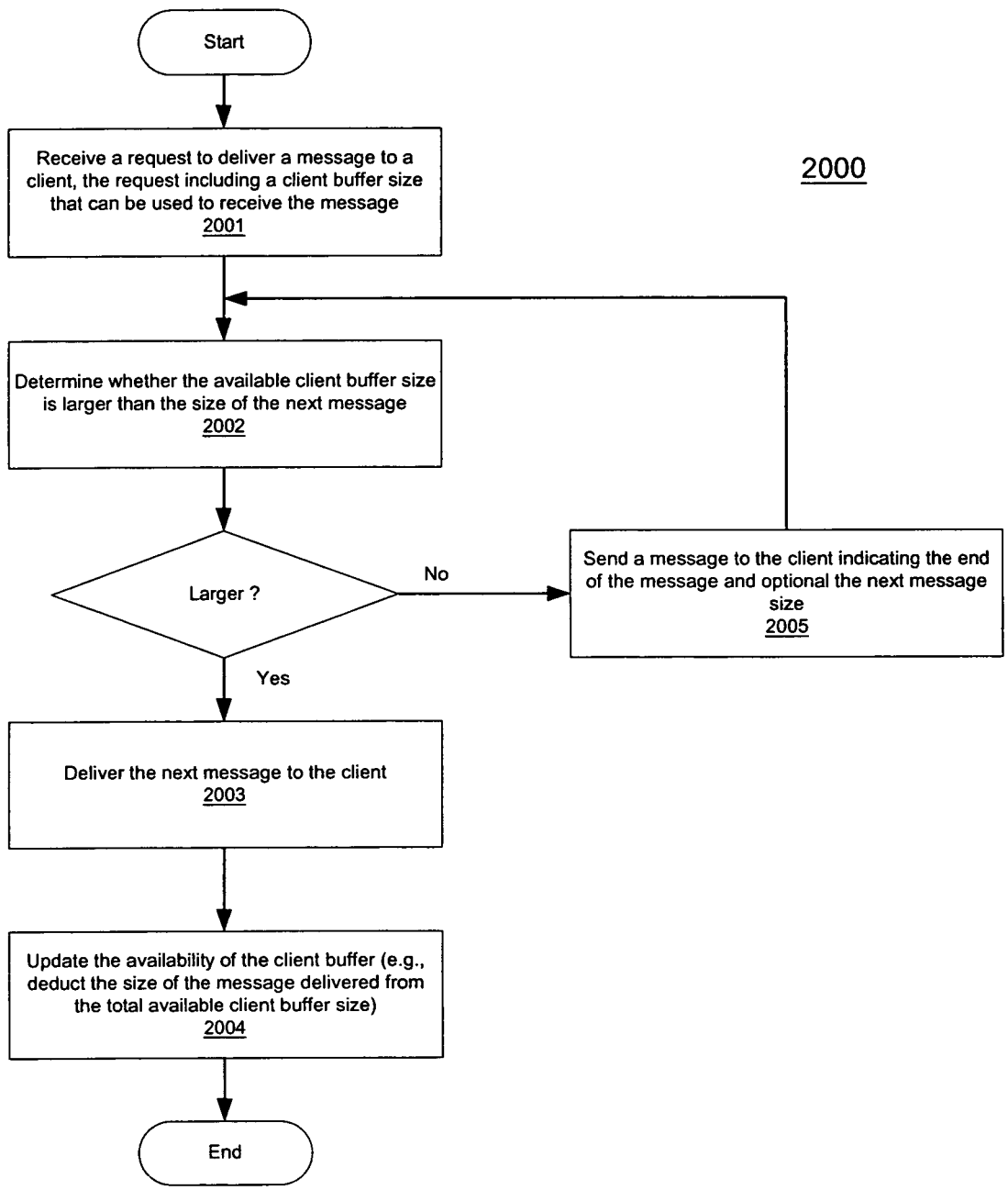
FIG. 20 is a flow diagram illustrating an exemplary process for processing enterprise messages according to one embodiment of the invention.

FIG. 20 is a flow diagram illustrating an exemplary process for processing enterprise messages according to one embodiment of the invention. Exemplary process 2000 may be performed by a processing logic that may comprise hardware (circuitry, dedicated logic, etc.), software (such as is run on a dedicated machine), or a combination of both. For example, the exemplary process 2000 may be performed by a messaging server, such as message provider 1603 of FIG. 16. In one embodiment, the exemplary process 2000 includes, but is not limited to, transmitting, from a messaging server to a client, a first message indicating a size of a next enterprise message to be sent to the client, receiving a second message from the client in response to the first message, the second message indicating a buffer size available to store messages for the client, and sending the next enterprise message to the buffer of the client if the size of the next enterprise message is smaller than or equal to the size of the available buffer of the client.

Referring to FIG. 20, at block 2001, a request for starting delivery of messages to a client is received. In one embodiment, the request includes a buffer size of the client, which may be used to receive further messages. At block 2002, the processing logic determines whether the available client buffer size is larger then the next message size. If the available client buffer size is larger than the next message size, at block 2003, the next message is delivered to the client and the client buffer information may be updated accordingly at block 2004. Otherwise, if the available client buffer size is smaller than the next message size, at block 2005, a message is sent to the client to indicate the end of the messages and optionally the size of the next message pending to allow the client to allocate more buffer to receive the next message. Other operations may also be performed while still complying with the underlying principles of the invention.

Exemplary Message Selector Hierarchies And Multicasting

Many messaging applications need to filter and categorize the messages they produce. In the case where a message is sent to a single receiver, this can be done with reasonable efficiency by putting the criteria in the message and having the receiving client discard the ones it is not interested in. When a message is broadcast to many clients, it becomes useful to place the criteria into the message header so that it is visible to the message provider (e.g., JMS provider in a Java environment). This allows the provider to handle much of the filtering and routing work that would otherwise need to be done by the application.

A message selector allows a client to specify, for example, by the message header, the messages it is interested in. Only messages whose headers and properties match the selector are delivered. A message selector matches a message if the selector evaluates to true when the message's header field and property values are substituted for their corresponding identifiers in the selector.

A message selector is a string whose syntax that may be based on a subset of the SQL92 conditional expression syntax. If the value of a message selector is an empty string, the value is treated as a null and indicates that there is no message selector for the message consumer. The order of evaluation of a message selector is from left to right within the precedence level. Parentheses can be used to change the order.

Figure 21:
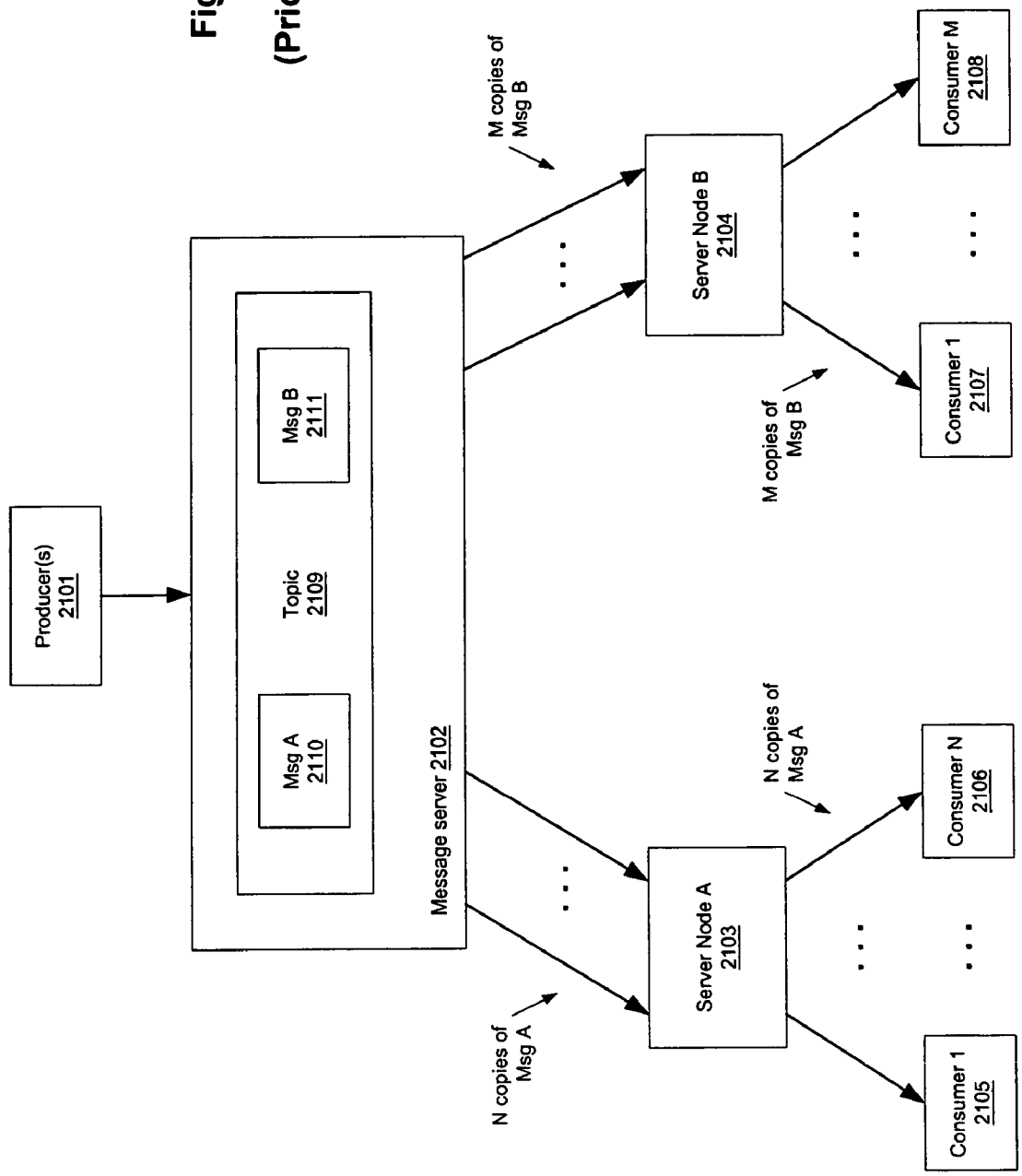
FIG. 21 is a block diagram illustrating a typical message delivery configuration.

When a message includes a property that matches a condition set forth in the message selector when the corresponding consumer register to receive messages, the message is delivered to the consumer. FIG. 21 is a block diagram illustrating a typical message delivery configuration. Referring to FIG. 21, consumers 2105-2106 register, via server node 2103, the topic 2109 hosted by message server 2102, while consumers 2107-2108 register, via server node 2104, the topic 2109 hosted by message server 2102. For the purpose of illustration, it is assumed that consumers 2105-2106 specify a selector that identifies message 2110 and consumers 2107-2108 specify a selector that identifies message 2111. When message server 2102 delivers message 2110, it sends a copy of message 2110, via server node 2103, to each of the consumers (e.g., consumers 2105-2106). Similarly, when message server 2102 delivers message 2111, it sends a copy of message 2111, via server node 2103, to each of the consumers (e.g., consumers 2107-2108).

For example, the message server 2102 sends a copy of message 2110 to server node 2103, which in turn forwards the message to consumer 2105. The message server 2102 then delivers another copy of message 2110 to server node 2103, which in turn forwards the message to consumer 2106, and so on. That is, for each of the consumers 2105-2106, the message server 2102 has to send multiple copies of message 2110 to server node, which in turn redistributes the message to the corresponding consumer. As a result, the traffic between the message server 2102 and the server node 2103 (e.g., dispatch node) has increased significantly. As the number of consumers subscribing to the topic 2109 increases, the traffic between the message server 2102 and the server node 2103 will be significantly heavier and sometime such heavy traffic is unacceptable.

Accordingly, according to one embodiment, the subscribers subscribing a topic are grouped based on the similar interest of the multiple consumers. For example, according to one embodiment, the information specified in a selector when a consumer register to receive messages of a topic may be used to determine whether certain consumers have similar interest and should be grouped together. In addition, a selector hierarchy is maintained in order to determine whether multiple consumers have similar interests.

According to another embodiment, the subscriptions of certain subscribers that register at different time may be delayed, such that more consumers having similar interests may be grouped to receive the same messages at substantially the same time using multicasting.

Figure 22:
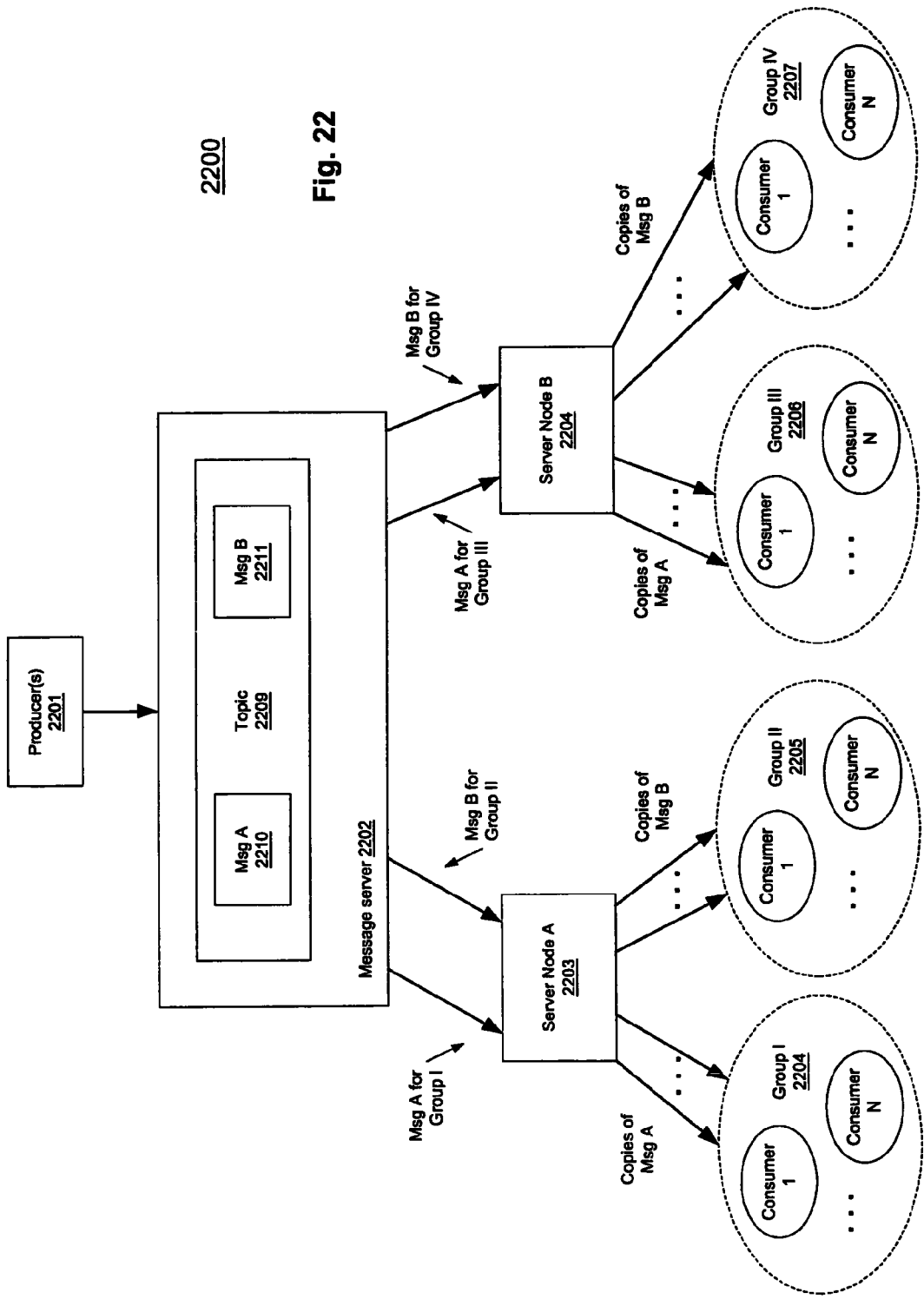
FIG. 22 is a block diagram illustrating an exemplary message delivery configuration according to one embodiment of the invention.

FIG. 22 is a block diagram illustrating an exemplary message delivery configuration according to one embodiment of the invention. Referring to FIG. 22, in this embodiment, multiple consumers having similar interests are grouped into one or more groups 2204-2207 for subscribing, via one or more server nodes 2203-2204, messages of a topic 2209 produced by one or more producers 2201. In one embodiment, the similar interests of the consumers may be determined based on the message selectors used when the consumers register to subscribe the messages of the topic.

For the purpose of illustration, it is assumed that the consumers grouped within group 2204 or group 2205 may specify one or more common categories of messages they are interested in via the respective message selector when they subscribe the topic 2209 via server node 2203. In one embodiment, the message server 2202 and/or server node 2203 maintain the information of the message selection of the consumers. For example, the message server 2202 and/or server node 2203 may maintain a message selector hierarchy structure related to the message selectors of its consumers, such as, for example, exemplary message selector hierarchy 2300 of FIG. 23.

For example, message 2210 has been commonly subscribed (e.g., commonly selected via the respective message selector) by the consumers within group 2204 and message 2211 has been commonly subscribed (e.g., commonly selected via the respective message selector) by the consumers within group 2205. When the message server 2202 identifies such common interests among multiple consumers of groups 2204 and 2205 based on, for example, the message selector hierarchy structure of the consumers maintained within the message server 2202, the message server 2202 may deliver the messages 2210 and 2211 only once to the server node 2203 (e.g., a dispatch node). Thereafter, the server node 2203 may distribute the message 2210 to each of the consumers in group 2204 individually and distribute the message 2211 to each of the consumers in group 2205 individually. As a result, the traffic between the message server 2202 and server node 2203 has been greatly reduced.

Similarly, message 2210 has been commonly subscribed (e.g., commonly selected via the respective message selector) by the consumers within group 2206 and message 2211 has been commonly subscribed (e.g., commonly selected via the respective message selector) by the consumers within group 2207. Accordingly, the message server 2202 may deliver the messages 2210 and 2211 only once to the server node 2204 (e.g., a dispatch node). Thereafter, the server node 2204 may distribute the message 2210 to each of the consumers in group 2206 individually and distribute the message 2211 to each of the consumers in group 2207 individually. As a result, the traffic between the message server 2202 and server node 2204 has been greatly reduced.

Figure 23:
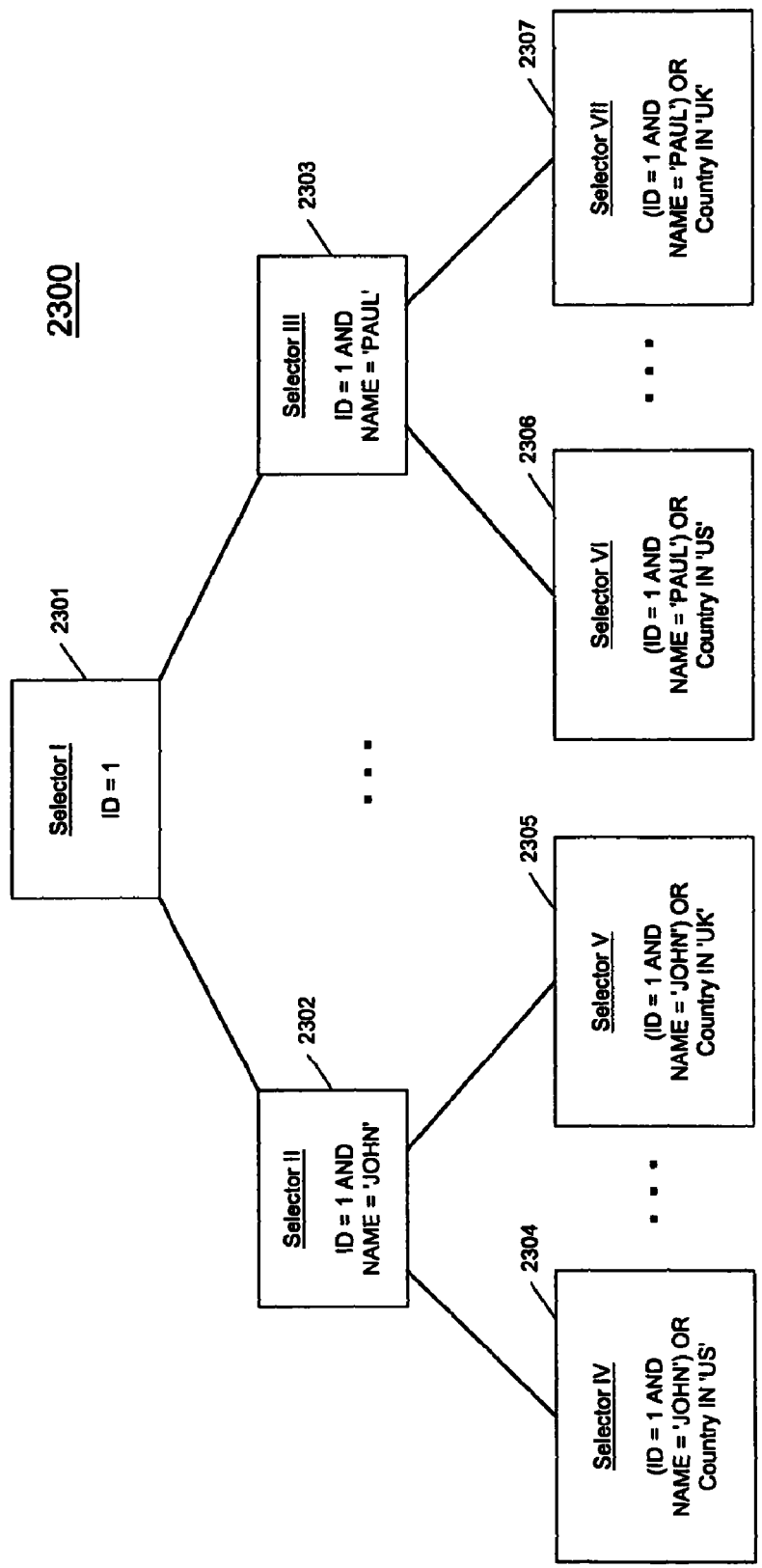
FIG. 23 is a block diagram illustrating an exemplary message selector hierarchy structure according to one embodiment of the invention.

FIG. 23 is a block diagram illustrating an exemplary message selector hierarchy structure according to one embodiment of the invention. Referring to FIG. 23, the exemplary message selector hierarchy structure 2300 is construed based on the commonly selected categories of the selectors of the consumers. For example, selector 2304 having a selection of "(ID=1 AND NAM='JOHN') OR Country IN 'US'" and selector 2305 having a selection of "(ID=1 AND NAME='JOHN') OR Country IN 'UK'" are subsets of selector 2302 having a selection of "(ID=1 AND NAME='JOHN')", which is a subset of selector 2301 having a selection of "ID=1". Thus, a message that satisfies the selection of selector 2302 also satisfies the selections of selectors 2304 and 2305. Similarly, a message that satisfies the selection of selector 2301 also satisfies the selections of selectors 2302 and 2304-2305.

Similarly, message selectors 2306 and 2307 are subsets of message selector 2303, which is a subset of message selector 2301. Thus, a message that satisfies the selection of selector 2303 also satisfies the selections of selectors 2306 and 2307. Similarly, a message that satisfies the selection of selector 2301 also satisfies the selections of selectors 2302 and 2306-2307.

Therefore, according to one embodiment, when multiple consumers subscribing a topic using selectors 2302 and 2304-2305 via a server node, a message that satisfies the selection of 2302 may be delivered from the message server to the server node once only. The server node in turn may distribute the message to the consumers having selectors 2302 and 2304-2305 individually, without having the message server individually to deliver the message individually to multiple consumers.

Figure 24:
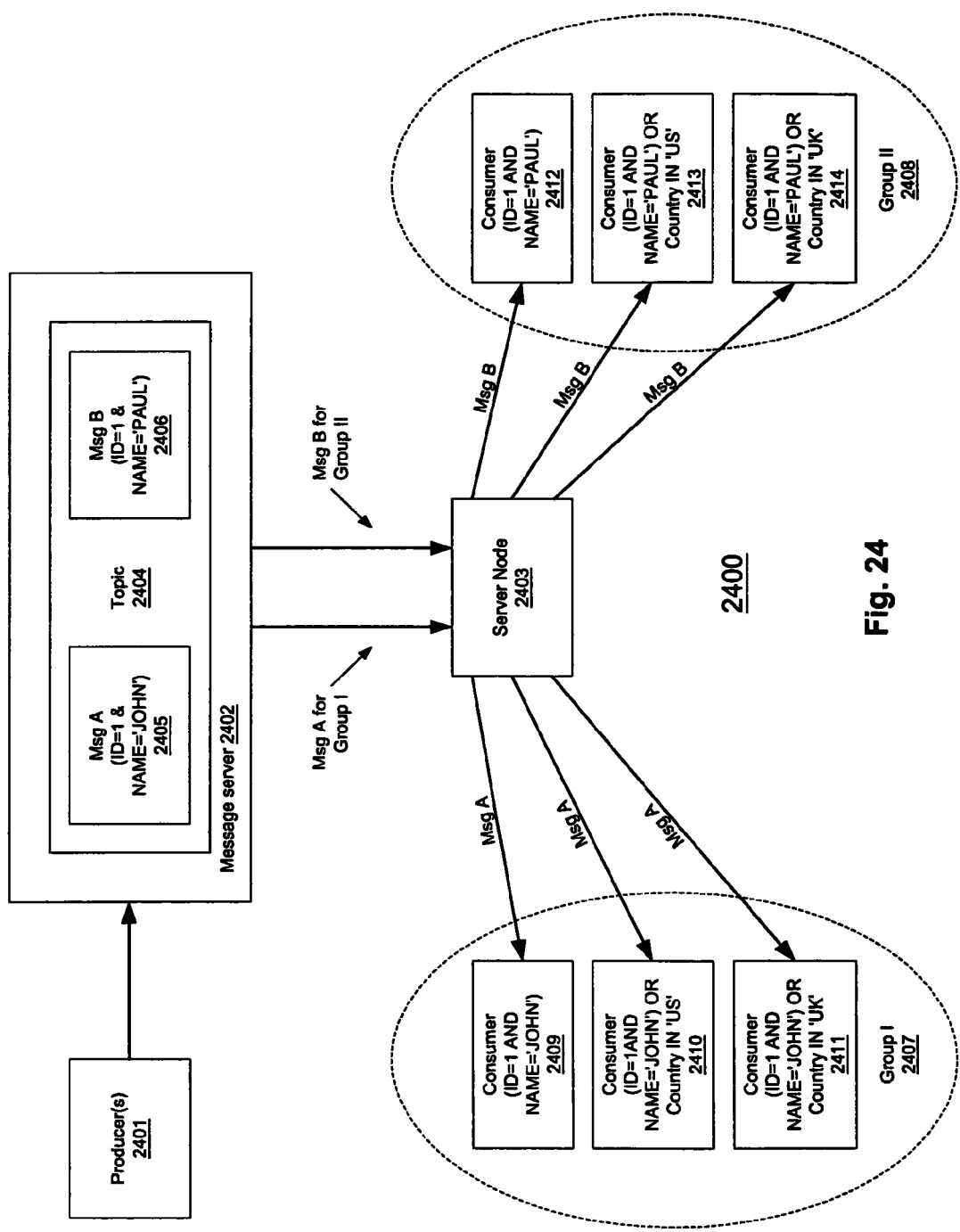
FIG. 24 is a block diagram illustrating an exemplary message delivery configuration according to another embodiment of the invention.

FIG. 24 is a block diagram illustrating an exemplary message delivery configuration according to another embodiment of the invention. Referring to FIG. 24, in this embodiment, consumers 2409-2411 as a group 2407 and consumers 2412-2414 as a group 2408 subscribe, via server node 2403, messages of a topic 2404 produced by one or more producers 2401 hosted by message server 2402. The consumers 2409-2411 have a common interest of, based on their respective selector, "ID=1 AND NAME='JOHN'", which identifies message 2405. The consumers 2412-2414 have a common interest of, based on their respective selector, "ID=1 AND NAME='PAUL'", which identifies message 2406. The message selectors of consumers 2409-2414 may be maintained as a message selector hierarchy structure similar to the one shown in FIG. 23 and maintained by message server 2402 and/or server node 2403. As a result, message server 2402 may deliver messages 2405 and 2406 once only to server node 2403. The server node 2403 then individually delivers message 2405 to each of the consumers 2409-2411 in group 2407 individually and delivers message 2406 to each of the consumers 2412-2414 in group 2408 individually. Other configurations may be employed while still complying with the underlying principles of the invention.

Figure 25:
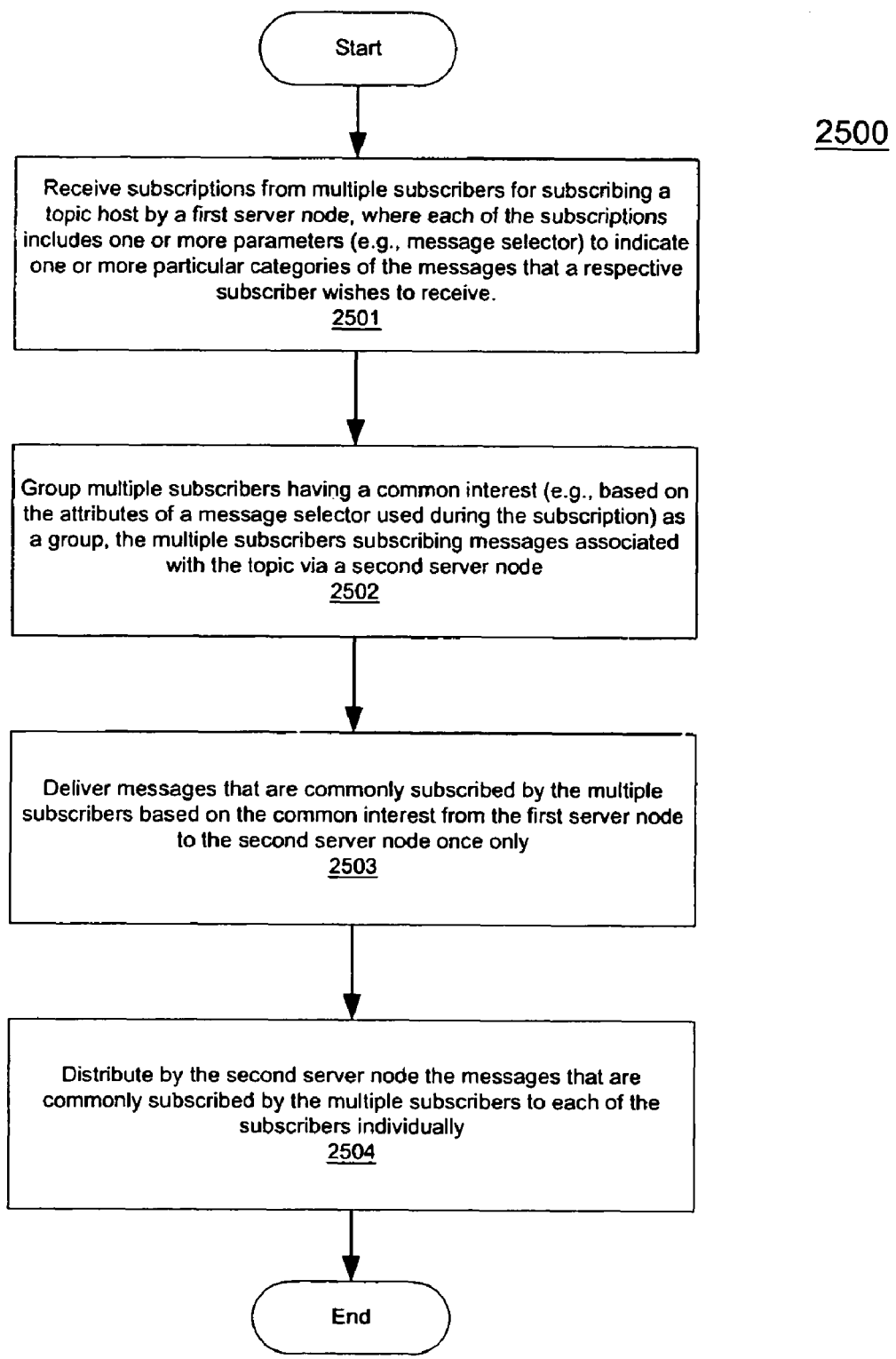
FIG. 25 is a flow diagram illustrating an exemplary process for delivering enterprise messages, according to one embodiment of the invention.

FIG. 25 is a flow diagram illustrating an exemplary process for delivering enterprise messages, according to one embodiment of the invention. Exemplary process 2500 may be performed by a processing logic that may comprise hardware (circuitry, dedicated logic, etc.), software (such as is run on a dedicated machine), or a combination of both. In one embodiment, exemplary process 2500 includes, but is not limited to, determining, at a first node hosting a topic published by a producer, one or more groups of subscribers subscribing to the topic based on similarity of the subscribers, and for each of messages associated with the topic, delivering the respective message once to a second node associated with one of the one or more groups of the subscribers, wherein the second node distributes the respective message to each of the subscribers of the respective group individually without invoking the first node again.

Referring to FIGS. 24 and 25, at block 2501, multiple subscriptions are received from multiple consumers to subscribe messages of a topic hosted by a first server node (e.g., message server 2402). Each of the subscriptions includes one or more parameters (e.g., one or more message selectors) to indicate one or more particular categories of the messages that a respective consumer is interested in.

At block 2502, some of the consumers having at least one common interest in subscribing to the topic via a second server node (e.g., server node 2403) are grouped as a group (e.g., group 2407 having one or more consumers 2409-2411). In one embodiment, a group is determined based on one or more attributes of one or more message selectors used during the respective subscription. For example, consumer 2409 having a selector containing a parameter of "ID=1 AND NAME='JOHN'", consumer 2410 having a selector containing a parameter of "(ID=1 AND NAME='JOHN') OR Country IN 'US'", and consumer 2411 having a selector containing a parameter of "(ID=1 AND NAME='JOHN') OR Country IN 'UK'" have a common interest of "ID=1 AND NAME='JOHN'". As a result, consumers 2409-2411 may be grouped as group 2407 to receive any messages that satisfy "ID=1 AND NAME=JOHN'" (e.g., message 2405).

At block 2503, messages (e.g., message 2405) that are commonly subscribed (e.g., commonly interested) by the multiple consumers (e.g., group 2407) are delivered from the first server node (e.g., message server 2402) to the second server node (e.g., server node 2403) once only. At block 2504, the second server node (e.g., server node 2403) distributes the commonly subscribed messages to each of the consumers (e.g., consumers 2409-2411 of group 2407) individually. As a result, the traffic between the first and second server nodes has been greatly reduced. Other operations may also be performed while still complying with the underlying principles of the invention.

Figure 26A:
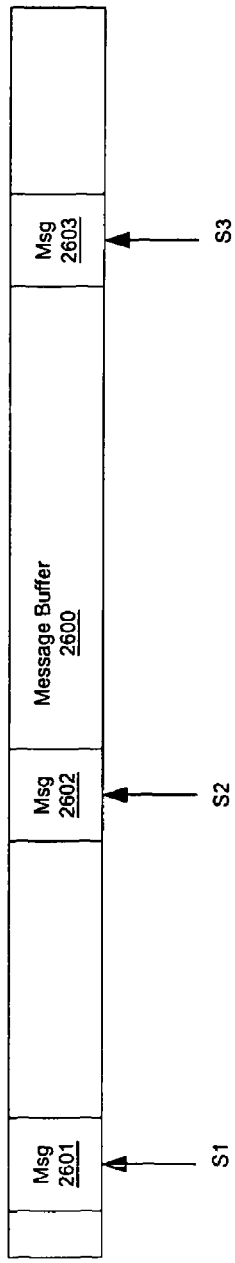
FIGS. 26A-26C are block diagrams illustrating an exemplary message delivery configuration according to certain embodiments of the invention.

Since the commonly subscribed or commonly interested messages are delivered in a group manner, the traffic between the message server and the server node where the group of consumers subscribes from has been greatly reduced. However, the group of the consumers does not always subscribe the topic at the same time. For example, as shown in FIG. 26A, subscribers S1-S3 subscribe a topic stored in message buffer 2600 at different time and reading different messages 2601-2603 at different time. As a result, although the subscribers S1-S3 subscribing to the topic may have similar interests, the message server has to deliver each of the messages (e.g., messages 2601-2603) individually, since the consumers are reading and receiving different messages at different time.

Figure 26B:
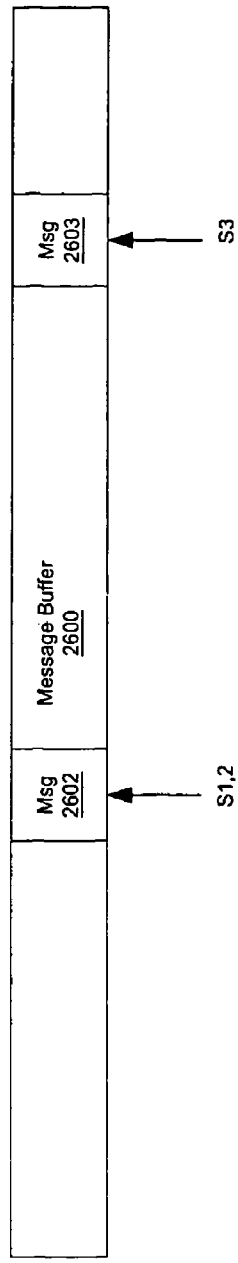
Figure 26C:
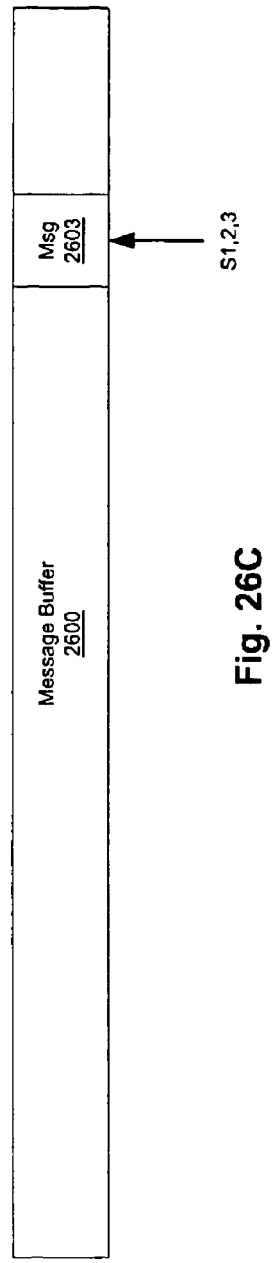

According to one embodiment, as shown in FIGS. 26B and 26C, messages may be suspended or delayed for certain consumers that are leading in reading the messages, while allowing other consumers that are trailing in reading the messages to catch up, until most of the consumers are reading the same messages at relatively the same time. For example, messages 2602 and/or 2603 may be suspended or delayed to be delivered to subscribers S2 and/or S3, until all of the subscribers S1-S3 are reading the same message (e.g., message 2603) at relatively the same time, as shown in FIG. 26C. Thereafter, the consumers which are reading the same messages at relatively the same time may be grouped as a group and the same message (e.g., message 2603) may be delivered once only to the second server node and the second server node distributes the same message to each of the consumers individually.

Figure 27:
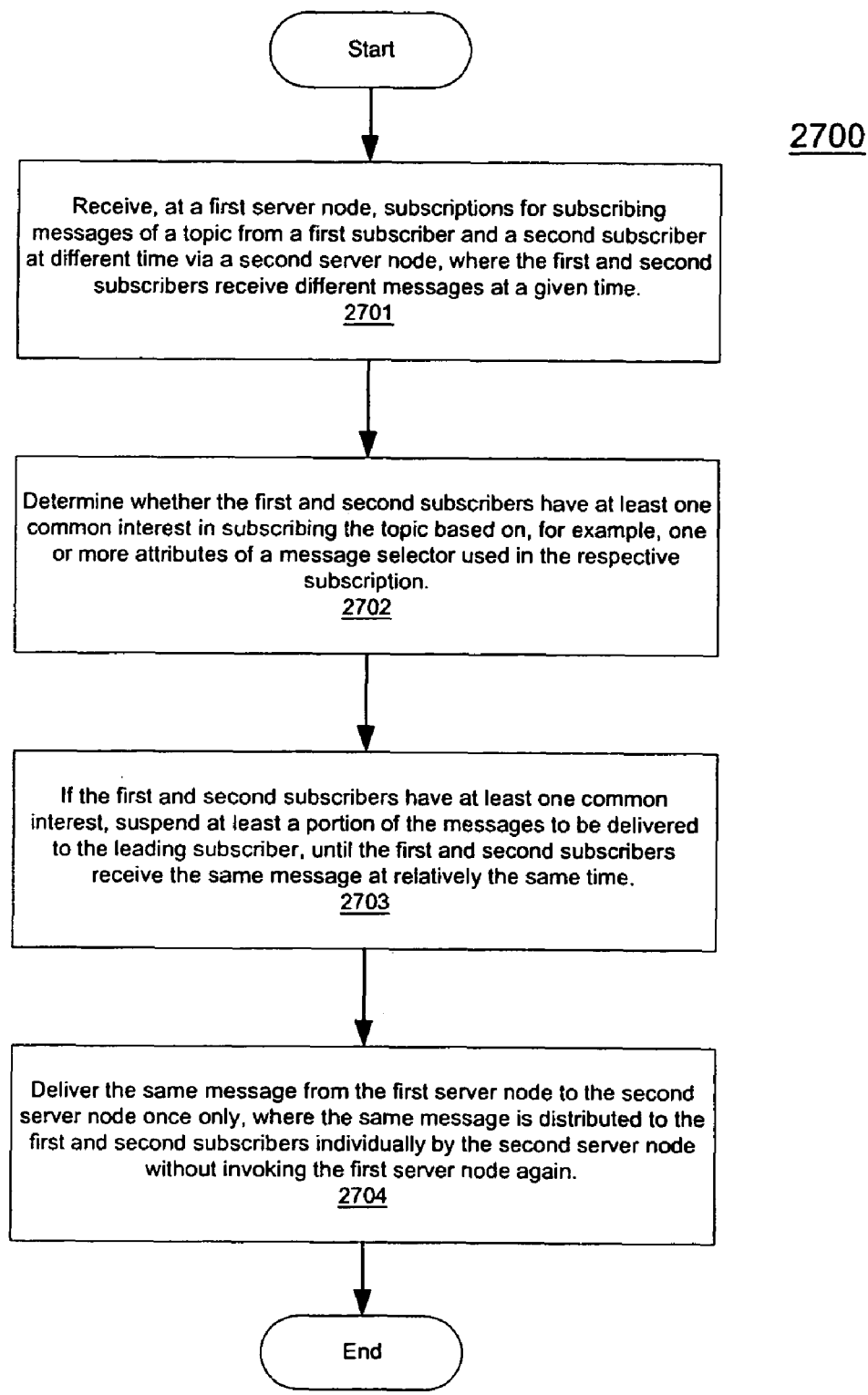
FIG. 27 is a flow diagram illustrating an exemplary process for delivering enterprise messages according to one embodiment of the invention.

FIG. 27 is a flow diagram illustrating an exemplary process for delivering enterprise messages according to one embodiment of the invention. Exemplary process 2700 may be performed by a processing logic that may comprise hardware (circuitry, dedicated logic, etc.), software (such as is run on a dedicated machine), or a combination of both. In one embodiment, exemplary process 2700 includes, but is not limited to, determining, at a first node hosting a topic published by a producer, whether a first subscriber and a second subscriber subscribe the topic from a second node, the first and second subscribers registering to subscribe the topic at different time, delaying delivering at least a portion of messages associated with the topic to one of the first and second subscribers until the first and second subscribers are reading an identical message at relatively the same time, if the first and second subscribers subscribe the topic via the second node, and delivering the identical message from the first node to the second node once only, wherein the second node distributes the identical message to the first and second subscribers individually.

Referring to FIG. 27, at block 2701, subscriptions from first and second subscribers (e.g., S1 and S2 of FIG. 26A) are received at a first server node (e.g., message server 2402 of FIG. 24) for subscribing a topic at different time via a second server node (e.g., server node 2403 of FIG. 24), where the first and second subscribers are reading different messages at a given time, for example, as shown in FIG. 26A.

At block 2702, the processing logic determines whether the first and second subscribers have at least one common interest in subscribing to the topic based on, for example, one or more attributes of a message selector used during the respective subscription. If the first and second subscribers have at least one common interest, at block 2703, the processing logic suspends at least a portion of the messages to be delivered to the leading subscriber (e.g., S2 and/or S3 of FIGS. 26A-26C), until the first and second subscribers receive the same message at relatively the same time, for example, as shown in FIG. 26C. At block 2704, the same message is delivered to the second server node (e.g., server node 2403 of FIG. 24) once only, where the same message is distributed to the first and second subscribers individually by the second server node without invoking the first server node again. Other operations may also be performed while still complying with the underlying principles of the invention.

Exemplary Processes For Prioritizing Producers And Consumers

Figure 28:
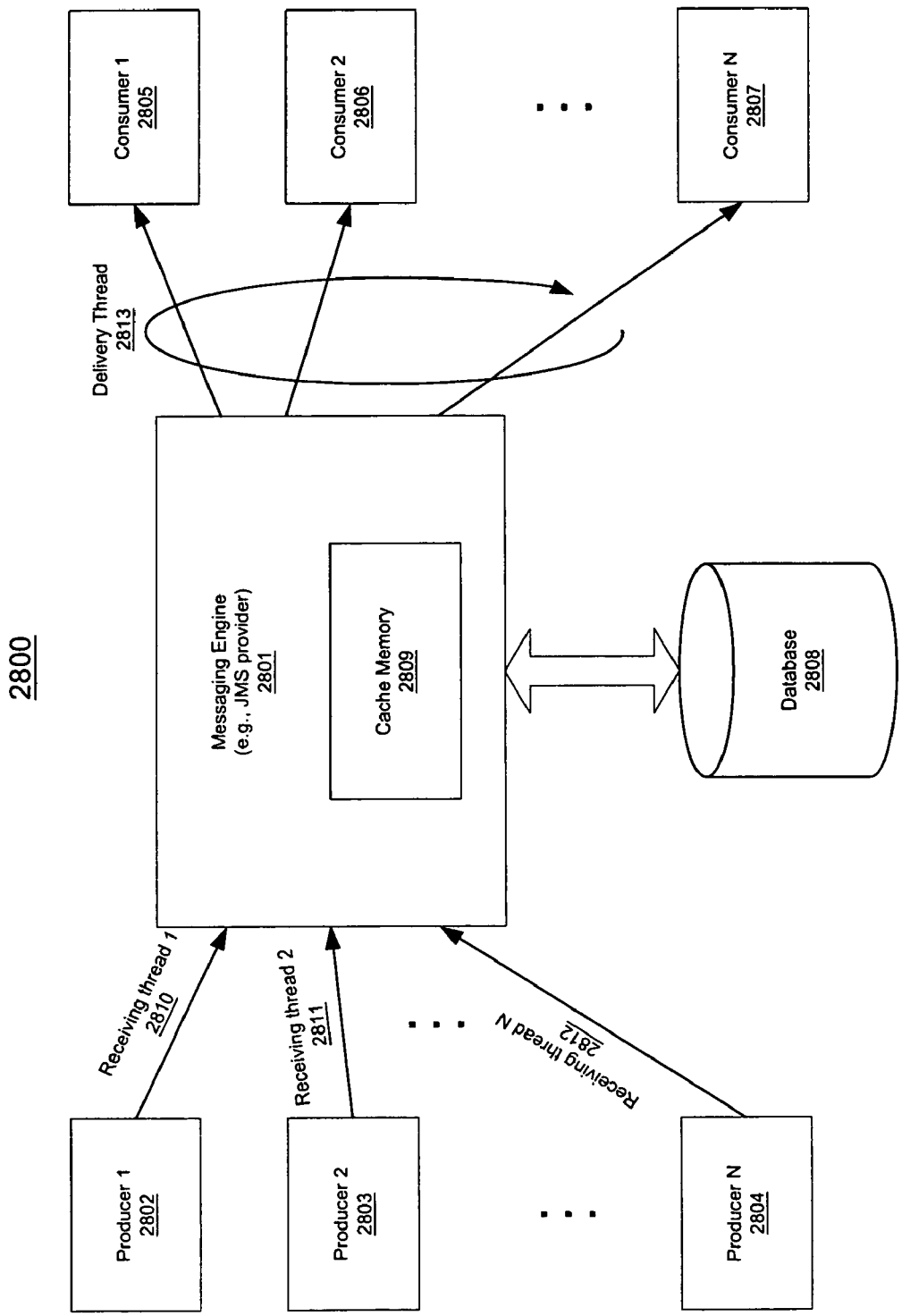
FIG. 28 is a block diagram illustrating an exemplary enterprise messaging system according to one embodiment of the invention.

In an enterprise messaging system, typically messages are received from multiple producers via multiple receiving threads, while the messages are delivered to one or more consumers using a single delivery thread. FIG. 28 is a block diagram illustrating an exemplary enterprise messaging system according to one embodiment of the invention. Referring to FIG. 28, exemplary messaging system 2800 includes a message engine 2801 having a cache memory 2809 and database 2808 to store messages received from one or more producers 2802-2804 via one or more receiving threads 2810-2812. The messages are delivered to one or more consumers 2805-2807 via a single delivery thread 2813.

Since the message producers 2802-2804 are sending messages in more than one thread (e.g., receiving threads 2810-2812) but their delivery is done via just one agent thread (e.g., delivery thread 2813), it is more likely that the number of messages received will be much larger than the number of the messages delivered, which leads to a "leak" (e.g., more messages are coming then the outgoing ones for a given time unit) of messages into the message provider (e.g., JMS provider in a Java environment). At some point, the messaging service will hang since the cache memory 2809 and/or database 2808 will be full.

In order to avoid the "leak" situation, according to one embodiment, producers 2802-2804 and consumers 2805-2807 may be prioritized. For example, if a message destination is used intensively (e.g., there are more than one "fast" producer), the priority of delivery thread 2813 (e.g., the one that is responsible for delivering the incoming messages) is increased against the receiving threads 2810-2812 that are receiving the incoming messages. The priority may not be the normal enterprise thread (e.g., Java thread) priority since it may not be guaranteed that it will work efficiently.

According to one embodiment, certain receiving threads may be blocked for a period of time. For example, each of receiving threads 2810-2812 may be blocked on every $10^{th}$ loop and may give the chance of the delivery thread 2813 to go ahead with the message delivery (e.g., the receiving threads will insert 9 messages for 10 loops vs. the delivery one which will do 11 loops for the same time period).

According to one embodiment, statistics regarding messages delivery and receiving may be maintained, for example, in database 2808, in order to distinguish which threads should be blocked, when and for how long (e.g., keep track of the "fast" producers and block them more often and for a longer time, etc.) Other configurations may be employed while still complying with the underlying principles of the invention.

Figure 29:
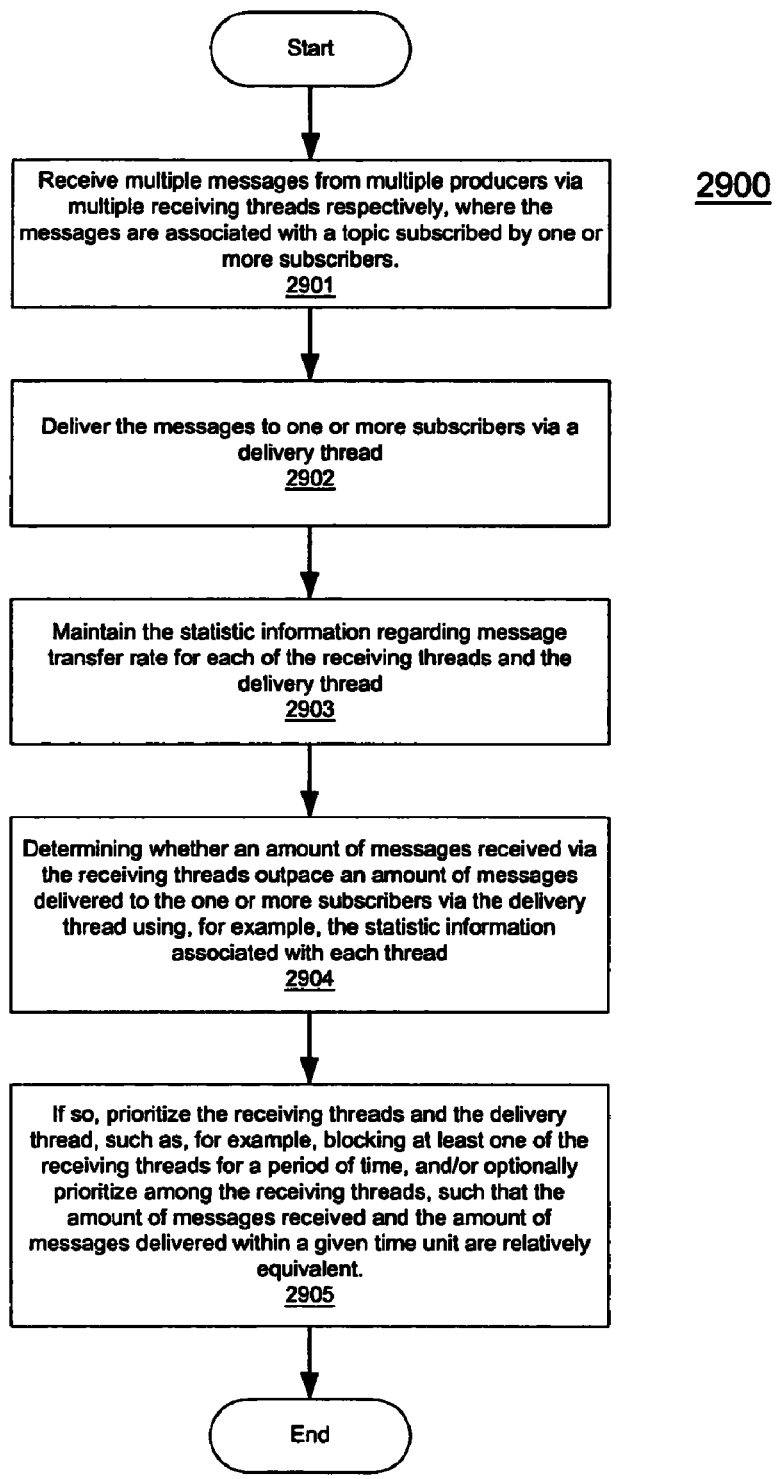
FIG. 29 is a flow diagram illustrating an exemplary process for delivering enterprise messages according to one embodiment of the invention.

FIG. 29 is a flow diagram illustrating an exemplary process for delivering enterprise messages according to one embodiment of the invention. Exemplary process 2900 may be performed by a processing logic that may comprise hardware (circuitry, dedicated logic, etc.), software (such as is run on a dedicated machine), or a combination of both. In one embodiment, exemplary process 2900 includes, but is not limited to, receiving a plurality of messages associated with a topic from a plurality of producers via a plurality of receiving threads, the messages associated with the topic being subscribed to by one or more subscribers, delivering the messages to the one or more subscribers via a delivery thread, and configuring priorities of the receiving threads and the delivery thread such that a receiving rate of messages from the producers is relatively equivalent to a delivery rate of messages delivered to the subscribers.

Referring to FIG. 29, at block 2901, multiple messages are received from multiple producers via multiple receiving threads, where the messages are associated with a topic subscribed to by one or more subscribers. At block 2902, the messages are delivered to the one or more subscribers via a delivery thread. At block 2903, the statistic information regarding message transfer rate for each of the receiving threads and the delivery thread is maintained for subsequent analysis.

At block 2904, the processing logic determines whether an amount of the messages received via the receiving threads outpaces an amount of messages delivered to the one or more subscribers via the delivery thread using, for example, the statistic information associated with each of the receiving threads and delivery thread. If so, at block 2905, the processing logic prioritizes the receiving threads and the delivery thread, such that the amount of messages received and the amount of messages delivered within a given time unit are relatively equivalent. In one embodiment, one or more receiving threads may be blocked while allowing the delivery thread to catch up. In a further embodiment, the priorities among the receiving threads may be adjusted during the operations. Other operations may also be performed while still complying with the underlying principles of the invention.

Exemplary Data Processing System

Figure 30:
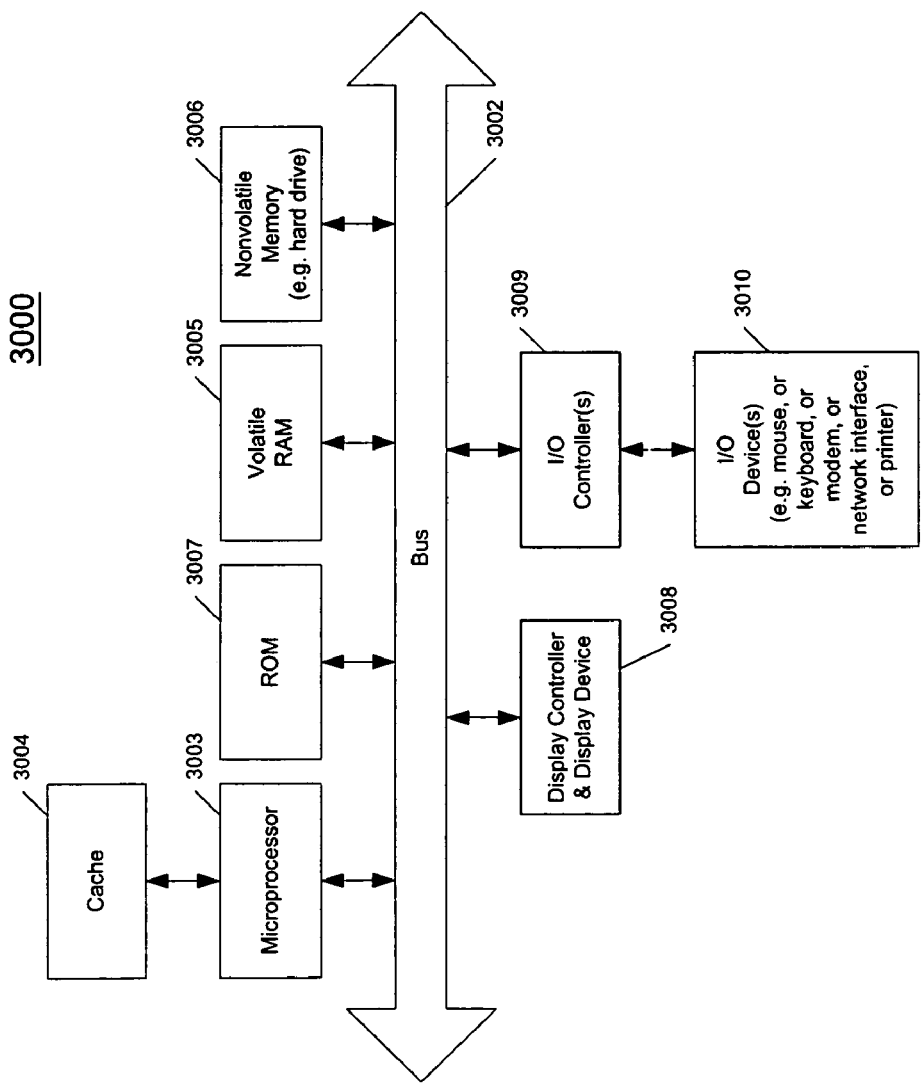
FIG. 30 is a block diagram of a data processing system which may be used with one embodiment of the invention.

FIG. 30 is a block diagram of a data processing system which may be used with one embodiment of the invention. For example, the exemplary system 3000 shown in FIG. 30 may be used as an enterprise computing engine, a server, or a client, such as, client 201, dispatch node 202, servers 204-206, or a database engine 207 of FIG. 2. The exemplary system 3000 may also be used as an enterprise messaging engine or server as shown in the above described figures, such as, for example, FIGS. 3A-3B, 9, 14, 22, 24, and 28.

Note that while FIG. 30 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 30 may, for example, be a J2EE engine or a .NET framework engine.

As shown in FIG. 30, the computer system 3000, which is a form of a data processing system, includes a bus 3002 which is coupled to a microprocessor 3003 and a ROM 3007, a volatile RAM 3005, and a non-volatile memory 3006. The microprocessor 3003, which may be a PowerPC G3 or PowerPC G4 microprocessor from Motorola, Inc. or IBM, is coupled to cache memory 3004 as shown in the example of FIG. 30. Alternatively, the microprocessor 3003 may be a Pentium processor of a Pentium processor family from Intel Corporation.

The bus 3002 interconnects these various components together and also interconnects these components 3003, 3007, 3005, and 3006 to a display controller and display device 3008, as well as to input/output (I/O) devices 3010, which may be mice, keyboards, modems, network interfaces, printers, and other devices which are well-known in the art. Typically, the input/output devices 3010 are coupled to the system through input/output controllers 3009.

The volatile RAM 3005 is typically implemented as dynamic RAM (DRAM) which requires power continuously in order to refresh or maintain the data in the memory. The non-volatile memory 3006 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 30 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 3002 may include one or more buses connected to each other through various bridges, controllers, and/or adapters, as is well-known in the art. In one embodiment, the I/O controller 3009 includes a USB (Universal Serial Bus) adapter for controlling USB peripherals or an IEEE 1394 (FireWire) adapter for controlling IEEE 1394 compatible devices.

Thus, methods and apparatuses for processing messages in an enterprise computing environment have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for processing messages in an enterprise messaging system, the method comprising:

receiving, by a messaging engine, a plurality of messages from at least one publisher via at least one receiving thread;

based on a determination that at least one of a size of a message of the plurality of messages is greater than a first predetermined threshold and an amount of storage space in a repository in the messaging engine is below a second predetermined threshold, storing a first portion of the message in the repository and a second portion of the message in a database;

based on a determination that the size of the message of the plurality of messages is less than the first predetermined threshold and the amount of storage space in the repository in the messaging engine is below the second predetermined threshold, storing the message in the repository, the plurality of messages associated with a topic for subscription, the plurality of messages including a particular message published via a connection created for a publisher, the particular message including a collection of subscriber identifications (IDs) identifying one or more subscribers sharing the connection to subscribe the topic when the particular message is published from the publisher;

generating, in response to a plurality of connections created for a subscriber associated with a subscriber ID, a plurality of subscription sessions for the subscriber subscribing the topic, each subscription session being associated with one of the plurality of connections;

maintaining a plurality of delivery policies of the plurality of subscription sessions, at least one policy being different from a remainder of the delivery policies, each subscription session being associated with one of the plurality of delivery policies including one or more attributes;

delivering the particular message to the subscriber via the plurality of subscription sessions if the particular message is not prevented from being delivered to the subscriber; and preventing the particular message from being delivered to the subscriber if the subscription ID is included in the collection of subscription IDs of the particular message and if a no-local delivery attribute specific to the subscriber and a particular subscription session is set, the no-local delivery attribute specifying that the subscriber does not want to receive messages of the plurality of messages that are published via the connection shared with the publisher.

2. The method of claim 1, wherein each of the messages is associated with substantially all delivery policies.

3. The method of claim 1, wherein the subscriber is a durable subscriber.

4. The method of claim 1, wherein the particular message is generated from a producer via another one of the plurality of subscription sessions other than the particular subscription session, and wherein the particular message is prevented from being delivered to the subscriber via the at least one no-local message delivery subscription sessions.

5. The method of claim 4, wherein an identification (ID) of the subscriber is stored in each of the messages produced by the subscriber, and wherein the ID stored in the messages is used to determined whether the respective message should be delivered to the subscriber.

6. The method of claim 5, wherein a message having an ID of a subscriber is prevented from being delivered to a subscriber associated with the ID stored therein.

7. The method of claim 1, wherein each of the stored messages includes one or more identifications (IDs) of one or more subscribers subscribing to the topic, wherein the IDs of the subscribers are used to determined whether the respective message should be processed by a maintenance service.

8. The method of claim 7, further comprising:
for each of the messages stored in the storage, examining the IDs of the subscribers within the message to determine whether the message should be deleted from the storage; and
deleting the message if the subscriptions associated with all the subscribers corresponding to the IDs stored within the message are terminated.

9. A non-transitory computer-readable storage medium storing instructions which, when executed by a processor, causes the processor to perform operations comprising:
receiving, by a messaging engine, a plurality of messages from at least one publisher via at least one receiving thread;
based on a determination that at least one of a size of a message of the plurality of messages is greater than a first predetermined threshold and an amount of storage space in a repository in the messaging engine is below a second predetermined threshold, storing a first portion of the message in the repository and a second portion of the message in a database;
based on a determination that the size of the message of the plurality of messages is less than the first predetermined threshold and the amount of storage space in the repository in the messaging engine is below the second predetermined threshold, storing the message in the repository,
the plurality of messages associated with a topic for subscription, the plurality of messages including a particular message published via a connection created for a publisher, the particular message including a collection of subscriber identifications (IDs) identifying one or more subscribers sharing the connection to subscribe the topic when the particular message is published from the publisher;
generating, in response to a plurality of connections created for a subscriber associated with a subscriber ID, a plurality of subscription sessions for the subscriber subscribing the topic, each subscription session being associated with one of the plurality of connections;
maintaining a plurality of delivery policies of a plurality the subscription sessions, at least one policy being different from a remainder of the delivery policies, each subscription session being associated with one of the plurality of delivery policies including one or more attributes;
delivering the particular messages to the subscriber via the plurality of subscription sessions if the particular message is not prevented from being delivered to the subscriber; and
preventing the particular message from being delivered to the subscriber if the subscription ID is included in the collection of subscription IDs of the particular message and if a no-local delivery attribute specific to the subscriber and a particular subscription session is set, the no-local delivery attribute specifying that the subscriber does not want to receive messages of the plurality of messages that are published via the connection shared with the publisher.

10. The non-transitory computer-readable storage medium of claim 9, wherein each of the messages being associated with substantially all delivery policies.

11. The non-transitory computer-readable storage medium of claim 9, wherein the subscriber is a durable subscriber.

12. The non-transitory computer-readable storage medium of claim 9, wherein the particular message is generated from a producer via another one of the plurality of subscription sessions other than the particular subscription session, and wherein the particular message is prevented from being delivered to the subscriber via the at least one no-local message delivery subscription sessions.

13. The non-transitory computer-readable storage medium of claim 12, wherein an identification (ID) of the subscriber is stored in each of the messages produced by the subscriber, and wherein the ID stored in the messages is used to determined whether the respective message should be delivered to the subscriber.

14. The non-transitory computer-readable storage medium of claim 13, wherein a message having an ID of a subscriber is prevented from being delivered to a subscriber associated with the ID stored therein.

15. The non-transitory computer-readable storage medium of claim 9, wherein each of the stored messages includes one or more identifications (IDs) of one or more subscribers subscribing to the topic, wherein the IDs of the subscribers are used to determined whether the respective message should be processed by a maintenance service.

16. The non-transitory computer-readable storage medium of claim 15, wherein the operations further comprise:
for each of the messages stored in the storage, examining the IDs of the subscribers within the message to determine whether the message should be deleted from the storage; and
deleting the message if the subscriptions associated with all the subscribers corresponding to the IDs stored within the message are terminated.

17. An enterprise messaging system, comprising:
a message provider to receive a plurality of messages from at least one producer via at least one receiving thread;
wherein, based on a determination that at least one of a size of a message of the plurality of messages is greater than a first predetermined threshold and an amount of storage space in a repository in the messaging engine is below a second predetermined threshold, the message provider stores a first portion of the message in the repository and a second portion of the message in a database;

wherein, based on a determination that the size of the message of the plurality of messages is less than the first predetermined threshold and the amount of storage space in the repository in the messaging engine is below the second predetermined threshold, the message provider stores the message in the repository, wherein the message provider generates, in response to a plurality of connections from a subscriber associated with a subscriber identification (ID), a plurality of subscription sessions for the subscriber subscribing a topic, each subscription session being associated with one of the plurality of connections, a particular message associated with the topic being published by a producer using one of the plurality of connections, the particular message including one or more IDs of one or more subscribers, each of the one or more subscribers sharing the connection to subscribe the topic, the message provider including one or more processors, wherein the message provider maintains a plurality of delivery policies of the plurality of subscription sessions, at least one of the delivery policies being different from a remainder of the delivery policies, each subscription session being associated with one of the plurality of delivery policies and each delivery policy including one or more attributes, wherein the message provider determines if the messages associated with the topic are prevented from being delivered to the subscriber according to substantially all the delivery polices of the subscription sessions including the at least one different delivery policy, the particular message being prevented from being delivered to the subscriber if the subscriber ID is included in the one or more IDs and if a no-local delivery attribute specific to the subscriber and a particular subscription session is set, the no-local delivery attribute specifying that the subscriber does not want to receive messages of the plurality of messages that are published via the connection shared with the producer, and wherein the message provider delivers the message to the subscriber via at least one of the plurality of subscription sessions if the particular message is not prevented from being delivered to the subscriber.

18. The enterprise messaging system of claim 17, further comprising a storage coupled to the message provider to store messages associated with the topic including the message, wherein each of the messages is associated with substantially all delivery policies.

19. The enterprise messaging system of claim 17, wherein the message provider prevents messages generated from the subscriber via other subscription sessions from being delivered to the subscriber via the at least one no-local message delivery subscription sessions.

20. The enterprise messaging system of claim 19, wherein the message provider stores an identification (ID) of the subscriber in each of the messages produced by the subscriber, wherein a message having an ID of a subscriber is prevented from being delivered to a subscriber associated with the ID stored therein.

21. A method for processing messages of an enterprise messaging system, the method comprising:
receiving a first message to be published in a topic via a first connection from a subscriber associated with an identification of the subscriber to subscribe to the topic, the first message being produced by the subscriber in a first subscription session created in response to the first connection, the first message including one or more IDs of one or more subscribers, each of the one or more subscribers sharing the first connection to subscribe the topic;
based on a determination that at least one of a size of the first message is eater than a first predetermined threshold and an amount of storage space in a repository in a messaging engine that receives the first message is below a second predetermined threshold, storing a first portion of the first message in the repository and a second portion of the first message in a database;
based on a determination that the size of the first message is less than the first predetermined threshold and the amount of storage space in the repository in the messaging engine is below the second predetermined threshold, storing the first message in the repository,
creating a second subscription session in response to a second connection from the subscriber for subscribing to the topic after the creation of the first subscription session, the second subscription session including a no-local delivery attribute, the no-local delivery attribute specific to the subscriber and the first subscription session;
determining if the first message associated with the topic is prevented from being delivered to the subscriber via the second subscription session, wherein the first message is prevented from being delivered to the subscriber if the ID of the subscriber is included in the one or more IDs based on the no-local delivery attribute being set, the no-local delivery attribute specifying that the subscriber does not want to receive messages of the plurality of messages that are published via the first connection; and
delivering messages associated with the topic to the subscriber via the second subscription session while preventing the first message from being delivered to the subscriber if the first message is determined as being prevented from being delivered to the subscriber via the second subscription session.

22. The method of claim 21, further comprising storing the first message in a storage, the stored first message containing the ID of the subscriber, wherein the ID stored within the first message is used to determined whether the first message should be deliver to the subscriber.

23. The method of claim 22, wherein the first message is prevented from being delivered to the subscriber if the first message, when stored in the storage, contains the ID of the subscriber.

24. A method for processing messages in an enterprise messaging system, the method comprising:
receiving a plurality of messages from at least one producer via at least one receiving thread;
based on a determination that at least one of a size of a message of the plurality of messages is greater than a first predetermined threshold and an amount of storage space in a repository is below a second predetermined threshold, storing a first portion of the message in the repository and a second portion of the message in a database;
based on a determination that the size of the message of the plurality of messages is less than the first predetermined threshold and the amount of storage space in the repository is below the second predetermined threshold, storing the message in the repository,
the message including identifications (IDs) of one or more durable subscribers within the message, the message being associated with a topic subscribed to by the one or more durable subscribers, the message being published by a producer using a connection, a particular one of the durable subscribers being associated with a subscription session sharing the connection, the subscription session including one or more attributes, wherein the message is prevented from being delivered to the particular subscriber if the attributes include a no-local attribute specific to the particular subscriber and the subscription session being set, the no-local delivery attribute specifying that the particular one of the durable subscribers does not want to receive messages of the plurality of messages that are published via the connection shared with the producer;

scheduling a maintenance service to maintain the message, wherein the maintenance service determines whether the message should be processed based on the IDs of the one or more durable subscribers stored within the message; and processing the message if the message does not include an ID of any of the one or more durable subscribers whose durable subscriptions are marked as alive.

25. The method of claim 24, further comprising:
determining whether the message includes an ID of a durable subscriber whose durable subscription is marked as alive.

26. The method of claim 25, wherein processing the message includes deleting the message.

27. A non-transitory computer-readable storage medium storing instructions which, when executed by a processor, causes the processor to perform operations comprising:
receiving a plurality of messages from at least one producer via at least one receiving thread;
based on a determination that at least one of a size of a message of the plurality of messages is greater than a first predetermined threshold and an amount of storage space in a repository is below a second predetermined threshold, storing a first portion of the message in the repository and a second portion of the message in a database;
based on a determination that the size of the message of the plurality of messages is less than the first predetermined threshold and the amount of storage space in the repository is below the second predetermined threshold, storing the message in the repository,
the message including identifications (IDs) of one or more durable subscribers within the message, the message being associated with a topic subscribed to by the one or more durable subscribers, the message being published by a producer using a connection, a particular one of the durable subscribers being associated with a subscription session sharing the connection, the subscription session including one or more attributes, wherein the message is prevented from being delivered to the particular subscriber if the attributes include a no-local attribute specific to the particular subscriber and the subscription session being set, the no-local delivery attribute specifying that the particular one of the durable subscribers does not want to receive messages of the plurality of messages that are published via the connection shared with the producer;
scheduling a maintenance service to maintain the message, wherein the maintenance service determines whether the message should be processed based on the IDs of the one or more durable subscribers stored within the message; and
processing the message if the message does not include an ID of any of the one or more durable subscribers whose durable subscriptions are marked as alive.

28. The non-transitory computer-readable storage medium of claim 27, wherein the operations further comprise:
determining whether the message includes an ID of a durable subscriber whose durable subscription is marked as alive.

29. The non-transitory computer-readable storage medium of claim 28, wherein processing the message includes deleting the message.

30. An enterprise messaging system, comprising:
a processor;
a memory coupled to the processor; and
a process when executed from the memory, causes the processor to
receive a plurality of messages from at least one producer via at least one receiving thread;
based on a determination that at least one of a size of a message of the plurality of messages is greater than a first predetermined threshold and an amount of storage space in a repository is below a second predetermined threshold, store a first portion of the message in the repository and a second portion of the message in a database;
based on a determination that the size of the message of the plurality of messages is less than the first predetermined threshold and the amount of storage space in the repository is below the second predetermined threshold, store the message in the repository,
the message including identifications (IDs) of one or more durable subscribers within the message, the message being associated with a topic subscribed to by the one or more durable subscribers, the message being published by a producer using a connection, a particular one of the durable subscribers being associated with a subscription session sharing the connection, the subscription session including one or more attributes, wherein the message is prevented from being delivered to the particular subscriber if the attributes include a no-local attribute specific to the particular subscriber and the subscription session being set, the no-local delivery attribute specifying that the particular one of the durable subscribers does not want to receive messages of the plurality of messages that are published via the connection shared with the producer,
schedule a maintenance service to maintain the message, wherein the maintenance service determines whether the message should be processed based on the IDs of the one or more durable subscribers stored within the message, and
process the message if the message does not include an ID of any of the one or more durable subscribers whose durable subscriptions are marked as alive.

31. A method for processing messages in an enterprise messaging system, the method comprising:
receiving a first message from a producer using a connection, the message scheduled to be delivered to a consumer;
determining, via a first thread, whether an available space of a cache memory is below a first predetermined threshold;
storing a portion of the first message in the cache memory while storing a remainder of the first message in a database, the portion of the first message stored in the cache memory including a reference link to the remainder of the first message stored in the database, the remainder of the first message including identifications (IDs) of one or more durable subscribers sharing the connection to subscribe a topic associated with the first message, a particular one of the durable subscribers being associated with a subscription session using the connection, the subscription session including one or more attributes, wherein the message is prevented from being delivered to the particular subscriber if the attributes include a no-local attribute specific to the particular subscriber and the subscription session being set, the no-local delivery attribute specifying that the particular one of the durable subscribers does not want to receive messages of the plurality of messages that are published via the connection shared with the producer;

determining, via a second thread independent of the first thread, whether the available space of the cache memory is above a second predetermined threshold; and fetching a second message from the database into the cache memory if the available space of the cache memory is above a second predetermined threshold.

32. The method of claim 31, further comprising:

determining whether a size of the first message exceeds a third predetermined threshold; and performing the storing a portion of the first message in the cache memory while storing a remainder of the first message in the database, if the size of the first message exceeds the third predetermined threshold.

33. The method of claim 31, wherein producer is identified via a producer ID, wherein the consumer is identified via a consumer ID, and wherein the first message is prevented from being delivered to the consumer if the producer ID matches the consumer ID.

34. The method of claim 33, wherein the first message includes a collection of IDs stored in the database for subscribers subscribing the topic, wherein the collection of IDs include the IDs of the durable subscribers, the method further comprising:

examining, via a third thread independent of the first and second threads, the collection of IDs of the first message stored in the database to determine whether the first message should be deleted; and deleting the first message if the first message does not contain an ID of a durable subscriber whose durable subscription is marked as alive.

35. A non-transitory computer-readable storage medium storing instructions which, when executed by a processor, causes the processor to perform operations comprising:

receiving a first message from a producer using a connection, the message scheduled to be delivered to a consumer;

determining, via a first thread, whether an available space of a cache memory is below a first predetermined threshold;

storing a portion of the first message in the cache memory while storing a remainder of the first message in a database, the portion of the first message stored in the cache memory including a reference link to the remainder of the first message stored in the database, the remainder of the first message including identifications (IDs) of one or more durable subscribers sharing the connection to subscribe a topic associated with the first message, a particular one of the durable subscribers being associated with a subscription session using the connection, the subscription session including one or more attributes, wherein the message is prevented from being delivered to the particular subscriber if the attributes include a no-local attribute specific to the particular subscription and the subscription session being set, the no-local delivery attribute specifying that the particular one of the durable subscribers does not want to receive messages of the plurality of messages that are published via the connection shared with the producer;

determining, via a second thread independent of the first thread, whether the available space of the cache memory is above a second predetermined threshold; and fetching a second message from the database into the cache memory if the available space of the cache memory is above a second predetermined threshold.

36. The non-transitory computer-readable storage medium of claim 35, wherein the operations further comprise:

determining whether a size of the first message exceeds a third predetermined threshold; and performing the storing a portion of the first message in the cache memory while storing a remainder of the first message in the database, if the size of the first message exceeds the third predetermined threshold.

37. The non-transitory computer-readable storage medium of claim 35, wherein the producer is identified via a producer ID, wherein the consumer is identified via a consumer ID, and wherein the first message is prevented from being delivered to the consumer if the producer ID matches the consumer ID.

38. The non-transitory computer-readable storage medium of claim 37, wherein the first message includes a collection of IDs stored in the database for subscribers subscribing the topic, wherein the collection of IDs include the IDs of the durable subscribers, and wherein the method further comprises:

examining, via a third thread independent of the first and second threads, the collection of IDs of the first message stored in the database to determine whether the first message should be deleted; and deleting the first message if the first message does not contain an ID of a durable subscriber whose durable subscription is marked as alive.

39. An enterprise messaging system, comprising:

a processor;

a memory coupled to the processor; and a process when executed from the memory, causes the processor to receive a first message from a producer using a connection, the message scheduled to be delivered to a consumer, determine, via a first thread, whether an available space of a cache memory is below a first predetermined threshold, store a portion of the first message in the cache memory while storing a remainder of the first message in a database, the portion of the first message stored in the cache memory including a reference link to the remainder of the first message stored in the database, the remainder of the first message including identifications (IDs) of one or more durable subscribers sharing the connection to subscribe a topic associated with the first message, a particular one of the durable subscribers being associated with a subscription session using the connection, the subscription session including one or more attributes, wherein the message is prevented from being delivered to the particular subscriber if the attributes include a no-local attribute specific to the particular subscriber and the subscription session being set, the no-local delivery attribute specifying that the particular one of the durable subscribers does not want to receive messages of the plurality of messages that are published via the connection shared with the producer, determine, via a second thread independent of the first thread, whether the available space of the cache memory is above a second predetermined threshold, and fetch a second message from the database into the cache memory if the available space of the cache memory is above a second predetermined threshold.

40. A computer-implemented method, comprising:

transmitting a data packet over one of a plurality of connections from a subscriber associated with a subscriber ID between two enterprise network nodes, wherein the data packet includes a size field to specify a size of a data packet being carried, a type field immediately succeeding the size field to specify whether the data packet is a request packet or a response packet, a flag field immediately succeeding the type field to specify one or more flags used by the data packet, a request identifier (ID) field immediately succeeding the flag field to specify an identifier of the data packet, and a payload field immediately succeeding the request ID field to store a payload of the data packet;

based on a determination that at least one of a size of the data packet is greater than a first predetermined threshold and an amount of storage space in a repository in the messaging engine is below a second predetermined threshold, storing a first portion of the data packet in the repository and a second portion of the data packet in a database;

based on a determination that the size of the data packet is less than the first predetermined threshold and the amount of storage space in the repository in the messaging engine is below the second predetermined threshold, storing the data packet in the repository, generating, in response to the plurality of connections, a plurality of subscription sessions for the subscriber to subscribe a topic to deliver messages associated with the topic via the plurality of subscription sessions, the messages including a particular message produced by a producer using a connection, the particular message including at least one ID of at least one subscriber sharing the connection to subscribe to the topic, the particular message being stored in the payload field of the data packet, the plurality of subscription sessions including a no-local delivery attribute specific to the subscriber being set, the no-local delivery attribute specifying that the particular one of the durable subscribers does not want to receive messages of the plurality of messages that are published via the connection shared with the producer; and preventing the particular message from being delivered to the subscriber if the subscriber ID is included in the at least one ID.

41. The computer-implemented method of claim 40, wherein the size field is 4-bytes long, wherein the type field is 1-byte long, wherein the flag field is 1-byte long, and wherein the request ID field is 8-bytes long.

42. The computer-implemented method of claim 40, wherein the payload field comprises:

a session ID field to identify a current session the data packet being transmitted;

a destination ID field immediately succeeding the session ID field to identify a destination of the data packet; and a message field immediately succeeding the destination ID field to store an enterprise message.

43. The computer-implemented method of claim 40, wherein the payload field comprises:

a connection ID field to identify a current connection the data packet being transmitted;

a session ID field immediately succeeding the connection ID field to identify a current session of a connection having a connection ID identified by the connection ID field; and a message field immediately succeeding the session ID field to store an enterprise message.

* * * * *